US007286720B2

(12) United States Patent
Ueda

(10) Patent No.: US 7,286,720 B2
(45) Date of Patent: Oct. 23, 2007

(54) IMAGE PROCESSING APPARATUS, IMAGE INPUT/OUTPUT APPARATUS, SCALING METHOD AND MEMORY CONTROL METHOD

(75) Inventor: Koichi Ueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 11/334,585

(22) Filed: Jan. 19, 2006

(65) Prior Publication Data

US 2006/0115183 A1 Jun. 1, 2006

Related U.S. Application Data

(62) Division of application No. 10/216,767, filed on Aug. 13, 2002, now Pat. No. 7,065,263.

(30) Foreign Application Priority Data

| Aug. 21, 2001 | (JP) | ............................... 2001-250406 |
| Aug. 21, 2001 | (JP) | ............................... 2001-250407 |
| May 14, 2002 | (JP) | ............................... 2002-138343 |
| Jul. 11, 2002 | (JP) | ............................... 2002-202918 |

(51) Int. Cl.
| G06K 9/32 | (2006.01) |
| G06K 9/36 | (2006.01) |
| G06T 11/00 | (2006.01) |
| G09G 5/00 | (2006.01) |
| G06F 15/00 | (2006.01) |
| H04N 1/393 | (2006.01) |

(52) U.S. Cl. .................... 382/298; 382/232; 345/660; 345/472; 358/1.2; 358/451

(58) Field of Classification Search ........ 382/232–253, 382/276, 298–300; 345/472, 660–671, 698–699; 358/1.1, 1.2, 3.07, 525, 445, 451

See application file for complete search history.

(56) References Cited

U.S. PATENT DOCUMENTS

| 4,124,871 A | * | 11/1978 | Morrin, II ................... 358/444 |
| 4,125,873 A | * | 11/1978 | Chesarek .................... 345/555 |
| 4,746,980 A | | 5/1988 | Petersen ..................... 358/443 |
| 4,790,025 A | | 12/1988 | Inoue et al. ................ 382/293 |
| 4,791,680 A | * | 12/1988 | Yokoe et al. ................. 382/46 |
| 4,797,739 A | * | 1/1989 | Tanaka ..................... 348/418.1 |
| 4,890,100 A | | 12/1989 | Kurakake et al. ........... 345/554 |
| 4,903,317 A | * | 2/1990 | Nishihara et al. ........... 382/244 |
| 4,918,541 A | * | 4/1990 | Ishida et al. ................ 382/235 |
| 5,130,809 A | * | 7/1992 | Takayanagi ................. 358/300 |
| 5,175,533 A | | 12/1992 | Krenik ....................... 345/589 |

(Continued)

FOREIGN PATENT DOCUMENTS

JP       10-304184       11/1998

(Continued)

*Primary Examiner*—Bhavesh M Mehta
*Assistant Examiner*—Manav Seth
(74) *Attorney, Agent, or Firm*—Fitzpatrick, Cella Harper & Scinto

(57) ABSTRACT

The present invention relates to an image processing apparatus, an image input/output apparatus, a scaling method and a memory control method, by which input image data is written to an external memory in tiles, the tiles written to the external memory are read, and the read-out tiles are scaled.

6 Claims, 36 Drawing Sheets

U.S. PATENT DOCUMENTS

| | | | |
|---|---|---|---|
| 5,204,916 A | 4/1993 | Hamilton et al. | 382/298 |
| 5,237,397 A * | 8/1993 | Mighdoll et al. | 375/240.25 |
| 5,300,949 A * | 4/1994 | Rodriquez et al. | 382/233 |
| 5,337,156 A * | 8/1994 | Nakamura et al. | 358/404 |
| 5,508,733 A * | 4/1996 | Kassatly | 348/385.1 |
| 5,604,824 A * | 2/1997 | Chui et al. | 382/248 |
| 5,612,899 A * | 3/1997 | Pan et al. | 709/247 |
| 5,638,498 A * | 6/1997 | Tyler et al. | 358/1.18 |
| 5,712,689 A * | 1/1998 | Yasuki et al. | 382/298 |
| 5,736,988 A | 4/1998 | Shaw et al. | 345/423 |
| 5,768,481 A * | 6/1998 | Chan et al. | 358/1.2 |
| 5,825,424 A * | 10/1998 | Canfield et al. | 375/240.15 |
| 5,844,608 A * | 12/1998 | Yu et al. | 375/240.01 |
| 5,917,947 A * | 6/1999 | Ishida et al. | 382/232 |
| 6,020,975 A * | 2/2000 | Chen et al. | 358/1.16 |
| 6,151,036 A | 11/2000 | Nakajima et al. | 345/511 |
| 6,298,166 B1 * | 10/2001 | Ratnakar et al. | 382/248 |
| 6,483,604 B1 * | 11/2002 | Gerstenberger | 358/1.17 |
| 6,611,260 B1 | 8/2003 | Greenberg et al. | 345/204 |
| 6,636,222 B1 * | 10/2003 | Valmiki et al. | 382/235 |
| 7,116,714 B2 * | 10/2006 | Hannuksela | 382/236 |
| 7,149,811 B2 * | 12/2006 | Wise et al. | 382/232 |
| 7,221,804 B2 * | 5/2007 | Atsumi et al. | 382/232 |
| 2001/0033392 A1 | 10/2001 | Utsunomiya | 358/1.15 |

FOREIGN PATENT DOCUMENTS

| | | |
|---|---|---|
| JP | 2000-149002 | 5/2000 |
| JP | 2002-008002 | 1/2002 |

* cited by examiner

FIG. 22

| | (0, 8n) | (1, 8n) | (2, 8n) | (3, 8n) | (4, 8n) | (5, 8n) | (6, 8n) | (7, 8n) | (8, 8n) |
|---|---|---|---|---|---|---|---|---|---|
| tFlag0=0 → | (0, 8n) | (1, 8n) | (2, 8n) | (3, 8n) | (4, 8n) | (5, 8n) | (6, 8n) | (7, 8n) | (8, 8n) |
| tFlag1=0 → | $\binom{0,\,8n}{+1}$ | $\binom{1,\,8n}{+1}$ | $\binom{2,\,8n}{+1}$ | $\binom{3,\,8n}{+1}$ | $\binom{4,\,8n}{+1}$ | $\binom{5,\,8n}{+1}$ | $\binom{6,\,8n}{+1}$ | $\binom{7,\,8n}{+1}$ | $\binom{8,\,8n}{+1}$ |
| tFlag2=0 → | $\binom{0,\,8n}{+2}$ | $\binom{1,\,8n}{+2}$ | $\binom{2,\,8n}{+2}$ | $\binom{3,\,8n}{+2}$ | $\binom{4,\,8n}{+2}$ | $\binom{5,\,8n}{+2}$ | $\binom{6,\,8n}{+2}$ | $\binom{7,\,8n}{+2}$ | $\binom{8,\,8n}{+2}$ |
| tFlag3=0 → | $\binom{0,\,8n}{+3}$ | $\binom{1,\,8n}{+3}$ | $\binom{2,\,8n}{+3}$ | $\binom{3,\,8n}{+3}$ | $\binom{4,\,8n}{+3}$ | $\binom{5,\,8n}{+3}$ | $\binom{6,\,8n}{+3}$ | $\binom{7,\,8n}{+3}$ | $\binom{8,\,8n}{+3}$ |
| tFlag4=0 → | $\binom{0,\,8n}{+4}$ | $\binom{1,\,8n}{+4}$ | $\binom{2,\,8n}{+4}$ | $\binom{3,\,8n}{+4}$ | $\binom{4,\,8n}{+4}$ | $\binom{5,\,8n}{+4}$ | $\binom{6,\,8n}{+4}$ | $\binom{7,\,8n}{+4}$ | $\binom{8,\,8n}{+4}$ |
| tFlag5=0 → | $\binom{0,\,8n}{+5}$ | $\binom{1,\,8n}{+5}$ | $\binom{2,\,8n}{+5}$ | $\binom{3,\,8n}{+5}$ | $\binom{4,\,8n}{+5}$ | $\binom{5,\,8n}{+5}$ | $\binom{6,\,8n}{+5}$ | $\binom{7,\,8n}{+5}$ | $\binom{8,\,8n}{+5}$ |
| tFlag6=0 → | $\binom{0,\,8n}{+6}$ | $\binom{1,\,8n}{+6}$ | $\binom{2,\,8n}{+6}$ | $\binom{3,\,8n}{+6}$ | $\binom{4,\,8n}{+6}$ | $\binom{5,\,8n}{+6}$ | $\binom{6,\,8n}{+6}$ | $\binom{7,\,8n}{+6}$ | $\binom{8,\,8n}{+6}$ |
| tFlag7=0 → | $\binom{0,\,8n}{+7}$ | $\binom{1,\,8n}{+7}$ | $\binom{2,\,8n}{+7}$ | $\binom{3,\,8n}{+7}$ | $\binom{4,\,8n}{+7}$ | $\binom{5,\,8n}{+7}$ | $\binom{6,\,8n}{+7}$ | $\binom{7,\,8n}{+7}$ | $\binom{8,\,8n}{+7}$ |

FIG. 23

| | (0, 8n) | (1, 8n) | (2, 8n) | (3, 8n) | (4, 8n) | (5, 8n) | (6, 8n) | (7, 8n) | (8, 8n) |
|---|---|---|---|---|---|---|---|---|---|
| tFlag0=1 → | | | | | | | | | |
| tFlag1=0 → | $(0, 8n)+1$ | $(1, 8n)+1$ | $(2, 8n)+1$ | $(3, 8n)+1$ | $(4, 8n)+1$ | $(5, 8n)+1$ | $(6, 8n)+1$ | $(7, 8n)+1$ | $(8, 8n)+1$ |
| tFlag2=0 → | $(0, 8n)+2$ | $(1, 8n)+2$ | $(2, 8n)+2$ | $(3, 8n)+2$ | $(4, 8n)+2$ | $(5, 8n)+2$ | $(6, 8n)+2$ | $(7, 8n)+2$ | $(8, 8n)+2$ |
| tFlag3=0 → | $(0, 8n)+3$ | $(1, 8n)+3$ | $(2, 8n)+3$ | $(3, 8n)+3$ | $(4, 8n)+3$ | $(5, 8n)+3$ | $(6, 8n)+3$ | $(7, 8n)+3$ | $(8, 8n)+3$ |
| tFlag4=0 → | $(0, 8n)+4$ | $(1, 8n)+4$ | $(2, 8n)+4$ | $(3, 8n)+4$ | $(4, 8n)+4$ | $(5, 8n)+4$ | $(6, 8n)+4$ | $(7, 8n)+4$ | $(8, 8n)+4$ |
| tFlag5=0 → | $(0, 8n)+5$ | $(1, 8n)+5$ | $(2, 8n)+5$ | $(3, 8n)+5$ | $(4, 8n)+5$ | $(5, 8n)+5$ | $(6, 8n)+5$ | $(7, 8n)+5$ | $(8, 8n)+5$ |
| tFlag6=0 → | $(0, 8n)+6$ | $(1, 8n)+6$ | $(2, 8n)+6$ | $(3, 8n)+6$ | $(4, 8n)+6$ | $(5, 8n)+6$ | $(6, 8n)+6$ | $(7, 8n)+6$ | $(8, 8n)+6$ |
| tFlag7=0 → | $(0, 8n)+7$ | $(1, 8n)+7$ | $(2, 8n)+7$ | $(3, 8n)+7$ | $(4, 8n)+7$ | $(5, 8n)+7$ | $(6, 8n)+7$ | $(7, 8n)+7$ | $(8, 8n)+7$ |

FIG. 24

| | | | | | | | | |
|---|---|---|---|---|---|---|---|---|
| tFlag0=1 → (0, 8n) | (1, 8n) | (2, 8n) | (3, 8n) | (4, 8n) | (5, 8n) | (6, 8n) | (7, 8n) | (8, 8n) |
| tFlag1=1 → $\binom{0,\,8n}{+1}$ | $\binom{1,\,8n}{+1}$ | $\binom{2,\,8n}{+1}$ | $\binom{3,\,8n}{+1}$ | $\binom{4,\,8n}{+1}$ | $\binom{5,\,8n}{+1}$ | $\binom{6,\,8n}{+1}$ | $\binom{7,\,8n}{+1}$ | $\binom{8,\,8n}{+1}$ |
| tFlag2=1 → $\binom{0,\,8n}{+2}$ | $\binom{1,\,8n}{+2}$ | $\binom{2,\,8n}{+2}$ | $\binom{3,\,8n}{+2}$ | $\binom{4,\,8n}{+2}$ | $\binom{5,\,8n}{+2}$ | $\binom{6,\,8n}{+2}$ | $\binom{7,\,8n}{+2}$ | $\binom{8,\,8n}{+2}$ |
| tFlag3=1 → $\binom{0,\,8n}{+3}$ | $\binom{1,\,8n}{+3}$ | $\binom{2,\,8n}{+3}$ | $\binom{3,\,8n}{+3}$ | $\binom{4,\,8n}{+3}$ | $\binom{5,\,8n}{+3}$ | $\binom{6,\,8n}{+3}$ | $\binom{7,\,8n}{+3}$ | $\binom{8,\,8n}{+3}$ |
| tFlag4=1 → $\binom{0,\,8n}{+4}$ | $\binom{1,\,8n}{+4}$ | $\binom{2,\,8n}{+4}$ | $\binom{3,\,8n}{+4}$ | $\binom{4,\,8n}{+4}$ | $\binom{5,\,8n}{+4}$ | $\binom{6,\,8n}{+4}$ | $\binom{7,\,8n}{+4}$ | $\binom{8,\,8n}{+4}$ |
| tFlag5=1 → $\binom{0,\,8n}{+5}$ | $\binom{1,\,8n}{+5}$ | $\binom{2,\,8n}{+5}$ | $\binom{3,\,8n}{+5}$ | $\binom{4,\,8n}{+5}$ | $\binom{5,\,8n}{+5}$ | $\binom{6,\,8n}{+5}$ | $\binom{7,\,8n}{+5}$ | $\binom{8,\,8n}{+5}$ |
| tFlag6=1 → $\binom{0,\,8n}{+6}$ | $\binom{1,\,8n}{+6}$ | $\binom{2,\,8n}{+6}$ | $\binom{3,\,8n}{+6}$ | $\binom{4,\,8n}{+6}$ | $\binom{5,\,8n}{+6}$ | $\binom{6,\,8n}{+6}$ | $\binom{7,\,8n}{+6}$ | $\binom{8,\,8n}{+6}$ |
| tFlag7=1 → $\binom{0,\,8n}{+7}$ | $\binom{1,\,8n}{+7}$ | $\binom{2,\,8n}{+7}$ | $\binom{3,\,8n}{+7}$ | $\binom{4,\,8n}{+7}$ | $\binom{5,\,8n}{+7}$ | $\binom{6,\,8n}{+7}$ | $\binom{7,\,8n}{+7}$ | $\binom{8,\,8n}{+7}$ |

| | | | | | | | |
|---|---|---|---|---|---|---|---|
| 0 | 1 | 2 | 3 | 4 | 5 | 6 | 7 |
| 16 | 17 | 18 | 19 | 20 | 21 | 22 | 23 |
| 32 | 33 | 34 | 35 | 36 | 37 | 38 | 39 |
| 48 | | | | | | | |

(continued)

| 8 | 9 | 10 | 11 | 12 | 13 | 14 | 15 |
|---|---|---|---|---|---|---|---|
| 24 | 25 | 26 | 27 | 28 | 29 | 30 | 31 |
| 40 | 41 | 42 | 43 | 44 | 45 | 46 | 47 |

HORIZONTAL DIRECTION →

VERTICAL DIRECTION →

IMAGE PROCESSING APPARATUS, IMAGE INPUT/OUTPUT APPARATUS, SCALING METHOD AND MEMORY CONTROL METHOD

This application is a division of application Ser. No. 10/216,767, filed Aug. 13, 2002 now U.S. Pat. No. 7,065,263, the contents of which are incorporated by reference herein.

FIELD OF THE INVENTION

The present invention relates to an image processing apparatus, and image input/output apparatus, a scaling method and a memory control method, and more particularly, to an image processing apparatus, and image input/output apparatus, a scaling method and a memory control method in which input image data is written to an external memory in tile image units, the tile image written to the external memory is read and the read tile image is scaled.

BACKGROUND OF THE INVENTION

Scaling, in image input/output apparatuses such as digital copiers and in image processing apparatuses such as personal computers, has come to be a very important feature. Scaling is frequently used in image input/output apparatuses in particular, which are usually equipped with a special scaling circuit.

The operations of a conventional scaling circuit are shown schematically in FIG. 34, in which 3401 denotes the scaling circuit, 3402 denotes an entire scaled input image to be scaled, and 3403 denotes the entire output image after scaling. Reference numeral 3404 denotes the pixels prior to scaling and 3405 denotes the pixels after scaling.

The numbers shown inside the images denote the order in which the pixels of the image are input to or output from the scaling circuit 3401.

FIG. 35 is a block diagram showing the structure in detail of a conventional scaling circuit 3401. In FIG. 35, reference numeral 3501 denotes a line buffer, 3502 denotes a vertical filter, 3503 denotes a shift register and 3504 denotes a horizontal filter. The detailed structure of the horizontal and vertical filters is shown in FIG. 36.

The conventional scaling circuit 3401 shown in FIG. 34 accepts image data (that is, pixel data) of a single page of imagery in the order in which this data is scanned (hereinafter order of scanning), and outputs the scaling results in the order of scanning.

A description is given of the scaling process performed inside the conventional scaling circuit 3401 using FIG. 35.

First, pixel data inputted to the scaling circuit 3401 from an external source is stored in the line buffer 3501. Then, the vertical filter 3502 filters a plurality of image data having the same position in the horizontal direction and being shifted one line each in the vertical direction (eight lines in FIG. 35). After this vertical direction filter processing has been performed, the resulting image data is input to the shift register 3503 for horizontal scaling and image data filter processing (consisting of eight pixels in FIG. 35) is performed in the same manner as vertically.

FIG. 36 shows the operation of a filter processing circuit. In FIG. 36, reference numeral 3601 is a filter coefficient generator circuit, 3602 is a multiplier circuit and 3603 is an adder circuit. A filter coefficient is output from the filter coefficient generator circuit 3601 and image data continuous in either the vertical or horizontal directions is input from either the line buffer 3501 or the shift register 3503. Then, each pixel of the image data is multiplied by the filter coefficient corresponding to that pixel at the multiplier circuit 3602, after which all calculation results are added at the adder circuit 3603 and output.

The foregoing describes the conventional scaling process. However, as disclosed in Japanese Laid-Open Patent Application No. 2002-8002, the Applicant has proposed an image input/output apparatus in which the processing blocks perform image processing in tile image units. The structure of the image processor of such an image input/output apparatus lends itself to integrated circuit (IC) chip formation, and a scaling circuit 3401 can be provided as one of the processing blocks.

However, as the amount of image data to be processed continues to increase at an outstanding rate, the conventional scaling circuit 3401 like that described above would need a very large buffer in order to perform scaling. The circuit shown in FIG. 35, for example, requires an 8-line line buffer, and in the case of an A4-size sheet, a 6,000 dpi image would therefore require a 7,000-pixel buffer.

Moreover, particularly when mounting a scaling circuit on the image input/output apparatus described above, which manages image data in tile image units, the conventional scaling circuit would still require a very large line buffer even if the scaling circuit were mounted in a single chip, and so is not practical when it comes time to package the whole as an IC.

Similarly, although it is possible to configure an apparatus so that no line buffer is provided on an IC chip that includes the scaling circuit and a manageable external chip memory is used instead of the line buffer. However, in such a structure access to the external memory is concentrated and the processing speed of the scaling circuit is limited.

SUMMARY OF THE INVENTION

Accordingly, the present invention was conceived in order to solve the above-described problems of the conventional art, and has as its object to provide an image processing apparatus and an image processing apparatus scaling method that can perform scaling at the level of the tile unit while using little memory capacity.

The above-described object of the present invention is achieved by an image processing apparatus for performing scaling on inputted image data, the apparatus comprising: a write unit for writing the inputted image data to an external memory in tile image units; a read unit for reading the tile images written to the external memory; and a scaling unit for scaling on the tile images read by the read unit.

Additionally, the present invention also has as a further object to provide an image processing apparatus and an image processing apparatus memory control method with improved processing speed when using an external memory to perform image processing, in particular scaling.

This further object of the present invention is achieved by an image processing apparatus for performing image processing on inputted image data, comprising: a raster unit for rasterizing the inputted image data to an external memory as raster data; a read unit for reading the raster data written to the external memory in tile image units; and an image processor for performing predetermined image processing on the tile images read from the external memory by the read unit, the read unit continuously reading from the external memory a predetermined number of lines of image data when commencing reading of the tile images.

Additionally, the present invention also has as a further object to provide an image processing apparatus and an image processing apparatus memory control method that can easily and efficiently perform memory management when carrying out scaling and image data write processing using a simple structure.

According to this aspect of the invention., this further object is achieved by an image processing apparatus for performing scaling on inputted image data, the apparatus comprising: a write unit for writing the inputted image data to an external memory in tile image units; a read unit for reading the tile images written to the external memory; a scaling unit for scaling on the tile images read by the read unit; and an exclusive controller unit for controlling access to the external memory by the read unit and the write unit, the exclusive controller unit setting a number of tile images in a vertical direction to be managed in the external memory being at least $(1/n)+2$ when a designated vertical direction scaling rate is n (n<1) when accessing the external memory in the read step and the write step.

Additionally, the present invention also has as a further object to provide an image processing apparatus and an image processing apparatus scaling method with improved processing speed yet without increasing the clock speed of the circuit.

According to this aspect of the invention, this further object is achieved by an image processing apparatus, further comprising: a storage unit for storing the image data scaled by the scaling unit; and a storage controller unit for controlling the storage unit, the scaling unit scaling a plurality of tile images continuous in a horizontal direction all at once, the storage controller unit storing the scaled image data in the storage unit, and reading and outputting the image data stored in the storage unit in tile image units.

Additionally, the present invention also has as a further object to provide an image processing apparatus and an image processing apparatus scaling method that simplifies data management for scaling using an external memory.

According to this aspect of the invention, this further object is achieved by an image input/output apparatus for performing image processing on inputted image data, the apparatus comprising: a data packet generator for dividing the inputted image data into a predetermined divided image, adding attribute information to the divided image and generating a data packet; and a scaling unit for inputting the data packet, performing scaling on the divided image, reconfiguring the data packet from the scaled divided image and outputting the reconfigured data packet, the scaling unit writing the inputted data packet image data to the external memory in divided image units based on position information included in a header, reading the divided image written to the external memory, and performing scaling processor on the read-out divided image.

This further object of the present invention is achieved by an image input/output apparatus and an image input/output apparatus scaling method that enables scaling to be varied according to different scaling rates and image sizes yet without affecting the circuit structure inside the IC chip.

According to this aspect of the invention, this further object is achieved by an image processing apparatus for performing scaling on inputted image data, the apparatus comprising: an IC chip for processing and outputting the inputted image data in predetermined divided image units; and a memory unit accessed in order to carry out image processing by the IC chip, the IC chip securing the memory unit in the divided image units depending on a scaling rate and performing scaling on the inputted image data based on the memory unit divided image when performing scaling on the inputted image data.

Other objects, features and advantages of the present invention besides those discussed above shall be apparent to those skilled in the art from the description of a preferred embodiment of the invention which follows.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 22 is a diagram illustrating one memory state during tile image data transfer using the exclusive control circuit depicted in FIG. 20;

FIG. 23 is a diagram illustrating another memory state during tile image data transfer using the exclusive control circuit depicted in FIG. 20;

FIG. 24 is a diagram illustrating a third memory state during tile image data transfer using the exclusive control circuit depicted in FIG. 20;

FIG. 25 is a diagram illustrating a fourth third memory state during tile image data transfer using the exclusive control circuit depicted in FIG. 20;

FIG. 28 is a diagram showing a sample address in a tile buffer;

DETAILED DESCRIPTION OF THE PREFERRED EMBODIMENTS

A detailed description is given of preferred embodiments of the present invention, with reference to the accompanying drawings.

First Embodiment

In order to facilitate an understanding of the present invention, a description will first be given of the structure and operation of the image input/output apparatus that divides an image of a single page into tiles and receives and manages the tile-divided image data. Such an image input/output apparatus is usually referred to as a digital copier, and can execute scaling according to the present invention.

The Structure of the Image Input/Output Apparatus

Figure 1:
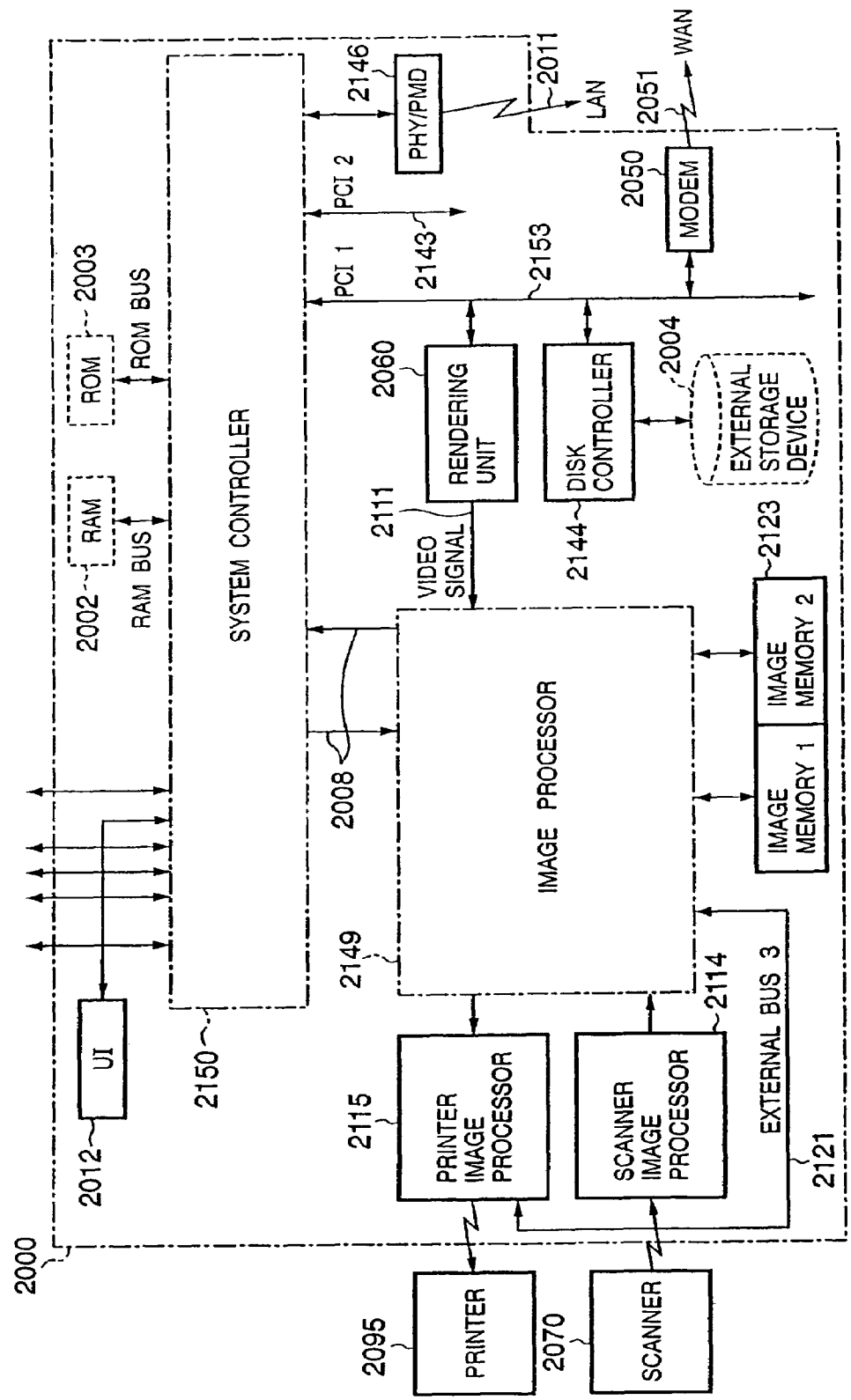
FIG. 1 is a block diagram illustrating the structure of an image input/output apparatus (in this case a digital copier) capable of adapting the present invention.
Figure 2:
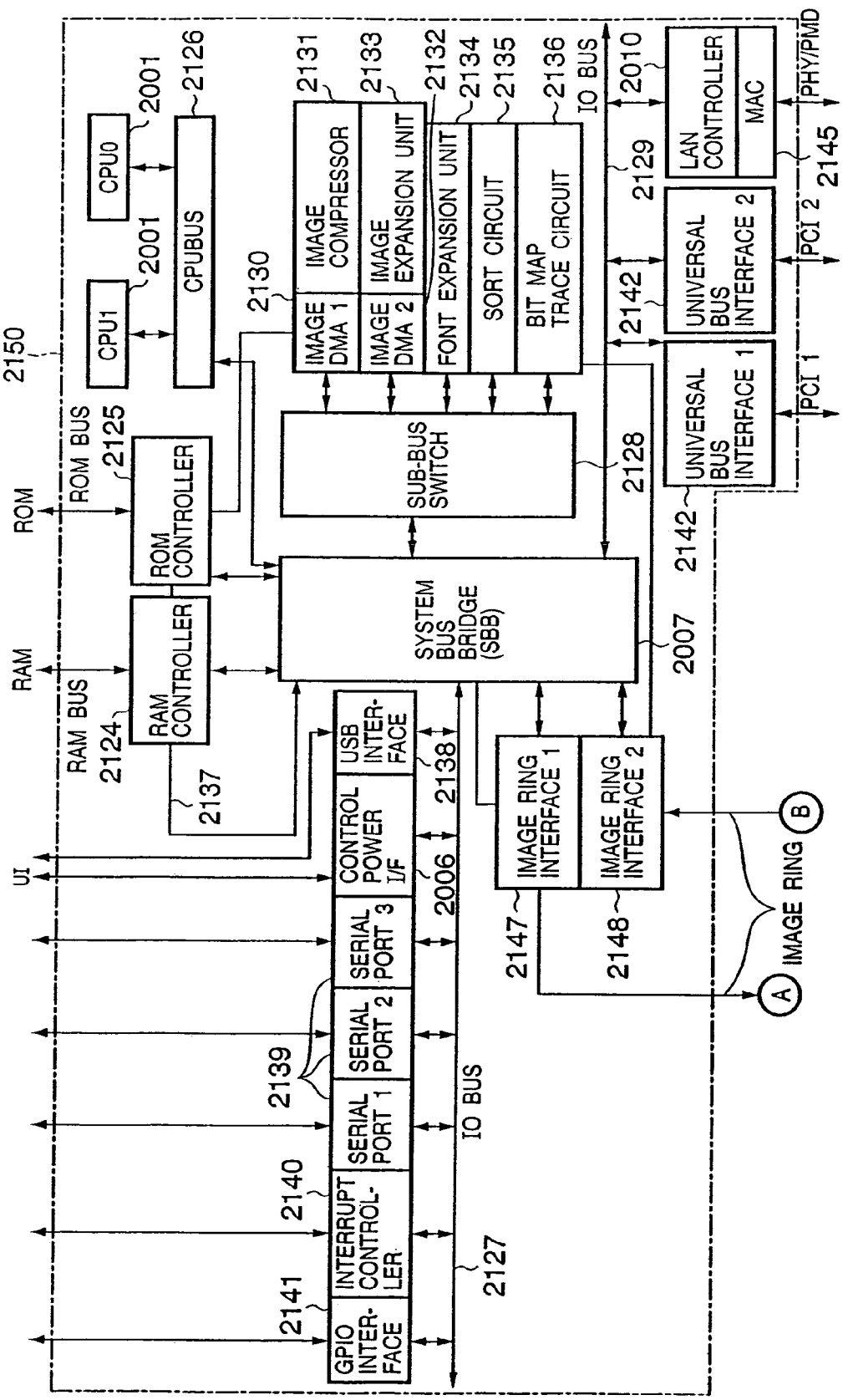
FIG. 2 is a detailed block diagram illustrating the structure of a system controller depicted in FIG. 1.
Figure 3:
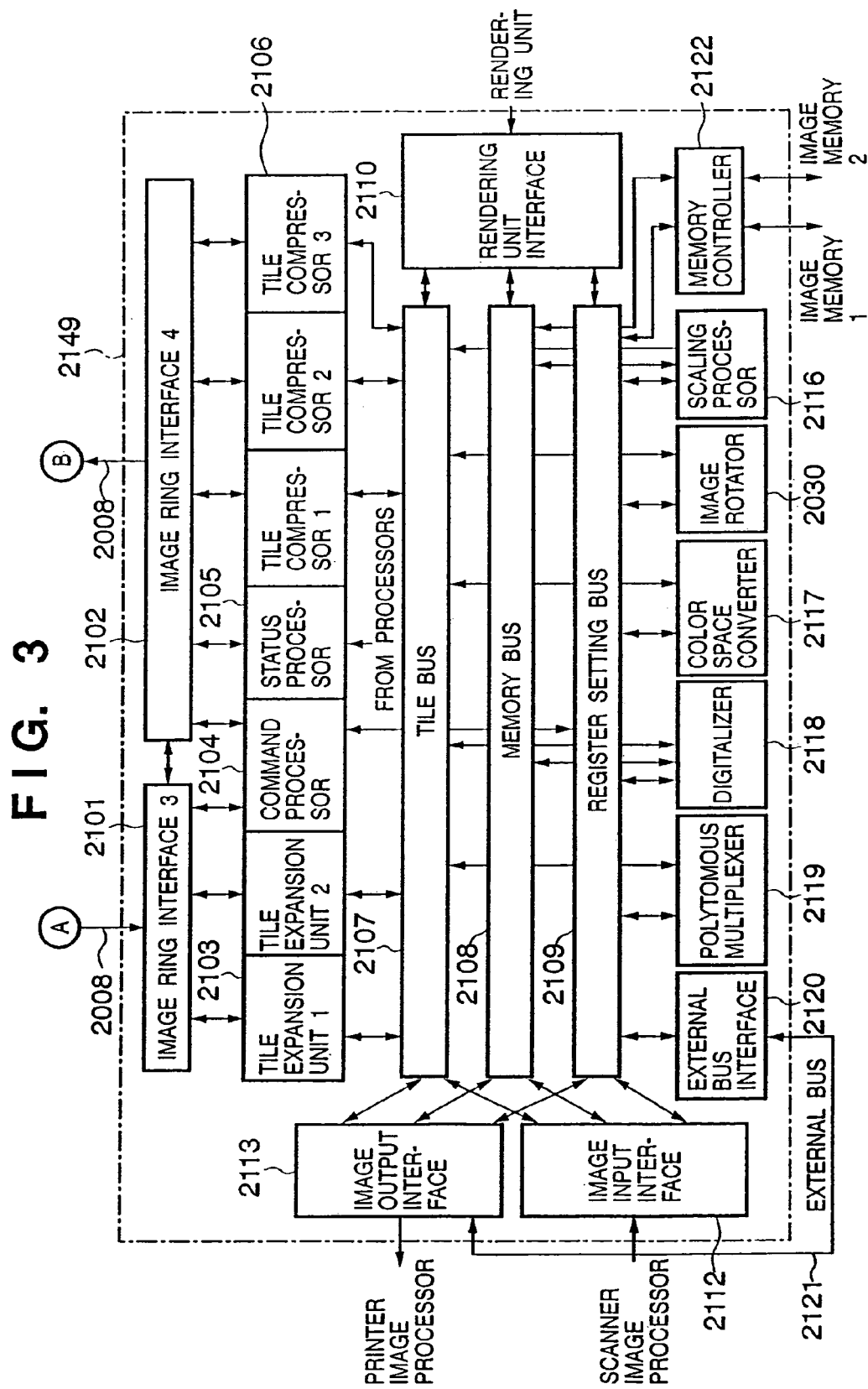
FIG. 3 is a detailed block diagram illustrating the structure of an image processor depicted in FIG. 1.

FIG. 1 is a block diagram illustrating the structure of an image input/output apparatus (in this case a digital copier) capable of adapting the present invention. FIG. 2 is a detailed block diagram illustrating the structure of a system controller depicted in FIG. 1. FIG. 3 is a detailed block diagram illustrating the structure of an image processor depicted in FIG. 1.

In FIGS. 1-3, a controller unit 2000 is connected to a scanner 2070 that is an image input device and to a printer 2095 that is an image output device, and at the same time is connected to a LAN 2001 and a wide area network (WAN) 2051 so as to exercise control over image information and device information input/output and PDL data image rendering.

In FIG. 2, the COU 2001 is a processor that controls the entire system. In the present embodiment, two such processors are used. These two CPUs are connected to a common CPU bus 2126, and further, are connected to a system bus bridge 2007.

The system bus bridge 2007 is a bus switch, to which are connected the CPU bus 2126, a RAM controller 2124, a ROM controller 2125, a first IO bus 2127, a sub-switch 2128, a second IO bus 2129, a first image ring interface (1), and a second ring interface 2148.

The sub switch 2128 is a second bus switch, to which are connected a first image DMA 2130, a second image DMA (2) 2132, a font expansion unit 2134, a sort circuit 2135 and a bit map tracer 2136. The sub switch 2128 adjusts the memory access requests from the DMA and provides connection to the system bus bridge.

In FIG. 1, the RAM 2002 is the system work memory activated by the CPU 2001 as well as the image memory for temporarily storing the image data. The RAM 2002 is controlled by the RAM controller 2124 of FIG. 2. In the present embodiment a direct RDRAM is used.

The ROM 2003 is a boot ROM, in which the system boot program is stored, and is controlled by the ROM controller 2125 of FIG. 2.

In FIG. 2, the first image DMA 2130 is connected to an image expansion unit 2131. The first image DMA 2130 controls the image compressor 2131 based on information set via a register access ring 2137, and reads the uncompressed data in the RAM 2002, compresses it, and then rewrites the data to the RAM 2002 after compression. The present embodiment adopts JPEG as the compression algorithm.

The second image DMA 2132 is connected to an image expansion unit 2133, controls the image compressor 2133 based on information set via the register access ring 2137, reads the compressed data in the RAM 2002, expands it, and then rewrites the data to the RAM 2002 after expansion. The present embodiment adopts JPEG as the expansion algorithm.

A font expansion unit 2134 performs expansion of compressed font data stored in the ROM 2003 or RAM 2002 based on a font code included in the PDL data transferred from an external source via the LAN interface 2010. The present embodiment adopts the FBE algorithm.

The sort circuit 2135 is a circuit that rearranges the order of the objects of the display list generated at the stage at which the PDL data is rendered. The bit map trace circuit 2136 extracts edge information from the bit map data.

The IO bas 2127 is a type of internal IO bus, to which are connected a controller for the standard USB BUS, a USB interface 2138, a universal serial port 2139, an interrupt controller 2140, and a GPIO interface 2141. A bus arbiter (not shown) is included in the IO bus 2127.

A controller I/F 2006 is the interface for the controller (UI) 2012 shown in FIG. 1, and outputs image data to be displayed at the controller 2012 to the controller 2012. In addition, the controller I/F 2006 performs the function of transmitting information input by a user of the system from the controller 2012 to the CPU 2001.

The IO bus 2129 is a type of internal IO bus, to which are connected universal bus interfaces (1, 2) 2142 and a LAN controller 2010. A bus arbiter (not shown) is included in the IO bus 2129.

The universal bus interfaces (1,2) 2142 are composed of two identical bus interfaces, and are a bus bridge that supports the standard IO bus. The present embodiment employs PCI buses 2143, 2153.

In FIG. 1, reference numeral 2004 is a hard disk drive (HDD), which stores system software and image data. The HDD 2004 is connected to one of the PCI buses 2153 via a disk controller 2004.

The LAN controller 2010 of FIG. 2 is connected to a LAN 2011 via a MAC circuit 2145 and a PHY/PMD circuit 2146. A Modem 2050 is connected to a WAN and performs information input/output.

In FIG. 2, a first image ring interface 2147 and a second image ring interface 2148 connect an image ring 2008 that transfers image data at high speed to the system bus bridge 2007, and is a DMA controller that transfers tiled and compressed data between the RAM 2002 and a tile image processor 2149.

The image ring 2008 is formed by combining a pair of unilateral connection routes. As shown in FIG. 3, the image ring 2008 is inside the tile image processor 2149, and is connected via a third image ring interface 2101 and a fourth image ring interface 2102 to tile expansion units (1, 2) 2103, a command processor 2104, a status processor 2105 and tile compressors (1-3) 2106. The present embodiment uses two sets of tile expansion units 2103 and three sets of tile expansion units 2106.

The tile expansion units (1, 2) 2103, in addition to being connected to the third image ring interface 2101, are connected to a tile bus 2107 and are the bus bridge that expands compressed image data input from the image ring and transfers the expanded data to the tile bus 2107. The present embodiment uses JPEG and the pack bit method for the expansion algorithm.

The tile compressors (1-3) 2106, in addition to being connected to the fourth image ring interface 2102, are connected to the tile bus 2107 and are the bus bridge that compresses uncompressed image data input from the tile bus 2107 and transfers the compressed data to the image ring 2008. The present embodiment, as with the tile expansion unit, uses JPEG and the pack bit method for the compression algorithm.

The command processor 2104, in addition to being connected to the image ring interface, is connected to a register setting bus 2109, and writes a register setting request issued by the CPU 2001 and input via the image ring to the appropriate block connected to the register setting bus 2109. In addition, based on a register read request issued by the CPU 2001, the command processor 2104 reads information from the appropriate register via the register setting bus and transfers the information to the image ring interface 2102.

The status processor 2105 monitors the image processor information, generates an interrupt packet for issuing an interrupt to the CPU 2002, and outputs the interrupt packet to the image ring interface 2102.

In addition to the above-described blocks, the following functional blocks are connected to the tile bus 2107: rendering unit interface 2110, image input interface 2112, image output interface 2113, polytomous multiplexer 2119, digitalizer 2118, color space converter 2117, image rotator 2030 and scaling processor 2116.

The rendering portion interface 2110 functions as an interface that inputs a bit map image generated by a rendering unit 2060 to be described later. The rendering unit 2060 and the rendering unit interface 2110 are connected by ordinary video signals 2111. The rendering unit interface 2110, in addition to being connected to the tile bus 2107, is also connected to a memory bus 2108 and the register setting bus 2109. The rendering unit interface 2110 structurally converts input raster images to tile images using a predetermined method set via the register setting bus 2109 and at the same time also synchronizes the clock and outputs tile images to the tile bus 2107.

The image input interface 2112 inputs raster image data that has been correctively image processed by a scanner image processor 2114 to be described later. The image input interface 2112 structurally converts input raster images to tile images using a predetermined method set via the register setting bus 2109 and at the same time also synchronizes the clock and outputs tile images to the tile bus 2107.

The image output interface 2113 inputs tile image data (data packets) from the tile bus and structurally converts the input tile images to raster images, and at the same time also updates the clock rate and outputs the raster image to the printer image processor 2115.

The image rotator 2030 rotates the image data. The scaling (resolution conversion) processor 2116 changes the resolution of the image. The scaling processor 2116 is the main elements of the present embodiment, a detailed description of which will be given later. The color space converter 2117 carries out color and gray scale image color space conversion. The digitalizer 2118 digitalizes polytomous (color and gray scale) images. The polytomous multiplexer 2119 converts digital images into polytomous data.

An external bus interface 2120 is a bus bridge that converts and outputs write requests and read requests issued from the CPU 2001 via the image ring interfaces (1) 2147 and (3) 2101, the command processor 2104 and the register setting bus 2109 to the external bus 2121. The external bus 2121 in the present embodiment is connected to the printer image processor 2115 and the scanner image processor 2114.

The memory controller 2122 is connected to the memory bus 2108. The memory controller 2112 reads and writes image data to and from the image memory (1, 2) 2123 according to requests from the image processors using preset address divisions, and revises these as necessary. The present embodiment uses an SDRAM for the image memory.

In FIG. 1, the scanner image processor 2114 correctively image processes the image data scanned by the scanner 2070 that is the image input device.

At the printer image processor printer image processor 2115, corrective image processing is performed for the purpose of printing output and the results thereof are output to the printer 2095. The rendering unit 2060 renders the PDKL code or intermediate display list as a bit map image.

The Unit Structure of the Image Input/Output Apparatus

The controller unit 2000 of the image input/output apparatus of FIG. 1 is composed of a single controller board. A system controller 2150 and an image processor 2149 are each mounted on the controller board as an IC chip. Data transfer between these two IC chips is carried out by packets to be described later via the image ring.

Similarly, the image memories (1, 2) 2123 are independently mounted on the controller board as external memory for the image processor 2149. In the present embodiment, these memories are in the form of cards that can be detachably inserted into slots on the controller board, and so can be replaced with other memory cards having different capacities as necessary. It should be noted that the image memory 2123 is not necessarily limited to a card but may also be in the form of an IC chip which can be directly imbedded in the controller board.

The Structure of the Network System

Figure 4:
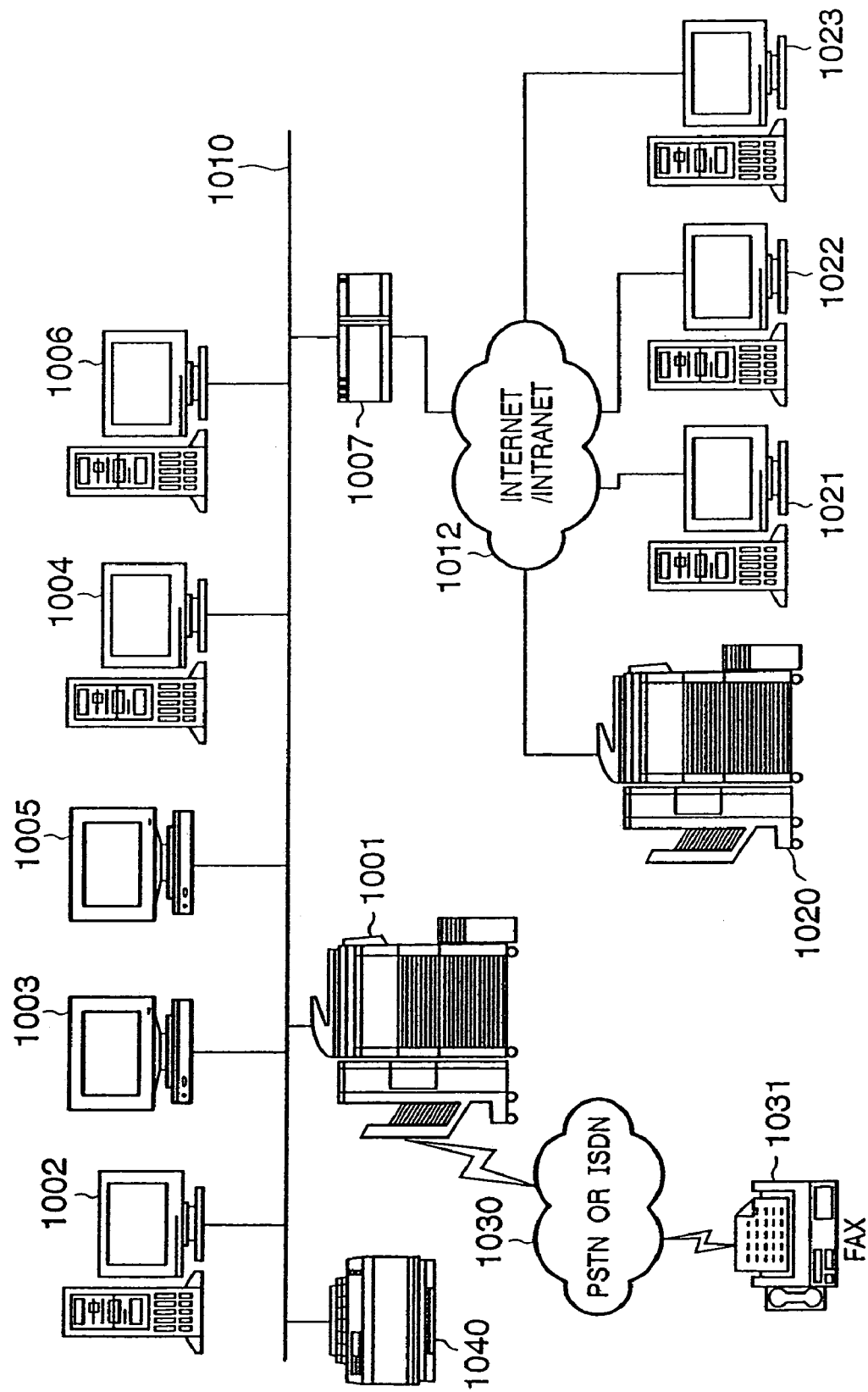
FIG. 4 is a diagram illustrating the entire network system structure, including the image input/output apparatus of FIG. 1.

FIG. 4 is a diagram illustrating the entire network system structure, including the image input/output apparatus of FIG. 1.

In FIG. 4, reference numeral 1001 is the image input/output apparatus of FIG. 1, and is composed of a scanner and a printer, with an image read from the scanner being fed into a local area network (hereinafter LAN) 1010 and the image received from the LAN 1010 capable of being printed out by the printer. In addition, the image read from the scanner may be transmitted by a FAX means not shown in the diagram to a PSTN or an ISDN 1030, with the image received from the PSTN or ISDN 1030 capable of being printed out by the printer. Reference numeral 1002 denotes a database server that manages a binary image or polytomous image read by the image input/output apparatus 1001 as a database.

Reference numeral 1003 denotes a database client of the database server 1002, capable of inspecting and/or searching the image data stored in the database server 1002.

Reference numeral 1004 denotes an electronic mail server, capable of receiving an image read by the image input/output apparatus 1002 as an attachment to electronic mail. Reference numeral 1005 denotes an electronic mail client, capable of inspecting electronic mail received by the electronic mail server 1004 and of transmitting electronic mail via the electronic mail server 1004.

Reference numeral 1006 denotes a web server that provides HTML documents to the LAN, capable of printing out HTML documents provided by the web server from the image input/output apparatus 1001.

Reference numeral 1007 denotes a router that links the LAN 1010 to an internet/intranet 1012. The above-described database server 1002, web server 1006, electronic mail server 1004 image input/output apparatus 1001 and other, similar apparatuses and devices are linked to the internet/intranet 1012 as indicated by reference numerals 1020, 1021, 1022 and 1023, respectively.

At the same time, the image input/output apparatus 1001 is capable of transmitting and receiving faxes to and from a FAX machine 1031 via the PSTN or ISDN 1030.

A printer 1040 is linked to the LAN as well, so an image read by the image input/output apparatus 1001 can be printed out.

Packet Structure

Figure 5:
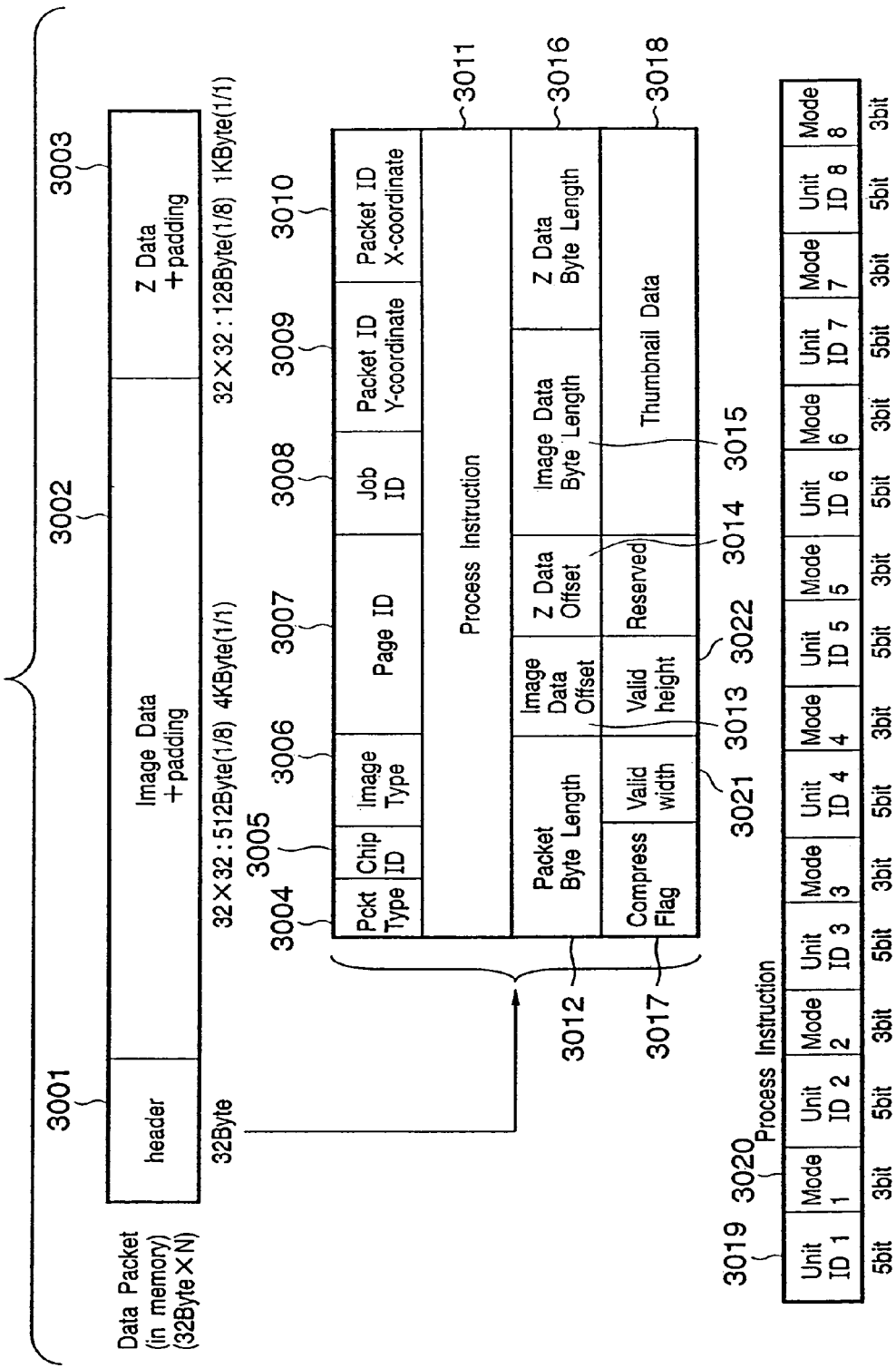
FIG. 5 is a diagram illustrating a data packet used in the image input/output apparatus of FIG. 1.

Next, a description will be given of the format of the packets used in the image data processing of the present embodiment. The controller unit 2000 of the present embodiment transmits image data, commands from the CPU 2001 and interrupt information issued by the image processors (2116, 2117, 2118, 2119 and 2030) as packets. There are several types of packets, as follows:

(1) Data Packet (See FIG. 5)

FIG. 5 is a diagram illustrating a data packet used in the image input/output apparatus of FIG. 1.

The data packet shown in FIG. 5 consists of tile unit image data 3002 a divided among a predetermined number of pixels (32×32 in the present embodiment), header information 3001 that contains control information to be described later, and image added information 3003.

A description is given of the information included in the header information 3001.

PcktType 3004 identifies the packet type. A repeat flag is included in this PcktType 3004, so where image data 3002 is the same as the image data of the data packet transmitted one packet previously, this repeat flag is set.

ChipID3005 indicates the Chip to which the packet is to be transmitted. ImageType3006 indicates the image data type. PageID3007 indicates the page number of the image data. JobID3008 contains a job IMAGE DATA for managing image processing by software. PacketIDY3009 and PaacketIDX3010 indicate to which tiles at which positions of the image overall does the image data included in (or designated by) the packet correspond. The position of the tiles is determined by a combination of a Y-axis direction (PacketIDY3009) and an X-axis direction (PaacketIDX3010), and are expressed as YnXn.

The data packets may contain image data that is compressed or image data that is not compressed. The present embodiment uses JPEG for the compression algorithm for a polytomous color (including polytomous gray scale) image and pack bits for a digital image. The distinction between compressed and uncompressed is indicated by a CompressFlag3017 to be described later.

Process Instructions 3011 is composed of processing units 1-8, which are sets of 5-bit UnitID3019 and 3-bit Mode3020, the processing units being processed in order from (lower) left to right. The Process Instruction overall is shifted 8 bits to the left so that the processed Unit IMAGE DATA and mode are discarded and the next-to-be-processed UnitID and Mode may be positioned at the left. A maximum of 8 bits of a combination of the UnitID3019 and the Mode3020 are contained in the Process Instruction3011. The UnitID3019 designates he image data processor and the Mode3020 designates the operating modes of the image data processors. By so doing, it is possible to designate continuous processing by a maximum of eight image data processors for the image data included in (or designated by) a single image data packet.

The PacketByteLength 3012 indicates the total number of bytes in the packet. The ImageDataByteLength 3015 indicates the number of bytes in the image. The ZdataByteLength 3016 indicates the number of bytes in the image added information. The ImageDataOffset 3013, ZdataOffset 3014 indicate the offset from the start of the packet of the image data and the image added information, respectively.

Figure 6:
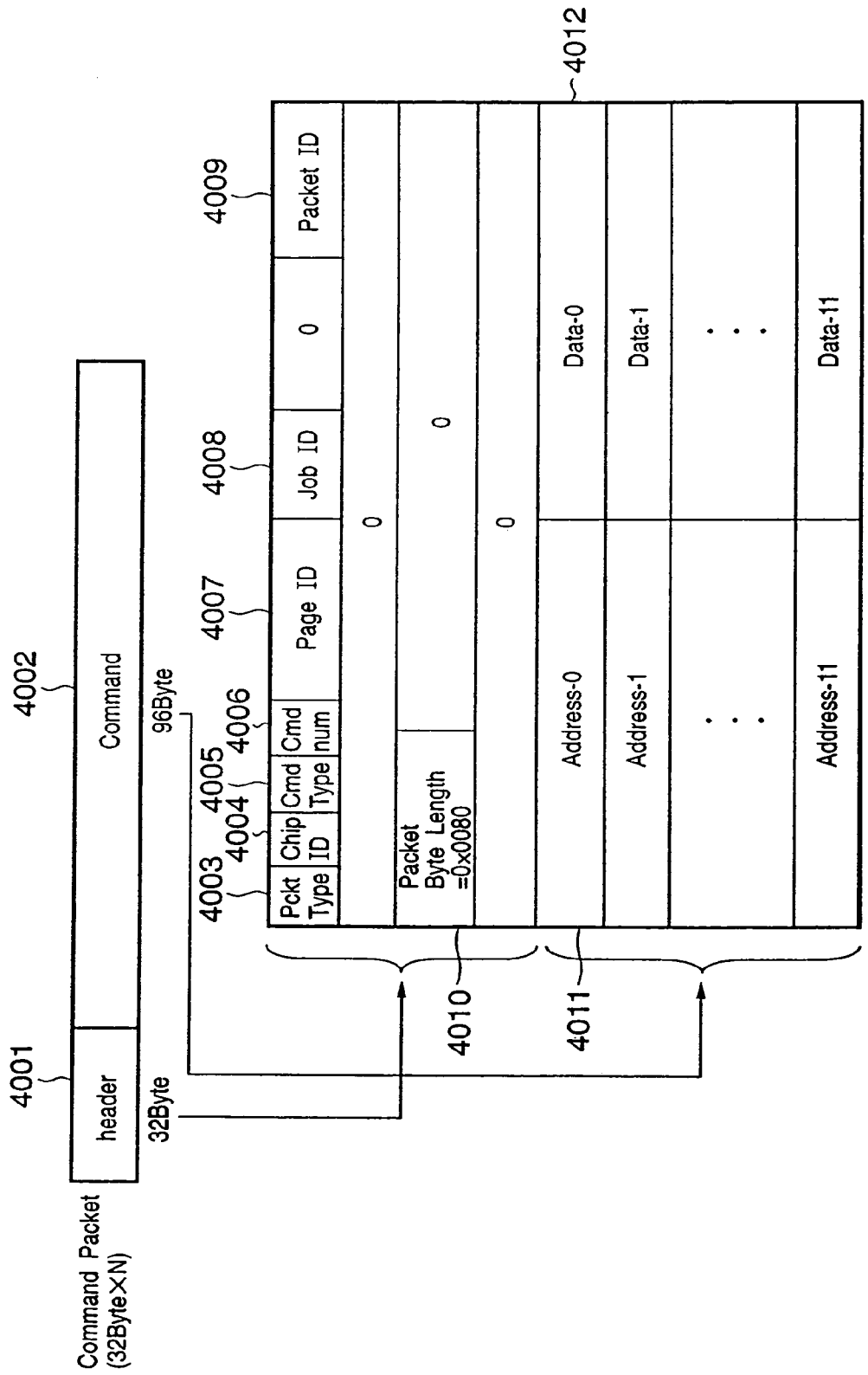
FIG. 6 is a diagram illustrating a command packet used in the image input/output apparatus of FIG. 1.

(2) Command Packet (See FIG. 6)

FIG. 6 is a diagram illustrating a command packet used in the image input/output apparatus of FIG. 1.

The command packet shown in FIG. 6 is for accessing the register setting bus 2109. Using the command packet also allows the CPU 2001 to access the image memories (1, 2) 2123. The command packet is composed of a header 4001 and a command (packet data) 4002.

The ChipID4004 in the header 4001 contains an IMAGE DATA that indicates the image processor 2149 that is the destination of the command packet.

The PageID4007 and JobID4008 contain the page ID and job ID for software management, respectively. The Packet ID4009 is expressed in a single dimension, using only the Data Packet x-coordinate. The PacketByteLength 4010 is fixed at 1288 Bytes.

The packet data 4200 can store a maximum of 12 commands, each consisting of an address 4011 and a data 4012. Whether the command is a "read" or a "write" is indicated by CmdType4005, while the number of commands is indicated by Cmdnum4006.

Figure 7:
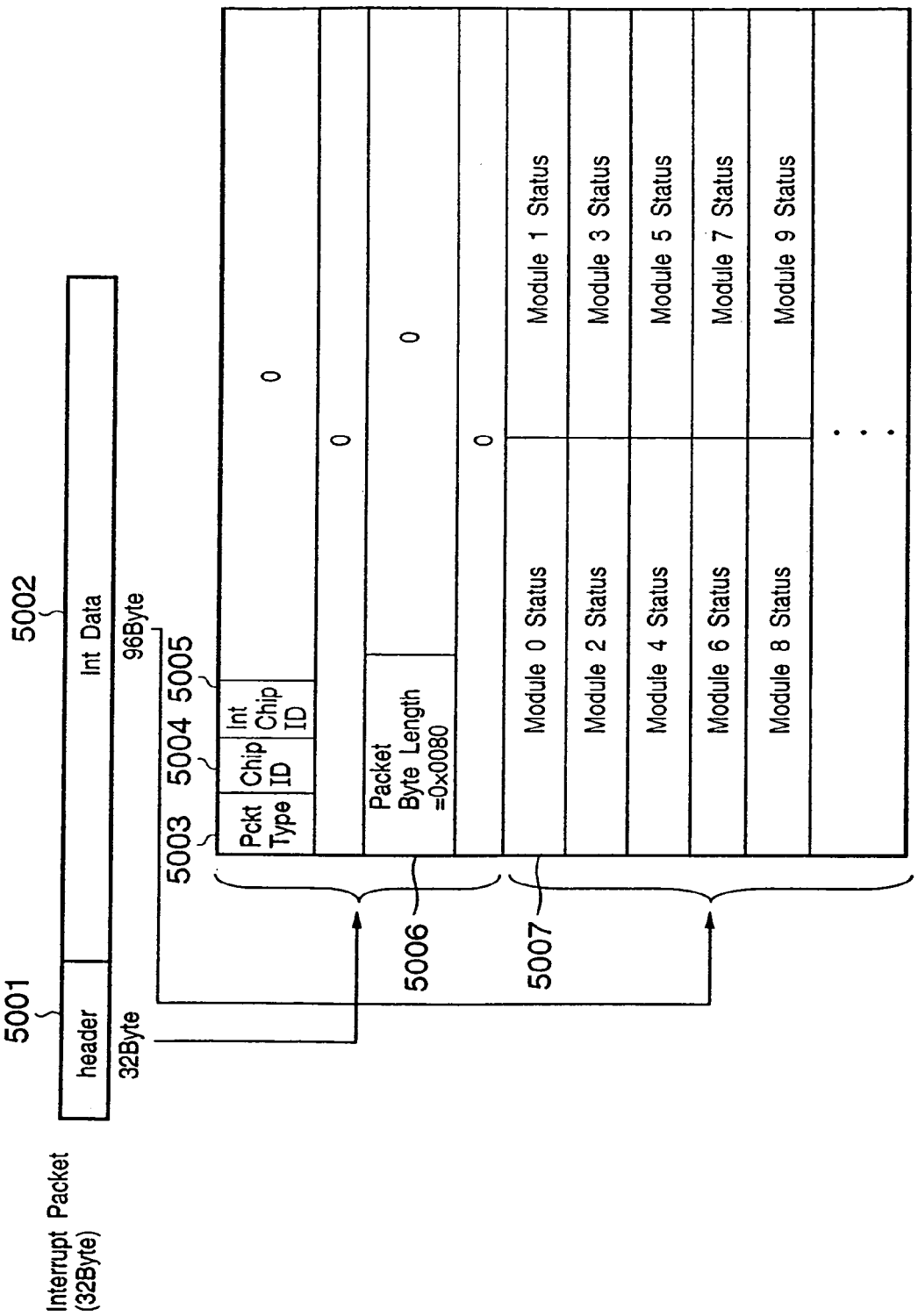
FIG. 7 is a diagram illustrating an interrupt packet used in the image input/output apparatus of FIG. 1.

(3) Interrupt Packet (See FIG. 7)

FIG. 7 is a diagram illustrating an interrupt packet used in the image input/output apparatus of FIG. 1.

The interrupt packet shown in FIG. 7 is composed of a header 5001 and an interrupter (packet data) 5002, and is used send an interrupt from the image processor 2149 to the CPU 2001.

The PacketByteLength 5006 is fixed at 128 bytes.

The packet data contains status information 5007 on each of the internal modules of the image processor 2149. The status processor 2105 collects information on the status of the modules inside the image processor 2149, and can send the collected status information to the system controller 2150 in a bunch.

The ChipID5004 contains an ID indicating the system controller 2150 that is the destination of the interrupt packet. The IntChipID5005 contains an ID that indicates the image processor 2149 that is the source of the interrupt packet.

The Composition of the Packet Table

Figure 8:
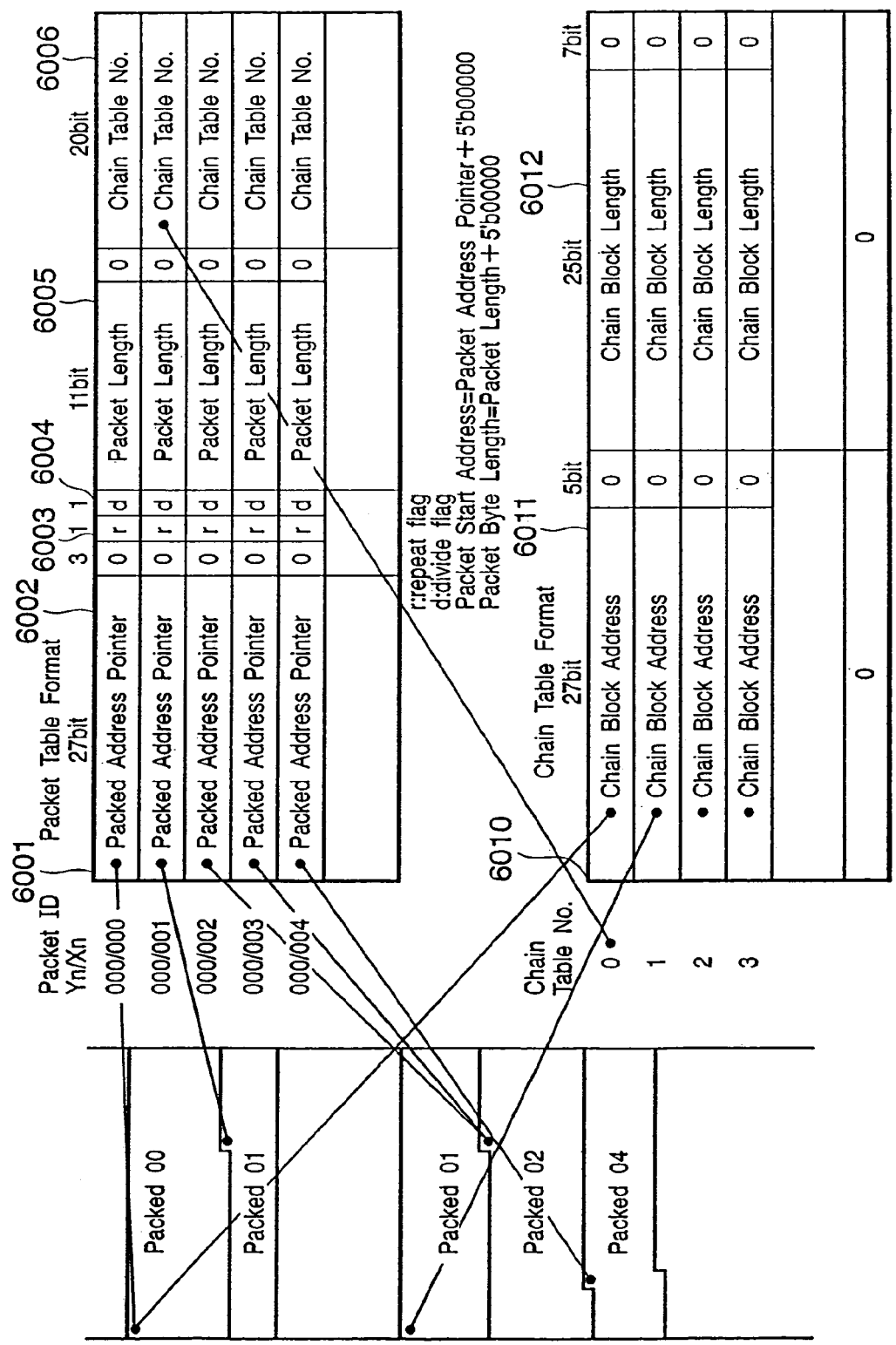
FIG. 8 is a diagram illustrating a packet table.

FIG. 8 is a diagram illustrating a packet table.

The packets described above are managed by a table like the packet table 6001 shown in FIG. 8.

The packet table 6001 shown in FIG. 8 is used together with the image data, and is managed by the RAM 2002 when the image data is rendered in the RAM 2002 shown in FIG. 1. Similarly, when the image data is stored in the external memory apparatus 2004, the packet table is also simultaneously stored in the external memory apparatus 2004. When the image data stored in the external memory apparatus 2004 is once again rendered in the RAM 2002, the packet table 6001 is also simultaneously read by the RAM 2002 and the address information is rewritten according to the address information of the data being rendered.

Adding 5 zeros to the pointer and length values shown in the packet table 6001 yields the Packet Start Address 6002 and the Packet Byte Length 6005.

It should be noted that the packet table 6001 and the chain table 6010 are not divided.

The packet table 6001 is continuously aligned in the scanning direction, in the order Yn/Xn=000/000, 000/001, 000/002 . . . and so on. Each entry in the packet table 6001 designates a unique tile. In addition, a succeeding Yn/Xmax entry becomes Yn+1/X0.

It should be noted that if the data of a given packet is identical to the data of the preceding packet, then that packet is not stored in the memory and the entry stored in the packet table 6001 is the same Packet Address Pointer and Packet Length as the preceding entry.

In short, a single packet data indicates two table entries. In such a case, the Repeat Flag 6003 of the second of the two table entries is set.

Similarly, if a packet is segmented into a plurality of segments by the chain DMA, then a Divide Flag is set and the a chain table number 6006 of the chain block at the start of the packet is set.

Each chain table entry 6010 is composed of a Chain Block Address 6011 and a Chain Block Length 6012, with a "0" being stored in the last chain table entry for both the Chain Block Address 6011 and the Chain Block Length 6012.

Image Input by Data Packet

Next, a description will be given of an image input process, whereby image data read by the scanner 2070 is divided, data packets are generated from the resulting tile images and the generated data packets are stored in the RAM 2002, with reference to FIGS. 1-3 and FIG. 9.

Figure 9:
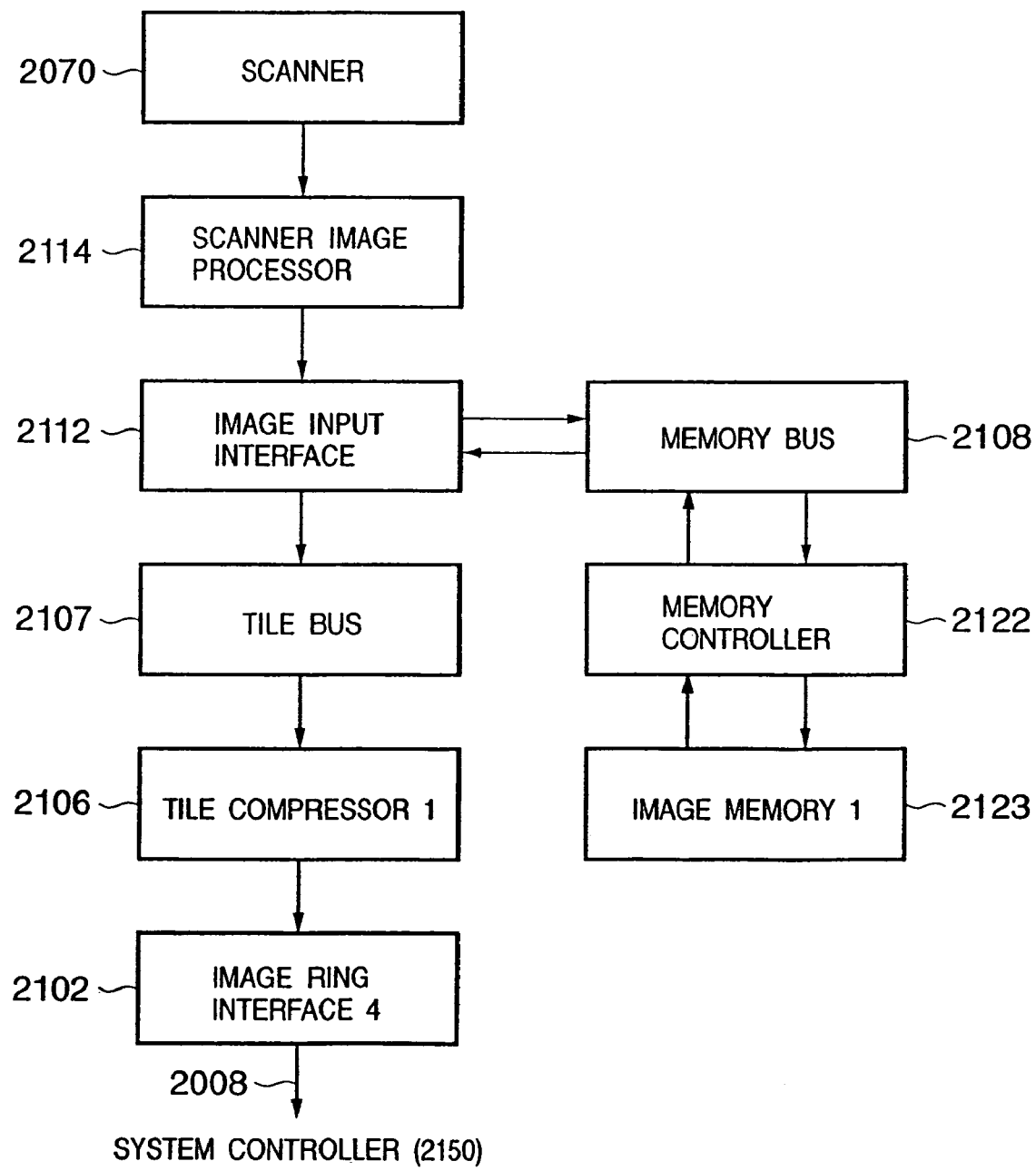
FIG. 9 is a flow chart showing data flow and processing steps between blocks related to image input/output processing.

FIG. 9 is a flow chart showing data flow and processing steps between blocks related to image input/output processing.

As shown in FIG. 9, first, an image is read by the scanner 2070. The image data so read is then transmitted sequentially as raster data to the scanner image processor 2114. The scanner image processor 2114 performs image processing needed for the raster data sequence and transmits the processed image data to the image input interface 2112. The image input interface 2112 then transmits the image data received in raster data sequence to the memory controller 2122 via the memory bus 2108.

The memory controller 2112 is rendered in raster form to the image memory (1) 2123. The image memory (1) 2123 has a minimum capacity of 32 lines of raster data. When 32 lines of image data are rendered in the image memory (1) 2123, the image input interface 2112 begins to read the data in units of tile images composed of 32 pixels×32 lines. The reading of the tile images is carried out via the memory controller 2122 and the memory bus 2108.

The image input interface 2112 adds the header 3001 and the Z data 3003 to the tile image 3002 to generate a data packet with a format like that shown in FIG. 3. It should be noted that route information for storing the image data in the RAM 2002 is described in the Process instruction 3001.

Next, the image input interface 2112 requests the tile bus 2107 to make a connection to the first tile compressor (1) 2106. When the tile bus 2107 connects the image input interface 2112 to the first tile compressor (1) 2106, the data packet is transmitted to the first tile compressor (1) 2106.

The first tile compressor (1) 2106 JPEG compresses the tile images 3002 of the data packet, and transits the compressed data packet to the fourth image ring interface (4) 2102 via the image ring 2008. The fourth image ring interface (4) 2102 then transmits the data packet to the system controller 2150 via the image ring 2008. The system controller 2150 then stores the data packet in the RAM 2002.

As thus described, a data packet is generated from image data read by the scanner, after which the data is compressed and stored in the RAM 2002 of the system controller 2150.

Figure 10:
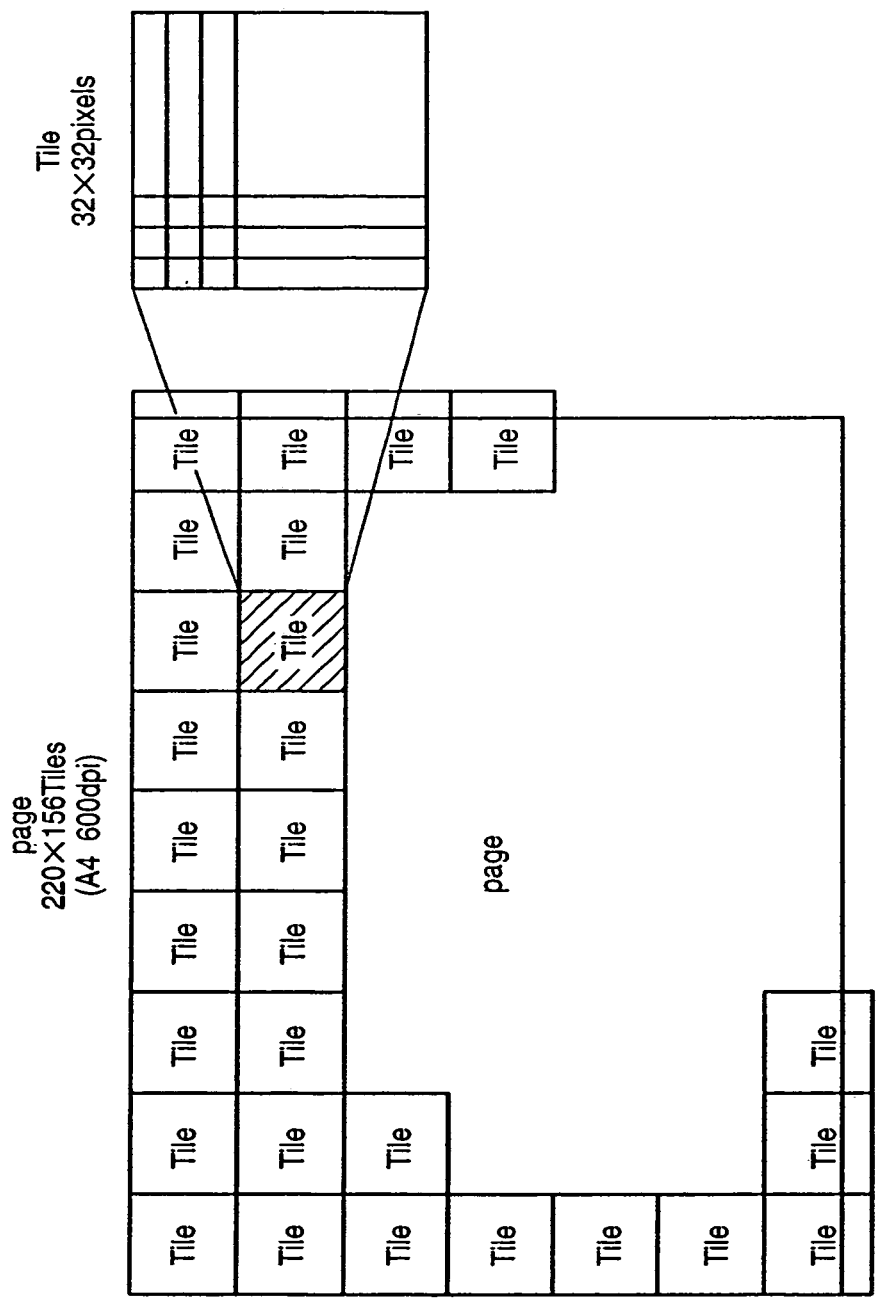
FIG. 10 is a diagram showing a sample division among tile images of a single page of image data as read by a scanner.

FIG. 10 is a diagram showing a sample division among tile images of a single page of image data as read by the scanner 2070. As shown in FIG. 8, a single page is divided into a plurality of tiles, with tile image data being generated for each tile. The example shown in FIG. 8 is one in which a single A4-size page (210×297 mm) is read by the scanner 2070 at a resolution of 600×600 dpi. With 1 inch equaling 25.4 mm, the number of pixels in the image is 4961 vertically and 7016 horizontally. Divided into tiles of 32×32 pixels, an A4-size page would generate 34,320 pieces of tile image data.

Image Output by Data Packet

Figure 11:
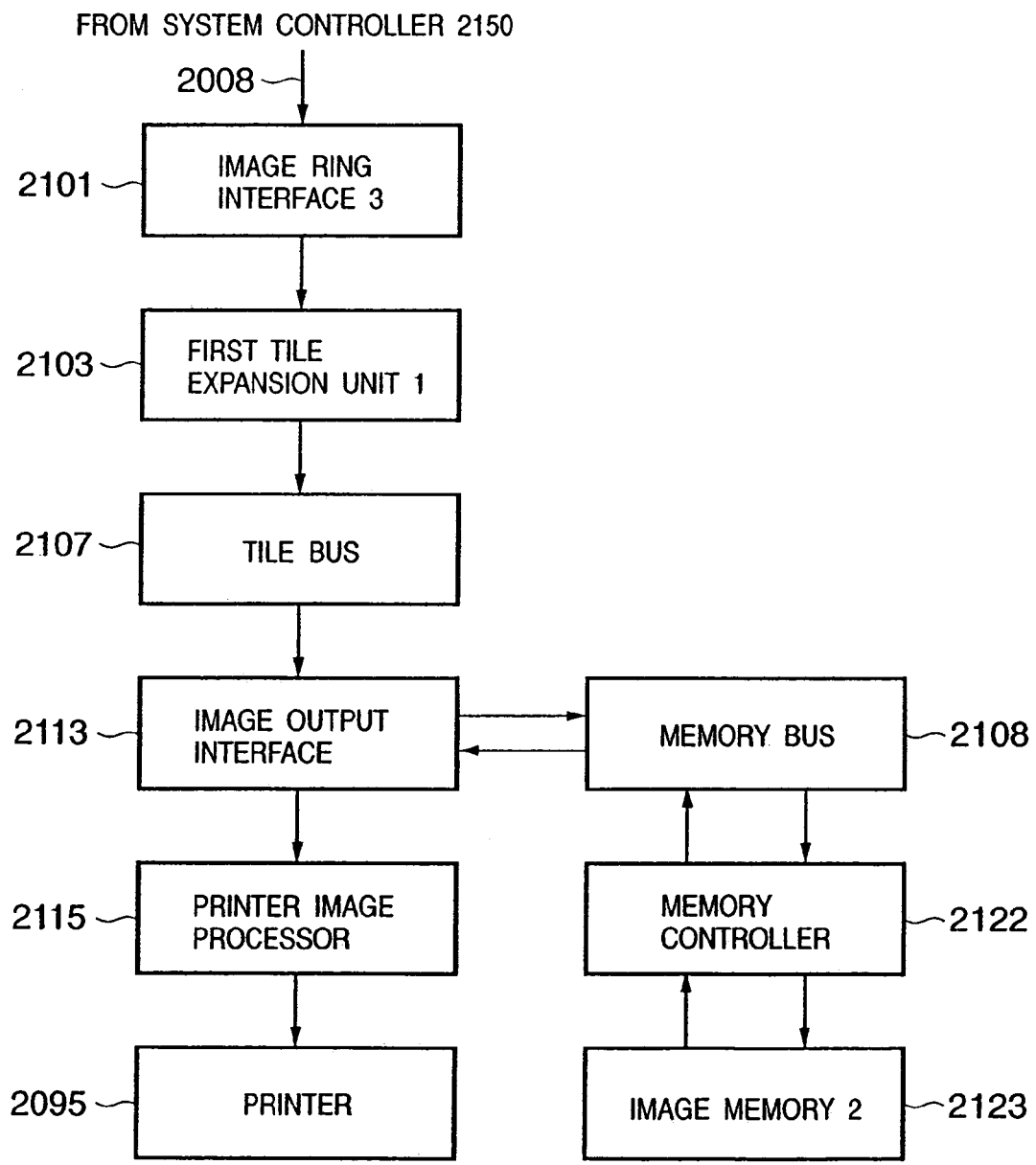
FIG. 11 is a flow chart showing data flow and processing steps between blocks related to image output processing.

To continue, a description is given of a process of returning the data packets stored in the RAM 2002 of the system controller 2150 to their original form and printing the resulting image via the printer 2095, with reference to FIG. 11 as well as FIGS. 1-3.

FIG. 11 is a flow chart showing data flow and processing steps between blocks related to image output processing.

As shown in FIG. 11, first, a data packet output from the system controller 2150 is input to the third image ring interface (3) 2101 via the image ring 2008. It should be noted that route information for outputting the RAM 2002 image data via the printer 2095 is contained in the ProcesInstruction3011.

The third image ring interface (3) 2101 selects the first tile expansion unit (1) 2103 and transmits the image tile data. The selection of the first tile expansion unit (1) 2103 is carried out according to the ProcessInstruction3011 of the packet format.

The first tile expansion unit (1) 2103 JPEG expands the tile image of the data packet, converting it to uncompressed image data. Next, the first tile expansion unit (1) 2103 requests the tile bus 2107 to make a connection to the image output interface 2113. Thereafter, the first tile expansion unit (1) 2103 is connected to the image output interface 2113 and transmits the image data thereto.

The image output interface 2113 takes the received data packet and transmits the tile images of the data packet to the memory controller 2122 via the memory bus 2108. The memory controller 2122 then renders the transmitted tile image to the second image memory (2) 2123 in tile units, although the data is rendered inside the second image memory (2) 2123 as raster data.

When all the raster data has been developed as 32-line raster data to be output by the printer 2095, the image output interface starts reading the data in raster sequence. This reading of the raster data is carried out via the memory controller 2122 and the memory bus 2108. Once the image output interface 2113 has read all the data in raster sequence, it transmits the data to printer image processor 2115. The printer 2095 then prints based on the received raster data.

The Image Input/Output process of the Image Input/Output Apparatus

By combining the above-described image input and image output processes, the present embodiment makes it possible to copy the image by using a scanner and a printer simultaneously.

In addition, by storing the RAM 2002 data packets in the external memory apparatus 2004 after the above-described input processing, the images can be filed.

In addition, by converting the RAM 2002 data packets to a predetermined format and outputting them to a LAN or a WAN, it is possible to transmit images using a predetermined protocol such as e-mail attachment, etc., to transmit images by facsimiles.

In addition, by inputting tile images from the rendering unit 2060 that performs rendering based on data received from an external apparatus in the image output process described above, it is possible to print.

In addition, it is possible to store the data packets once again in the RAM 2002 after processing of the RAM 2002 data packets by the image processor 2149, and it is also possible to execute image processing using this processing route in combination with the processes described above as necessary.

As foregoing describes the major processes that can be executed by the image input/output apparatus of the present embodiment. As can be appreciated by those of ordinary skill in the art, the ability to process images in data packets allows the image processor 2149 to hold the processing blocks in units of tiles, and accordingly, the image processor 2149 can mix image data relating to a plurality of processes. In other words, the image input/output apparatus of the present embodiment can execute a plurality of image processes for image data simultaneously.

Scaling Using Data Packets

Next, a detailed description is given of scaling using the data packets of the present embodiment, with reference to FIG. 12 and FIGS. 1-3.

The following description uses a case in which a data packet (tile image) stored in the RAM 2002 is expanded 150% by the scaling processor 2116 and then once again stored in the RAM 2002.

Figure 12:
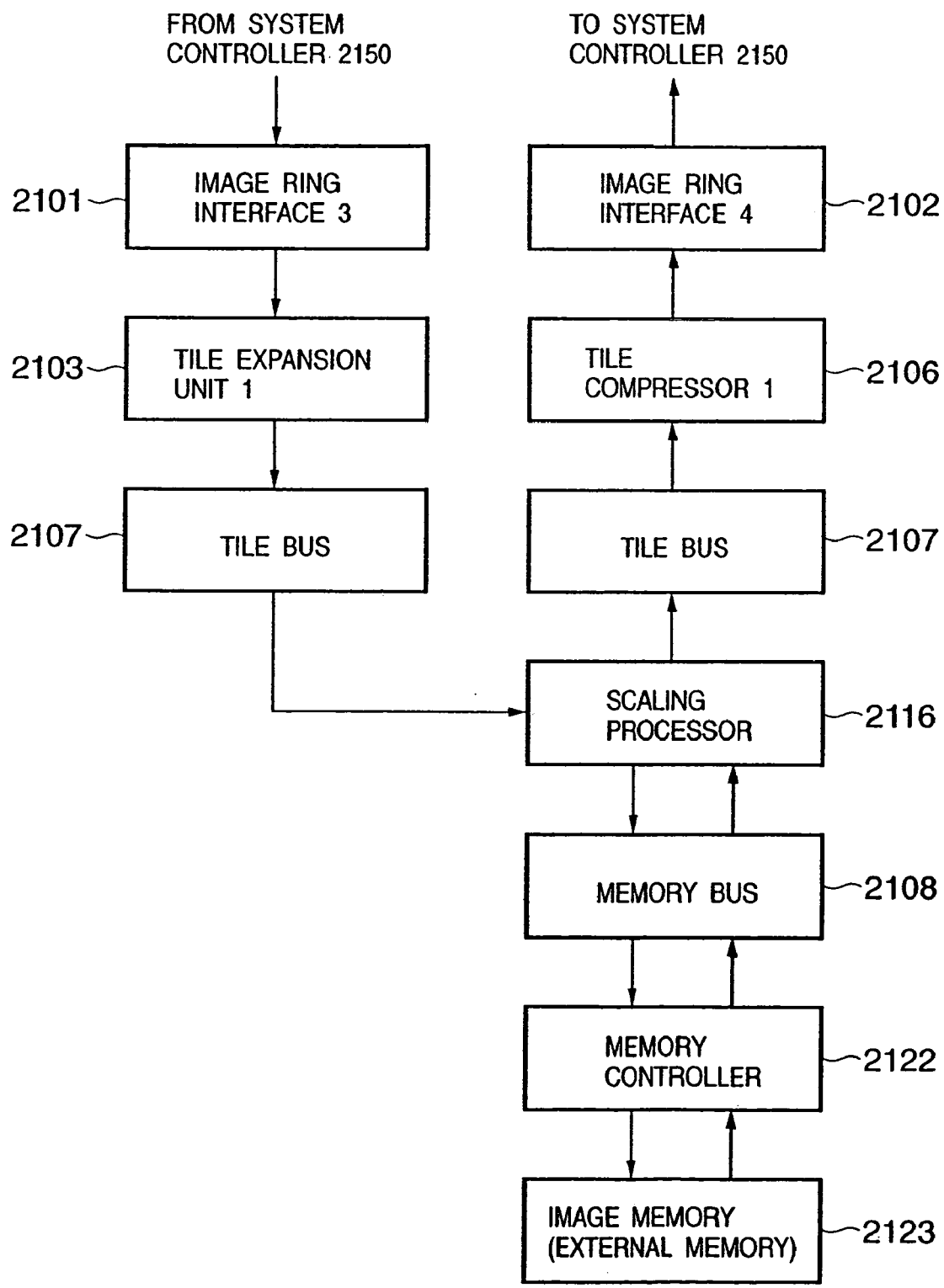
FIG. 12 is a flow chart showing data flow and processing steps between blocks related to scaling on a data packet.

FIG. 12 is a flow chart showing data flow and processing steps between blocks related to scaling on a data packet.

First, the system controller 2150 reads the data packet from the RAM 2002 and transmits the data packet to the image processor 2149 via the third image ring interface (3) 2147. The ProcessInstructions3011 of the data packet contains data for designating the following sequence of processes: first tile expansion unit (1) 2103→expansion to 150% by scaling processor 2116→compression at first tile compressor (1) 2016→storage in RAM 2002. More specifically, the tile expansion unit 2103 ID is stored in the UnitID1, the scaling processor 2116 ID is stored in the UnitID2, the first tile compressor (1) 2016 ID is stored in the UnitID3, and the RAM 2002 ID is stored in the UnitID4. Values corresponding to processes performed by the processors are stored in Mode1 through Mode3. In the present embodiment, nothing is stored in Mode2 because the 150% expansion performed by the scaling processor 2116 is designated at the register interface.

Next, the data packet output from the system controller 2150 is input to the third image ring interface (3) 2101 via the image ring 2008. The third image ring interface (3) 2101 selects the first tile expansion unit (1) 2103 and transmits the data packet. The selection of the first tile expansion unit (1) 2103 is carried out according to the Process Instructions 3011 of the packet format shown in FIG. 5.

The first tile expansion unit (1) 2103 JPEG expands the transmitted data packet. Then, the first tile expansion unit (1) 2103 requests the tile bus 2107 to make a connection to the scaling processor 2116. When the first tile expansion unit (1) 2103 is connected to the scaling processor 2116 via the tile bus 2107 the data packet is transmitted to the scaling processor 2116.

Figure 13:
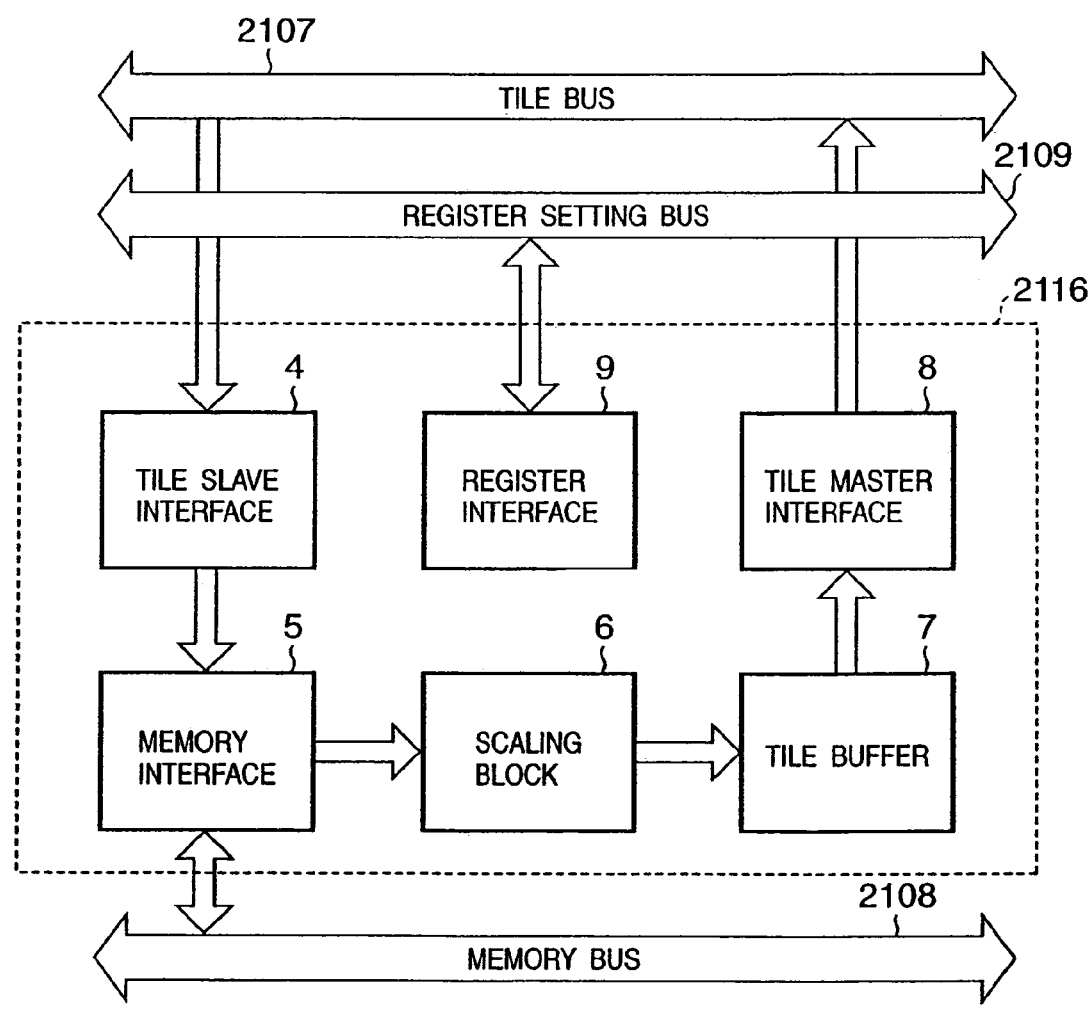
FIG. 13 is a diagram showing the structure of a scaling processor according to first, second and third embodiments of the present invention.

FIG. 13 is a diagram showing the structure of a scaling processor according to first, second and third embodiments of the present invention.

Reference numeral 2116 denotes the scaling processor, which uses first and second image memories (1, 2) 2123 provided outside the IC chip that comprises the scaling processor 2116 to execute scaling. Hereinafter, when describing the internal processes of the scaling processor 2116, the first and second image memories (1, 2) are called external memory 2123.

In FIG. 13, reference numeral 4 denotes the tile slave interface, and is the interface for receiving the data packet from the first tile expansion unit (1) 2103 via the tile bus 2107. Reference numeral 5 denotes the memory interface, and is the interface that renders the tile data received by the tile slave interface 4 as raster data in the external memory and reads from the raster rendered memory the tile data required by a scaling block to be described later. Reference numeral 6 denotes a scaling block, and actually carries out the scaling operation. Reference numeral 7 denotes is a tile buffer, and stores 1 tile of scaled tile data. Reference numeral 8 denotes a tile master interface, and outputs scaled tile data to the first tile compressor (1) 2180 via the tile bus 2107. Reference numeral 9 denotes the register interface for setting the scaling rate and filter at the scaling block 6.

In the scaling processor 2116 described above, a data packet is input to the tile slave interface 4. The tile slave interface 4 analyzes the contents of the header of the inputted data packet. More specifically, the tile slave interface 4 checks the PageID3007 and JobID3008 included in the data packet header and confirms the validity of the data, and moreover checks the position of the data packet in the overall image using the PacketIDY3009 and PacketIDX3010. By this time ProcessInstruction3011 has already been shifted 8 bits by the tile expansion unit 2103, with UnitID2 and Mode2 becoming UnitID1 and Mode1, respectively. Tile data is then output to the memory interface 5 together with position information, and the memory interface 5 renders the tile data in the held external memory 2123.

The scaling block 6 then expands the tile data input via the memory interface 5 150%. A detailed description of this process is given later.

The scaled tile data is fed in succession to the tile master interface 8 via the tile buffer 7. The tile master interface 8 then writes the valid pixel range information (the valid width 3021 and the valid height 3022 of the data packet shown in FIG. 3) to the header based on information concerning the length of the data sent from the scaling block 6. More specifically, the tile master interface 8 writes "32" and "32" to the valid width 3021 and the validheight3022 for the valid pixel range information.

Thereafter, the tile master interface 8 generates a new data packet from the tile data and the headers corresponding to the respective tile data. The process Instructions 3011 is shifted 8 bits, the first tile compressor (1) 2106 ID is written in the UnitID1 and the value of Mode2 describing the tile compressor process is shifted to Mode1. Similarly, the Mode and UnitID below UnitID2 also undergo an 8-bit shift, although in the present example the compressor performs the final process and so ultimately nothing is stored.

Next, the tile master interface 8 requests that tile bus 2107 to make a connection to the first tile compressor (1) 2106, which corresponds to the UnitID1 after the shift. Thereafter, the tile master interface 8 is connected to the first tile compressor (1) 2106 by the tile bus 2107 and the data packet is transmitted to the first tile compressor (1) 2106.

The first tile compressor (1) 2106 JPEG compresses the data packet and transmits the JPEG-compressed data packet to the image ring interface 2102. The image ring interface 2102 then transfers the JPEG-compressed data packet to the system controller 2150 via the image ring 2008. The system controller 2150 stores the tile data of the data packet transmitted from the image ring interface 2102 in the RAM 2002, thus completing one processing cycle.

Detailed Description of Scaling

Figure 14:
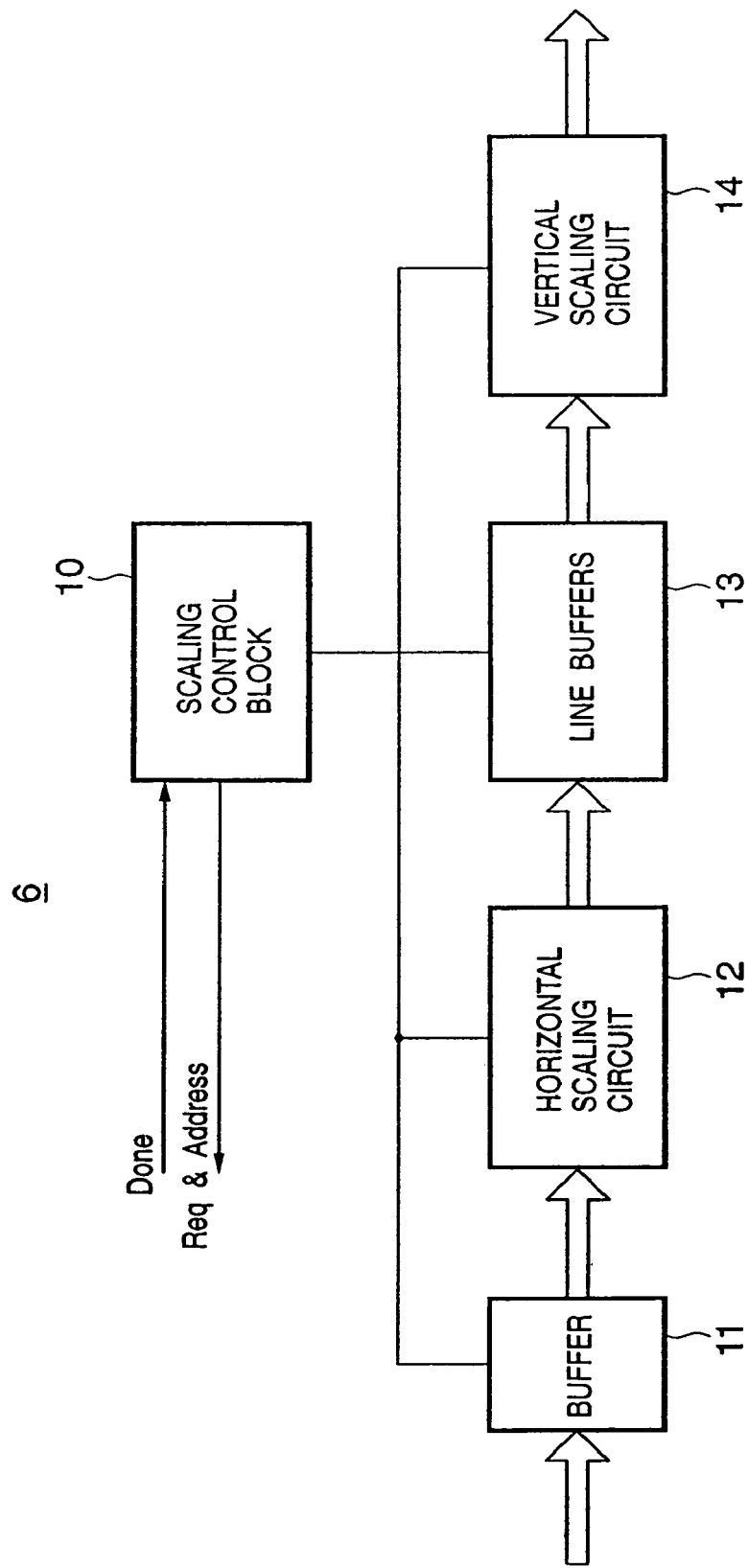
FIG. 14 is a detailed block diagram of the structure of a scaling block.
Figure 15:
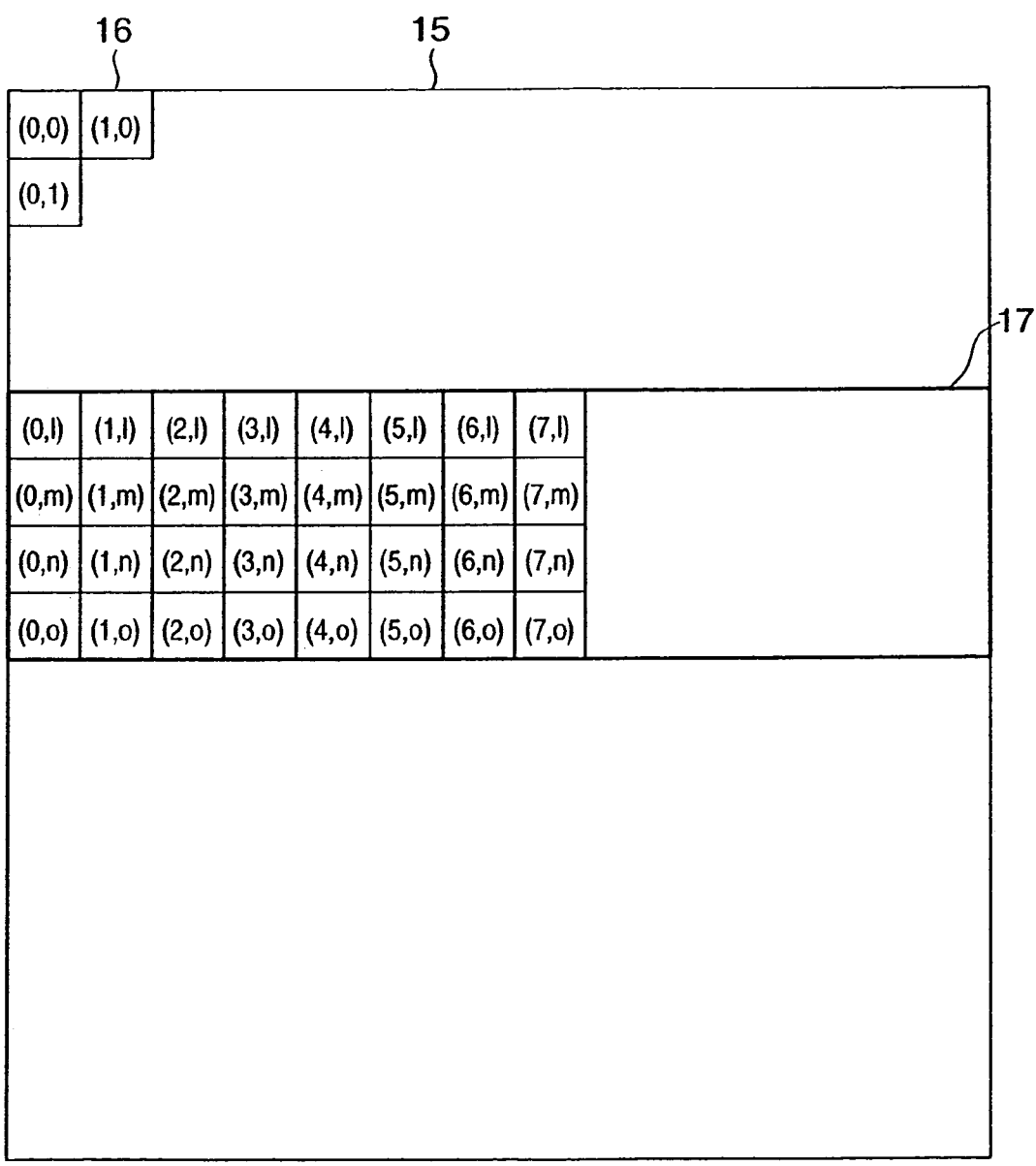
FIG. 15 is a diagram showing raster data of the tile image units rendered in an external memory.
Figure 16:
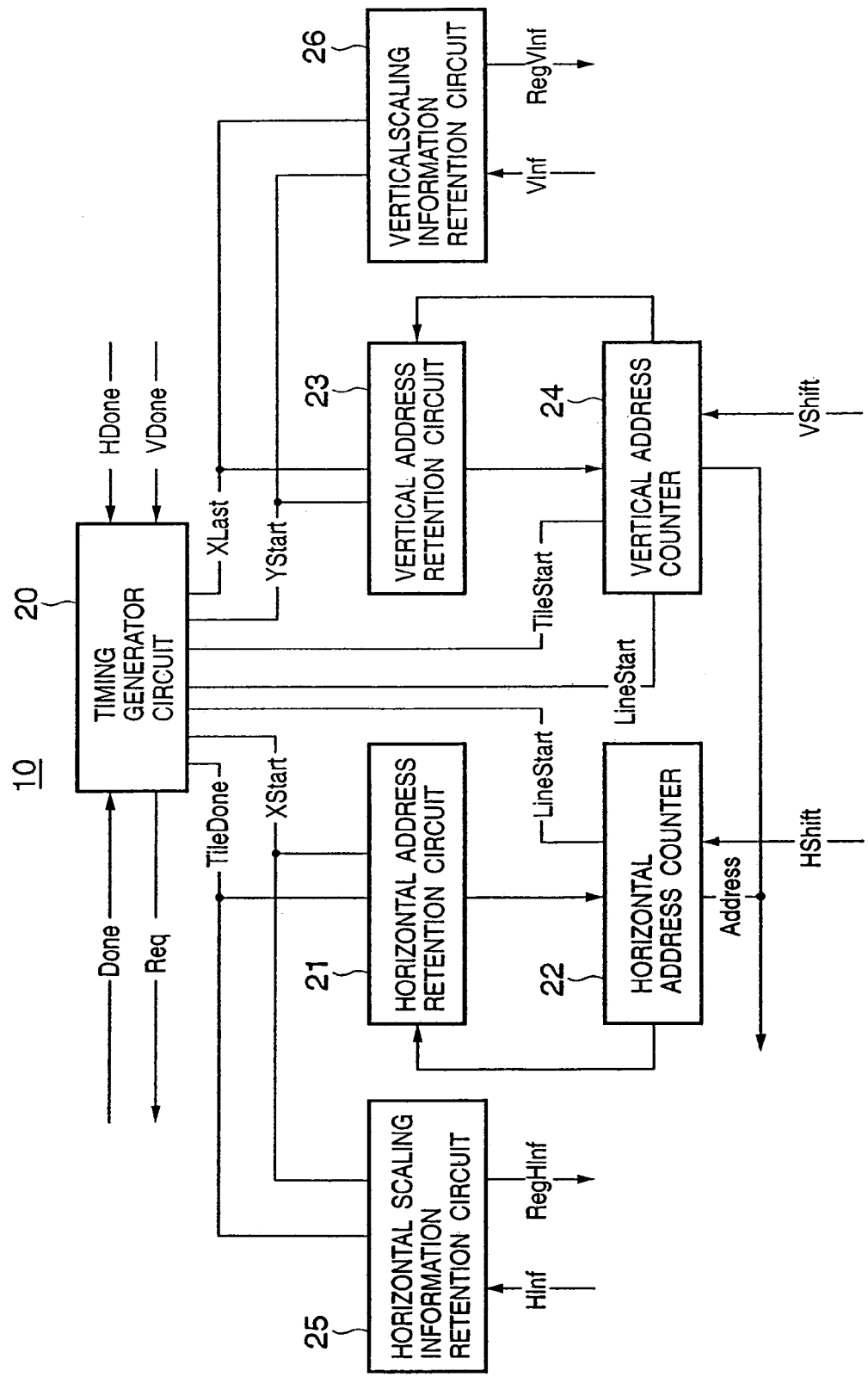
FIG. 16 is a detailed block diagram of the scaling control block shown in FIG. 14.

A further and more detailed description is now given of the scaling performed by the scaling block 6 in the scaling processor 2116, with reference to FIGS. 14, 15 and 16.

FIG. 14 is a detailed block diagram of the structure of a scaling block. FIG. 15 is a diagram showing raster data of the tile image units rendered in an external memory. FIG. 16 is a detailed block diagram of the scaling control block shown in FIG. 14.

As shown in FIG. 14, reference numeral lo denotes a scaling control block that controls the entire scaling process. Reference numeral 11 denotes a buffer that absorbs differences in tile data width and speed between the memory bus 2108 and the scaling block 6. Reference numeral 12 denotes a horizontal scaling circuit that performs horizontal scaling. Reference numeral 13 denotes a plurality of line buffers that store the results of the horizontal scaling. The number of line buffers 13 is determined by the number of pixels in the horizontal direction. Reference numeral 14 denotes a vertical scaling circuit that performs vertical scaling.

As shown in FIG. 15, reference numeral denotes the entire image to be processed. Reference numeral 16 denotes the image divided into tiles, with the number inside each tile corresponding to the xy coordinates of the tile in the original image. Reference numeral 17 denotes the memory area actually held in the external memory 2123. This area moves toward the bottom of the diagram each time processing of a tile portion in the vertical direction is completed.

As shown in FIG. 16, reference numeral 20 denotes a timing generator circuit, 21 denotes a horizontal address retention circuit, 22 denotes a horizontal address counter, 23 denotes a vertical address retention circuit, 24 denotes a vertical address counter, 25 denotes a horizontal scaling information retention circuit and 26 denotes a vertical scaling information retention circuit.

First, the tile data input from the first tile expansion unit (1) 2103 via the tile bus 2107 to the tile slave interface 4 is transmitted to the memory interface 5, and temporarily returned to a single image sheet like that shown in FIG. 15 via the memory bus 2108 and the memory controller 2122. However, the external memory 2123 does not retain a single sheet worth of image data, but instead retains only the amount needed for scaling as the necessary vertical memory retention amount, that is, actually retains only an amount necessary to be able to render the area indicated by the bold lines in FIG. 15. Moreover, the memory interface 5 sends a Ready signal to the scaling block 6 when at least one tile's worth of image data has been rendered to the external memory 2123.

When the scaling block 6 receives the Ready signal from the memory interface 5 the tile data address required for scaling is sent to the memory interface 5 and a request for read-out from the external memory 2123 is produced. When the memory interface 5 receives the read-out request, the memory interface 5 reads the tile data at the appropriate position from the external memory 2123 via the memory bus 2108 and transmits the read-out tile data to the scaling block 6. By so doing, the scaling block 6 executes scaling based on (1) the tile data transmitted from the memory interface 5 and (2) the scaling rate and filter coefficient set via the register interface 9. In addition, the scaling block 6 also stores the scaling results in the tile buffer 7 and transmits a Done signal to the tile master interface 8 when it has finished generating one tile's worth of scaled image. When it receives the Done signal, the tile master interface 8 reads the scaling results tile data from the tile buffer 7 and outputs the scaling results tile data to the next processing block (the tile compressor) via the tile bus 2107.

In so doing, the tile data transmitted from the memory interface 5 depicted in FIG. 5 is scaled horizontally by the horizontal scaling circuit 12, but with the buffer 11 of the scaling block 6 shown in detail in FIG. 14 absorbing any differences in bus width and image read-out speed. The circuit that performs this scaling is the same as the filter circuit described with reference to FIG. 15. In addition, the results of the horizontal scaling are stored in the line buffers 13 and, after vertical scaling by the vertical scaling circuit 14, are output to the tile buffer 7.

A detailed description is now given of the structure and operation of the scaling control block 10 described above, with reference to FIG. 16.

The timing generator circuit 20 of the scaling control block 10 receives a Done signal from the memory interface 5 shown in FIG. 1 and outputs a LineStart signal to the buffer 11 as well as the horizontal scaling circuit 12 (see FIG. 14) and the horizontal address counter 22 shown in FIG. 16. In addition, the timing generator circuit 20 also outputs a TileStart signal to the line buffers 13 as well as the vertical scaling circuit 14 (see FIG. 14) and the vertical address counter shown in FIG. 16. Moreover, the timing generator circuit 20 outputs an Xstart signal to the horizontal address retention circuit 21 and the horizontal scaling information retention circuit 25 shown in FIG. 16 and outputs a Ystart signal to the vertical address retention circuit 23 and the vertical scaling information retention circuit 26 so as to initialize these blocks. Thereafter, the timing generator circuit 20 outputs a tile data read request signal to the memory interface 5. The horizontal address counter 22 and the vertical address counter 24 output an Address signal indicating tile data necessary for scaling.

It should be noted that the tile data is read from the external memory 2123, horizontal scaling similar to the conventional art commences one tile at a time, and the horizontal address counter 22 counts up one count value based on an Hshift signal indicating a shift in the original image data has occurred.

Thereafter, when a line's worth of tiles have been horizontally scaled (Hdone signal), the timing generator circuit 20 outputs a new LineStart signal to the buffer 11 as well as the horizontal scaling circuit 12 (see FIG. 14) and the horizontal address counter 22 and the vertical address counter 24, thus initializing the buffer 11 and the horizontal scaling circuit 12. Similarly, the count value at the horizontal address counter 22 shown in FIG. 16 is loaded to the horizontal address retention circuit 21, the value retained at the horizontal scaling information retention circuit (RegHInf) is loaded to the filter coefficient generator circuit, and the value at the vertical address counter 24 is counted up. The memory interface 5 then reads the next line of image data from the external memory 2123 based on (1) the updated horizontal and vertical addresses Address and (2) the read request signal Request.

By the operations described above, vertical scaling commences when predetermined scaling results are aligned in the line buffers 13 shown in FIG. 14 and a tile completion signal Vdone is input to the timing generator circuit 20 shown in FIG. 16 when a line's worth of tiles have been scaled. Based on this signal, the timing generator circuit 20 outputs a TileDone signal to the horizontal address retention circuit 21 to make it retain the next horizontal address counter value. After these processes have been repeated, the timing generator circuit 20 outputs an Xlast signal to the vertical address retention circuit 23 that makes the vertical address retention circuit 23 retain the current vertical address counter 24 value when scaled output of the last of the horizontal tiles has been completed. By so doing, the timing generator circuit 20, vertical address retention circuit 23 is made to retain the current vertical address counter value.

The vertical address of the next output tile is "0", so before the timing generator circuit 20 outputs a TileStart signal the timing generator circuit 20 outputs to the horizontal address retention circuit 21 a signal Xstart that initializes the horizontal address retention circuit 21 value. Then, after the horizontal address count held by the horizontal address retention circuit 21 has been initialized, scaling of tiles advanced one tile I the vertical direction according to an output reference is executed. Here, since the output of the scaling processor 2116 is executed in units of tiles, the number of line buffers 13 corresponds to the length of the number of pixels in the horizontal direction of a single tile image (8 lines, if the same as the conventional example). Accordingly, if there are 32 pixels per tile in the horizontal direction, then the amount can be 1/200 as compared to the conventional example described above.

Thus, as described above, according to the present embodiment of the invention, the length of the required line buffer is the same as the number of pixels in the horizontal direction of the tile, so if the structure of the vertical scaling filter is the same as that of the conventional example, and if there are 32 pixels per tile in the horizontal direction with a maximum number of horizontal pixels that can be processed being 7000, then the amount of line buffer required by the scaling processor 2116 will be one two-hundredth that of the conventional example. Therefore, the present embodiment makes it possible to carry out the same scaling as a conventional scaling apparatus with much less line buffer, and is optimal for achieving a plurality of capabilities including scaling on a single IC chip.

In addition, the present embodiment uses an external memory for the tile image raster rendering. Therefore, provided the tile size is the same, the present embodiment can be adapted to a wide variety of scaling rates and image sizes, without affecting the circuitry inside the IC chip.

In addition, since the scaling processor 2116 is not directly controlled from the CPU the image data can be rendered in an optimal area of the external memory based on the coordinate information in the header of the data packet, thus simplifying data management for scaling in which an external memory is used.

Second Embodiment

As can be appreciated by those of ordinary skill in the art, even with an apparatus like the first embodiment described above, a very large external memory may still be required if the image to be processed is a full-color image. With an A4-long-size, for example, a 600 dpi image corresponds to 7000 pixels, so assuming 32 pixels per tile in the horizontal direction, then rasterizing 8-bit, full-color image data in single-tile widths would require 1 MB of external memory. Moreover, scaling, particularly vertical reduction, would require a plurality of tiles, thus further increasing the amount of memory required for rasterizing the image.

Given such circumstances, it is more cost-effective to use an ordinary SDRAM than a high-latency SRAM.

However, for the scaling circuit, both the starting pixel position and the number of pixels required for scaling varies depending on the scaling rate. As a result, when using an SDRAM for the image memory, transmitting all the required pixel data in a single burst is problematic in terms of both processing and buffer space, and the time needed to read the pixel data from the memory inevitably limits the variable processing speed.

In the present embodiment, readout of the image data rasterized in the external memory is adjusted at the start of scaling, so high-speed scaling can still be executed even when using an image memory subject to lengthy read-out waiting times like an SDRAM.

Detailed Description of the Scaling Process

Figure 17:
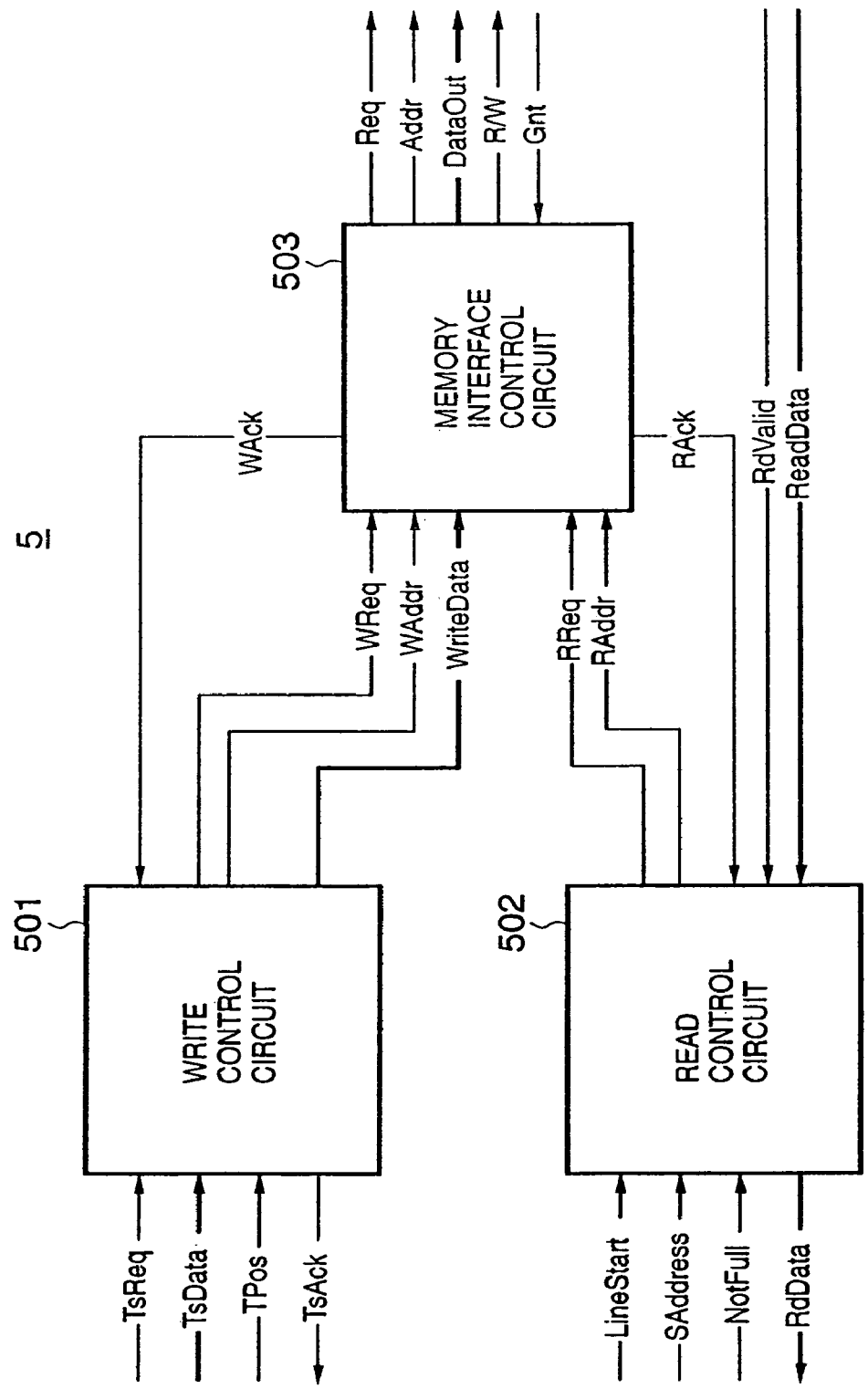
FIG. 17 is a diagram showing the detailed structure of a memory interface according to a second embodiment of the present invention.
Figure 18:
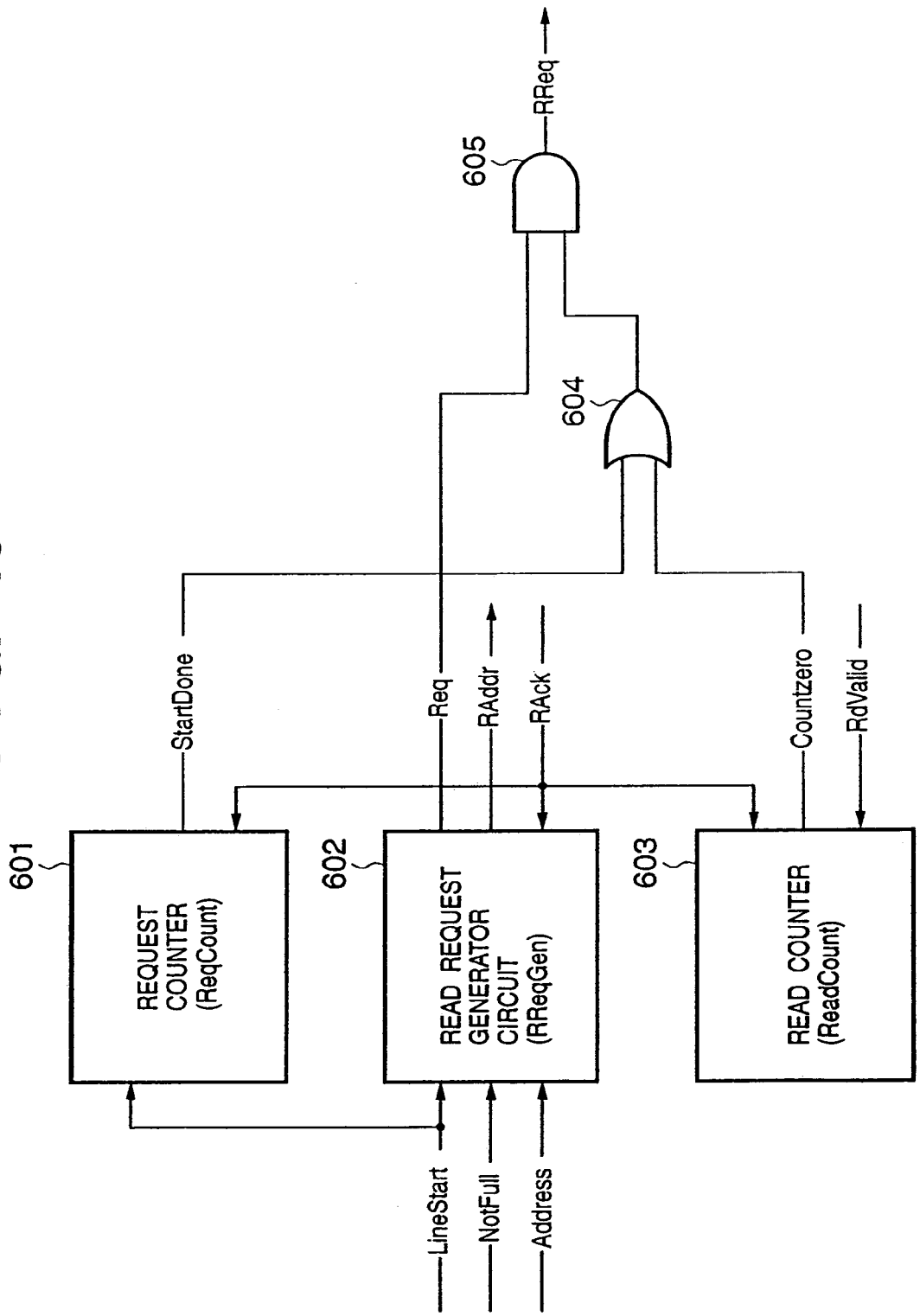
FIG. 18 is a diagram shown the detailed structure of a read control circuit depicted in FIG. 17.

A detailed description is now given of the scaling process according to a second embodiment of the present invention, with reference in the first instance to FIGS. 17 and 18.

The block structure of the scaling processor 2116 of the present embodiment is the same as that depicted in FIG. 13.

FIG. 17 is a diagram showing the detailed structure of a memory interface according to a second embodiment of the present invention.

In FIG. 17, reference numeral 5 denotes a memory interface. Reference numeral 501 denotes a write control circuit, which receives data from the tile slave interface 4 shown in FIG. 13 and control writing to the external memory 2123. Reference numeral 502 denotes a read control circuit, which receives a request signal from the scaling block 6 and reads the necessary image data from the external memory 2123. Reference numeral 503 denotes a memory interface 5 control circuit, which provides communication to the external memory 2123 in response to requests from the write control circuit 501 and the read control circuit 502, and controls the writing and reading of data.

FIG. 18 is a diagram shown the detailed structure of the read control circuit 502 depicted in FIG. 17. In FIG. 18, reference numeral 601 is a request counter (ReqCount) that counts the number of readout requests from the external memory. Reference numeral 602 denotes is a read request generator circuit (RReqGen). The read request generator circuit (RReqGen) 602 receives a NotFull signal indicating the status of the scaling block 6 buffer (FIFO), a LineStart horizontal scaling start pulse or a memory address (Address) indicating the position of the data required for scaling and generates a memory read signal (Request) and a read address (Raddr). Reference numeral 603 denotes a read counter (ReadCount) that counts the data for which a read request has been issued as well as the data actually read. Reference numeral 604 denotes an OR circuit. The OR circuit 604 inputs a StartDone signal output from the request counter 601 and a Request signal output from the request generator circuit 602, and outputs the logical sum of the two signals. Reference numeral 605 denotes an AND circuit. The AND circuit 605 inputs the request signal output from the read request generator circuit 602 and the signal output from the OR circuit 604, and outputs the logical product of the two signals.

A description is now given of the operation of a scaling circuit having the construction described above, with reference to the signals depicted in the diagrams.

Image data input from the first tile compressor (1) 2103 to the tile slave interface 4 via the tile bus 2107 depicted in FIG. 13 is transmitted to the memory interface 5, and is temporarily returned to the form of the image of a single sheet shown in FIG. 15 via the memory bus 2108 and the external memory interface 2122.

As with the first embodiment, the external memory 2123 does not retain a single sheet worth of data. Instead, the external memory 2123 actually only retains an amount of memory necessary to carry out scaling, that is, an amount sufficient to render the area indicated by the bold lines in FIG. 15. Moreover, the memory interface 5 shown in FIG. 1 sends a Ready signal to the scaling block 6 when rendering of at least one tile's worth of image data in the external memory 2123 has been completed.

The scaling block 6 receives the Ready signal from the memory interface 5, notifies the memory interface 5 of the address of the image data required for scaling, an requests a read-out thereof. The memory interface 5 receives the read request, reads the image data at the appropriate position from the external memory 2123 via the memory bus 2108 and transmits the read image data to the scaling block 6. The scaling block 6 then scales the image based on the image data transmitted from the memory interface 5 as well as the filter coefficient and the scaling rate set via the register interface 9. The results of the scaling are stored in the tile buffer 7 and a Done signal is transmitted to the tile master interface 8 when generation of a tile's worth of scaled image is complete. The tile master interface 8 then reads the scaled image from the tile buffer 7 and outputs the scaled image to the first tile compressor (1) 2103 via the tile bus 2107.

It should be noted that the signals received at the memory interface 5 are as depicted in FIG. 17. The write control circuit 501 outputs a write request signal (Wreq) to the memory interface 5 control circuit 503 so that the image data (TsData) obtained from the tile slave interface 4 and the tile number (TPos) shown in FIG. 13 are written to the corresponding external memory address, with the image data ultimately being written to the corresponding memory address.

Among the image data written to the external memory 2123, the image data required for scaling by the scaling block 6 begins to be read out by the read control circuit 502 based on the horizontal scaling start pulse (LineStart), the previously acknowledged read-commenced address (SAddress) and the scaling block 406 line buffer status signal (NotFull). The signals received by the read control circuit 502 are shown in FIG. 17.

At the same time, the issue count at the request counter (ReqCount) 601 that counts the number of request issue lines is reset to "0", and the StartDone signal is set to "1". The StartDone signal triggers a Req signal released from the AND circuit 605 mask, which is transmitted to the memory interface control circuit 503 shown in FIG. 17 as a read request sign Rreq. In response, the memory interface 503 communicates with the external memory interface 2122, and, if a read request acknowledge signal is received, sets a RAck signal to "1".

When it is confirmed that the value assigned to the RAck signal is "1" at a time (t1), the request counter (ReqCount) 601 issue counter increases by 1 and the read request generator circuit (RReqGen) 602 increments the read address (Raddr) by the required amount (in this case by 8). At the same time, the read counter (ReadCount) 603 increases the counter value by the number of beats in the read request. It should be noted that, since the counter value is no longer "0", the CountZero signal becomes "0" but StartDone signal output from the request counter (ReqCount) 601 is still "1" so the OR circuit 604 output remains at "1". Accordingly, the read request signal RReq remains at "1".

Figure 19:
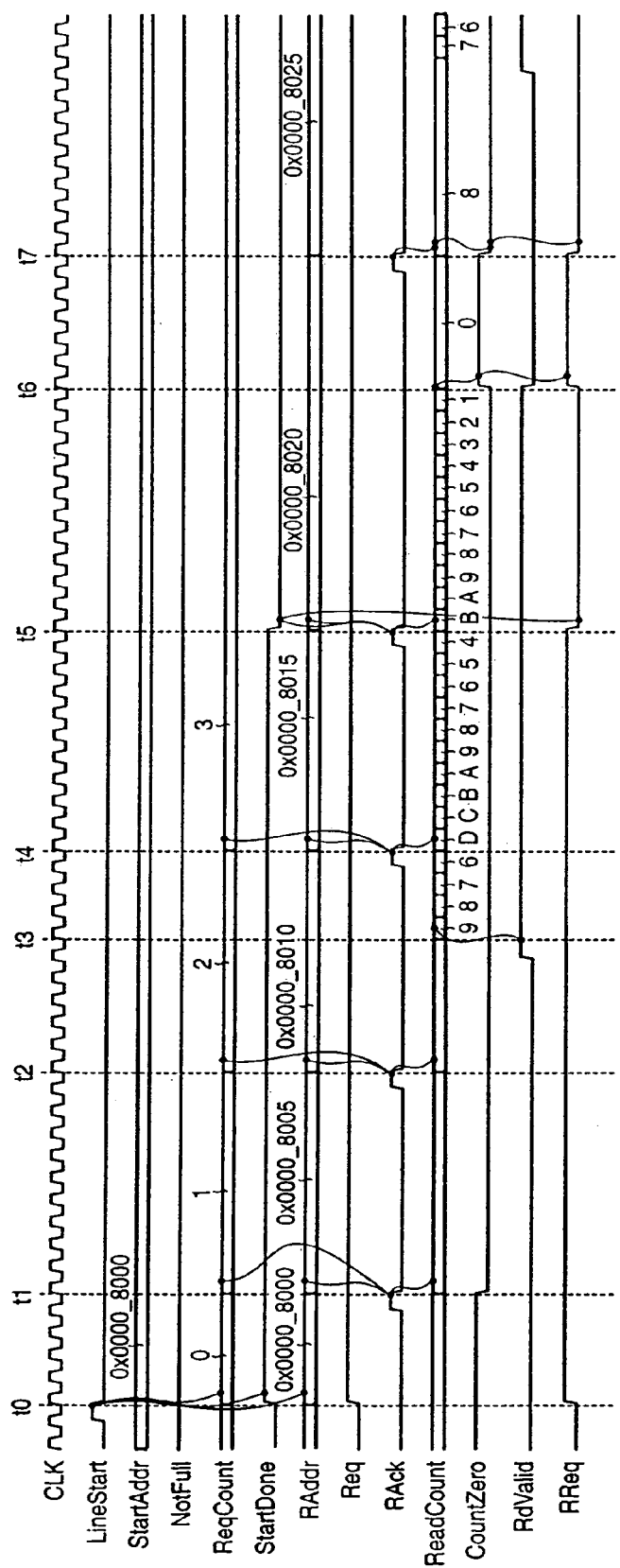
FIG. 19 is a timing chart illustrating the operation of the read control circuit.

Next, the memory interface 405, having completed the read request to the external memory interface 2122, indicates that a new read request based on a new read request signal (RReq) has been issued to the external memory interface 2122 by generating a RAck signal. When the RAck signal indicating that a read request has been transmitted is detected, the request counter (ReqCount) 601, the read address (RAddr) from the read request generator circuit (RReqGen) 602 and the read counter (ReadCount) are all increased by the respective required amounts as described above with respect to t1 (at a time t2). In the example shown in FIG. 19, for example, the counter and address values are in hexadecimal form. FIG. 19 is a timing chart illustrating the operation of the read control circuit.

Thereafter, when preparations for the reading of image data from the external memory interface 2122 are complete, a value of "1" is assigned to a RdValid signal indicating that reading has begun and the read counter (ReadCount) 603 begins to reduce the value at the counter by "1" from the current value (at a time t3). At this time, the scaling block 406 buffer (FIFO) still has space and the read request (RReq) value is "1", so a RAck signal indicating that a read request issued to the external memory 3123 via the memory interface 405 has been received is returned. Then, at the same time as t2 described above, the request counter (ReqCount) and read address (Raddr) are increased by the required value.

At this point the reading of the data has already commenced, so the value at the read counter (ReadCount) 603 is decreased by "1" from the normal amount of increase (which is "8" in this example) and ultimately increases by just "7" from the preceding value (at a time t4).

The scaling block 6 buffer (FIFO) still has room and the read request signal (RReq) value is "1", so a RAck signal indicating that a read request issued to the external memory 3123 via the memory interface 405 has been received is returned. The read address (Raddr) is increased by the required value, and the read counter (ReadCount) 603 is also increased by just "7" from the preceding value as described above.

With receipt of the latest read request, the request counter (ReqCount) 601 completes the readout of several stages of the buffer (FIFO) and retains the current value, and the StartDone signal is assigned the value "0". In so doing, both the mask signal StartDone and the CountZero signal become "0" regardless of the state of the scaling block 406 buffer (FIFO) status signal (NotFull). Accordingly, the OR circuit 604 output is "0" and the AND circuit 605 output is also "0", and no read request signal is issued to the memory interface 405 (at a time t5).

As the image data is read sequentially from the external memory 2123 and read-out of the read-requested image data is completed, the value at the read counter (ReadCount) 603 becomes "0" and the CountZero signal becomes "1". In so doing, the read request signal RReq mask is released and a new read request signal is issued to the memory interface (at a time t6).

In the present embodiment, a case is shown in which the scaling block 406 sequentially processes image data and ultimately the buffer is not full. Of course, the setting of the scaling rate changes the amount of image data consumed and the buffer may become nearly full, in which case the buffer status signal (NotFull) becomes "0". In such a case, of course, no read request is generated.

Thereafter, when a read request is received at the external memory interface 2122 and a RAck is returned, the read count (ReadCount) 603 increases by "8" beats. The CountZero signal becomes "0", the Request signal mask becomes valid, the read request signal RReq becomes "0" and no new read request is issued until the read request received at time t7 is completed.

As described above, according to the present embodiment, with respect to the tiles, when horizontal scaling is commenced only the amount of image data resident in the buffer is transmitted from the memory interface without regard to the processing status of the scaling circuit. In so doing, the number of times a read-out wait status arises, that is, the waiting for the image data required for horizontal scaling to arrive from the memory interface, can be reduced, making high-speed processing possible.

In addition, by concentrating the readout process, the bit rate of the external SDRAM can be increased, thus making it possible to write the image data at high speed during rasterization even to a functional block using an external SDRAM inside the IC chip.

Moreover, the present embodiment simplifies read control in support of split transactions in systems in which it is difficult to read all the data required for scaling at the beginning of the scaling operation and the data must therefore be read continuously.

The above-described embodiment has been described with reference to a scaling processor that uses an external SDRAM. However, the present embodiment of the present invention is not limited to such a scaling processor, but is adaptable to other image processing in other processing blocks.

Thus, for example, when generating the tile image in the image input process depicted in FIG. 9, in the image input interface 2112 the memory is used to rasterize the image memory at the tile-unit level. At this time, it is possible to perform memory access control like that of the present embodiment, thus making it possible to achieve high-speed tile image generation.

Third Embodiment

When executing scaling using an external memory as in the above-described embodiments, in order to manage the memory and improve the reliability of the process it is preferable to exercise exclusive control over the writing and reading of the tile images to and from the external memory. In the present embodiment, use of an exclusive control structure like that described below makes it possible to execute memory management according to the scaling rate using a simple apparatus structure.

Detailed Description of the Scaling Process

A detailed description is now given of the scaling process of a third embodiment of the present invention, with reference to the accompanying drawings, in the first instance to FIGS. 13 and 20-25.

The block structure of the scaling processor 2112 of the present embodiment is the same as that depicted in FIG. 13.

Figure 20:
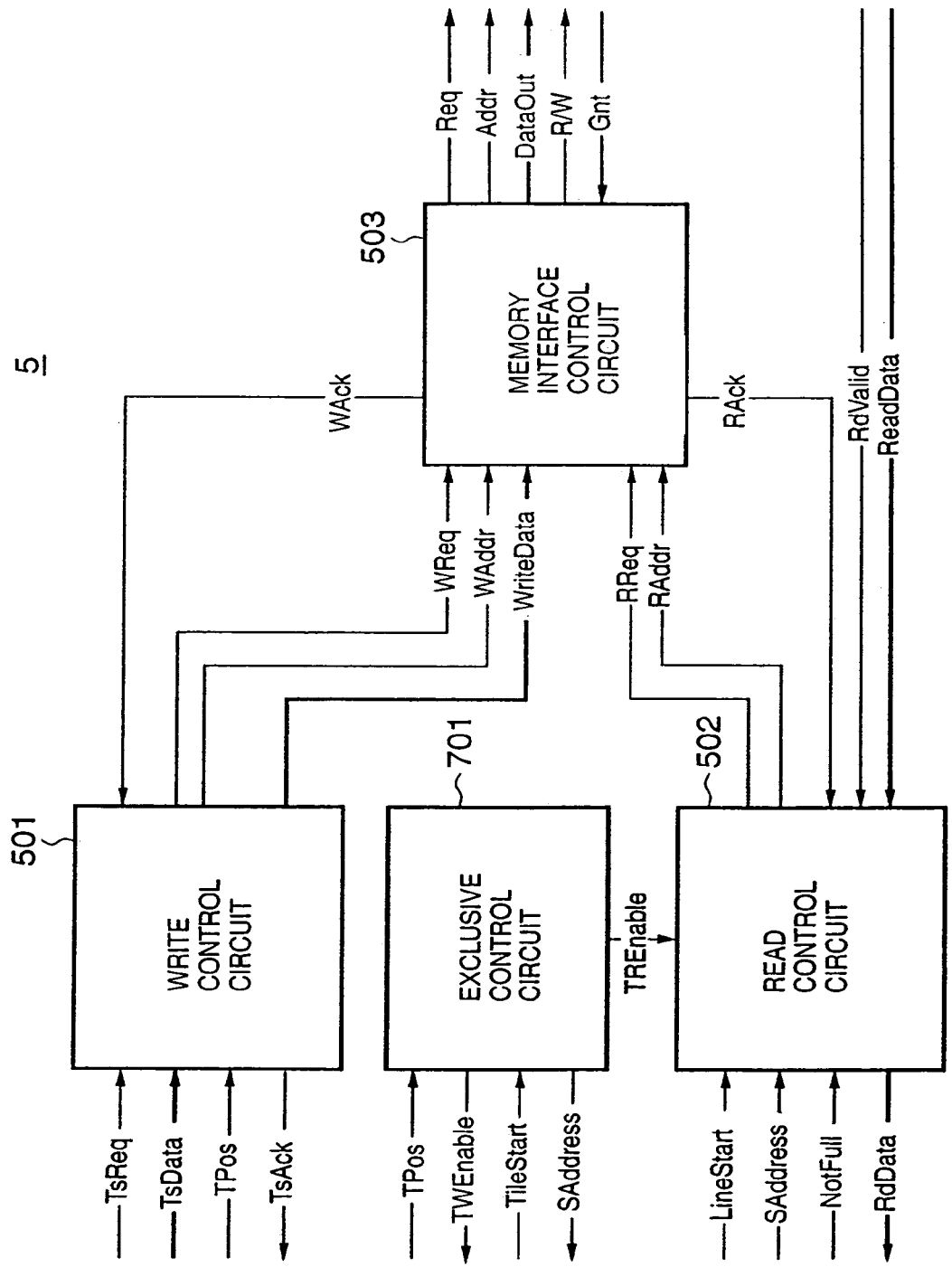
FIG. 20 is a detailed block diagram showing one example of the memory interface depicted in FIG. 13.

FIG. 20 is a detailed block diagram showing one example of the memory interface depicted in FIG. 13.

In FIG. 20, the write control circuit 501, the read control circuit 502, the memory interface control circuit 503 are the same circuits and have the same capabilities as those described with reference to the second embodiment of the present invention.

Reference numeral 701 denotes an exclusive control circuit 701. The exclusive control circuit 701 performs control giving position information on tiles to be written (tile position signal TPos), write based on the read address to be read out, and read enable (enable signal TREnable) according to the signals TPos, TWEnable, TileStart and SAddress.

Figure 21:
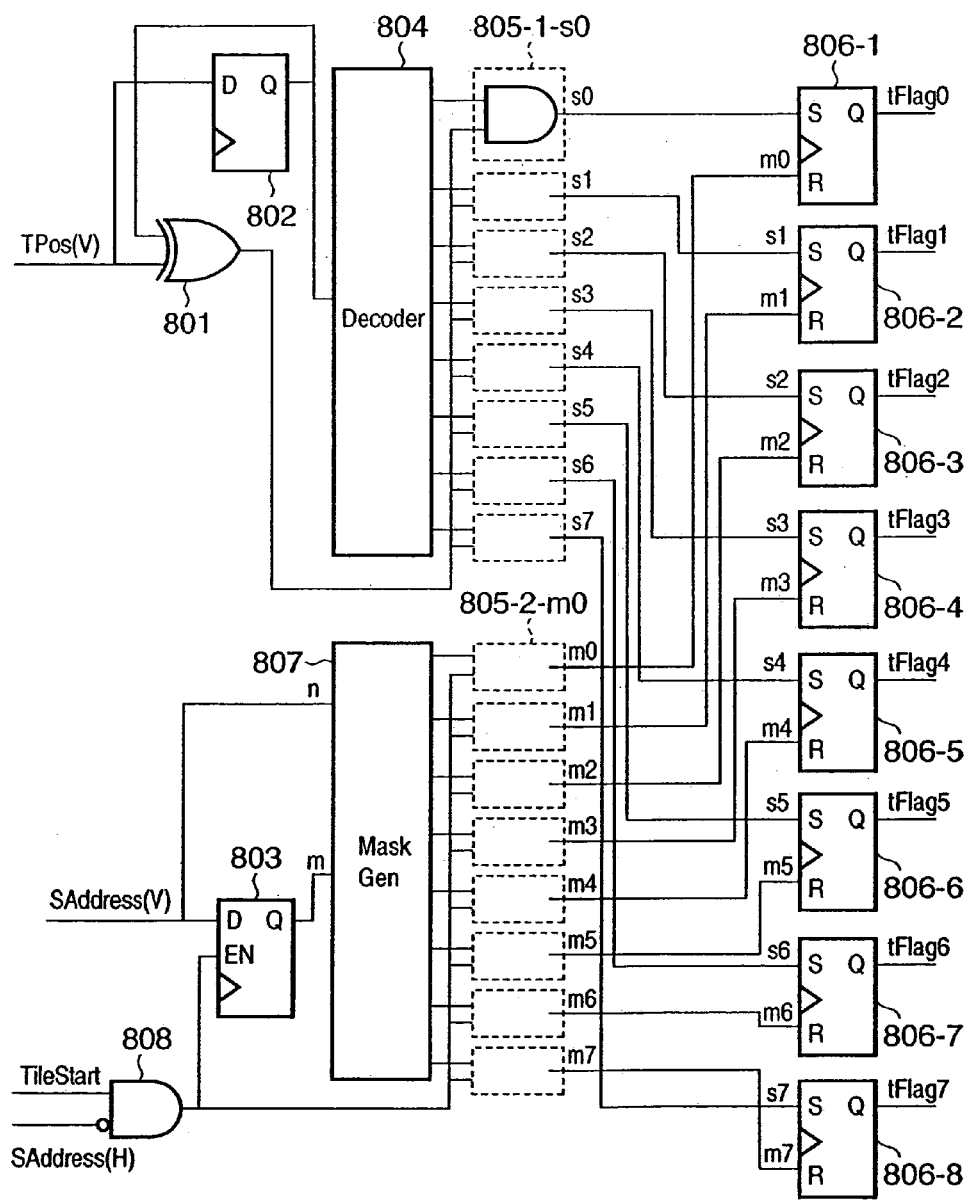
FIG. 21 is a block diagram showing an example of the detailed circuitry of the exclusive control circuit depicted in FIG. 20.

FIG. 21 is a block diagram showing an example of the detailed circuitry of the exclusive control circuit depicted in FIG. 20.

In FIG. 21, reference numeral 801 denotes an Exclusive OR gate, 802 denotes a D-F FlipFlop, 803 is an Enabled Flip-Flop, 804 is a decoder circuit, 805-1-s0 through 805-1-s7 and 805-2-m0 through 805-2-m7 are AND circuits, 806-1 through 806-8 are RS-FlipFlops, 807 is a mask generator circuit (MaskGen) and 808 is an AND gate.

Figure 25:
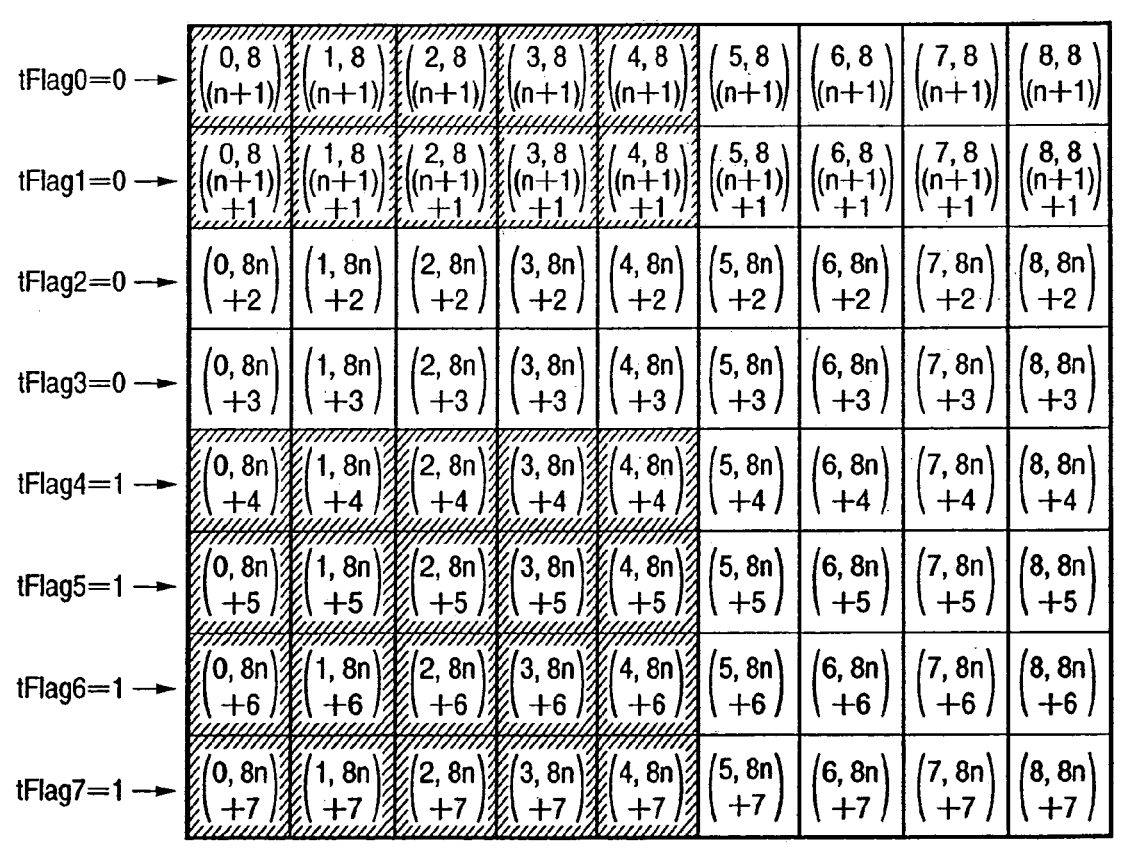

FIG. 22 is a diagram illustrating one memory state during tile image data transfer using the exclusive control circuit depicted in FIG. 20. FIG. 23 is a diagram illustrating another memory state during tile image data transfer using the exclusive control circuit depicted in FIG. 20. FIG. 24 is a diagram illustrating a third memory state during tile image data transfer using the exclusive control circuit depicted in FIG. 20. FIG. 25 is a diagram illustrating a fourth third memory state during tile image data transfer using the exclusive control circuit depicted in FIG. 20;

In FIGS. 22-25, the tFlag0-7 are flags which indicate the presence or absence of a completion of a process of scaling tiles in the same vertical position, and change according to the state of progress of the scaling process. The states of memory according to the rasterized vertical tiles in the external memory are retained is RS-FlipFlops 806-1 through 806-8.

It should be noted that the RS-FlipFlops 806-1 through 806-8 are set to "1" or reset to "0" based on the output of the decoder circuit 804 and the mask circuit 807 of the exclusive control circuit 701 shown in FIG. 21. According to the state of the tFlag0-7, the RS-FlipFlops 806-1 through 806-8 control both data reception by the tile slave interface 4 when writing data to the external memory, that is, the setting and resetting of the TWEnable signal to the tile slave interface 4, as well as the setting and resetting of the TREnable signal to the read control circuit 502 when reading data from the external memory.

It should be noted that, in the present embodiment, the minimum possible scaling by the scaling apparatus shown in FIGS. 22-25 is, for example, 0.25 (that is, ¼), and the raster memory vertical tile count is the smallest value that can be obtained from the conditional expression (4+2=6), so hereinafter the smallest exponential value of 2 will be used (here, "8").

When scaling begins, the tFlag0-7 shown in FIGS. 22-25 are all cleared, that is, are all set at "0", and the image data is sent by the tile bus 2107 from the upper left corner of FIG. 22.

In the example shown in FIG. 22, data transfer from the uppermost left to the third tile image has been completed, with data transfer of the fourth tile image indicated by the slanted lines currently being carried out.

Tile image transfer then proceeds further, and when transfer of the uppermost row shown in FIG. 22 has been completed, tFlag0, which indicates that writing of the first row is completed, is set to "1". Similarly, when writing of a row is finished, the corresponding flags are set to "1" in succession.

Control of the read side of the scaling process is illustrated by the example shown in FIG. 24, which shows the memory state n a case of ¼ scaling. In FIG. 24, of the rasterized image, the process is attempting to output scaling results of a single tile using the image data included in the tiles indicated by the slanted lines, that is, from (3,8n) to (8, 8n+5).

Essentially, the scaling rate in this case is ¼ both horizontally as well as vertically, so it might seem that it is sufficient to have an image that is 4 tiles long in both the vertical direction and the horizontal direction (in this example, the portion from (4, 8n+1) to (7, 8n+4)). In actuality, however, the filtering process also requires the presence of the surrounding image data as well, so the image data included in the tiles from (3, 8n) to (8, 8n+5) in FIG. 24 are needed.

FIG. 25 shows a memory state in which horizontal scaling has been completed and vertical scaling has advanced one tile.

As shown in FIG. 25, which depicts the progress of the scaling progress from the state shown in FIG. 24 to the state shown in FIG. 25, the position of the tile image used for scaling moves from (0, 8n +4) to (4, 8(n+1)+1).

However, the tile image from (0, 8(n+1)) to (4, 8(n+1)+1) occupies the same position in the memory as the tile image shown in FIG. 24 but it is still necessary to acquire new image data obtained from the tile slave, so the appropriate tFlag0-3 are cleared, as shown in the diagram.

An example of the circuit that sets and clears the appropriate flags corresponding to the changes from the state shown in FIG. 22 to the state shown in FIG. 23, and from the state shown in FIG. 24 to the state shown in FIG. 25, is the exclusive control circuit 701 shown in FIG. 21.

The completion of the writing of image data by 1 in the vertical direction, that is, the change from the state shown in FIG. 22 to the state shown in FIG. 23, involves a change in the vertical direction information (the TPos (V) signal shown in FIG. 20) inside the information indicating the position of the tile input from the tile slave interface 4. Accordingly, the timing of that change determines the gating of the current write position signal output by the decoder circuit 24 and the outputting of the signal that sets the flags of the corresponding positions to the 806 RS-FlipFlop 806-1. The appropriate 806 RS-FlipFlop sets the appropriate flag.

When vertical scaling is finished, that is, when the process changes from the memory state shown in FIG. 23 to the memory state shown in FIG. 24, the read address of the horizontal position from the memory is "0". Accordingly, the flags are cleared by validating the output of the mask generator circuit 27 using the tile scaling start pulse (Tile-Start signal) when the horizontal read address is "0".

The mask generator circuit 807 determines the read-completed vertical tile position from the vertical direction data read address at the beginning of scaling in the memory state shown in FIG. 23 and the vertical direction data read address at the beginning of scaling in the memory state shown in FIG. 24.

An example of the output from the decoder circuit is shown in Table 1 below.

TABLE 1

|   |   | n |   |   |   |   |   |   |   |
|---|---|---|---|---|---|---|---|---|---|
|   |   | 0 | 1 | 2 | 3 | 4 | 5 | 6 | 7 |
| m | 0 | 00 | 01 | 03 | 07 | 0F | 1F | 3F | 7F |
|   | 1 | FE | 00 | 02 | 06 | 0E | 1E | 3E | 7E |
|   | 2 | FC | FD | 00 | 04 | 0C | 1C | 3C | 7C |
|   | 3 | F8 | F9 | FB | 00 | 08 | 18 | 38 | 78 |
|   | 4 | F0 | F1 | F3 | F7 | 00 | 10 | 30 | 70 |
|   | 5 | E0 | E1 | E3 | E7 | EF | 00 | 20 | 60 |
|   | 6 | C0 | C1 | C3 | C7 | CF | DF | 00 | 40 |
|   | 7 | 80 | 81 | 83 | 87 | 8F | 9F | BF | 00 |

Based on such flag data, it is determined whether or not the read-out by scaling of the image data at the tile position to be written when writing is already finished or not. If the read-out by scaling is completed, then the TWEnable signal shown in FIG. 10 is set to "1" and the tile slave interface 4 performs data reception. Conversely, if read-out by scaling is not completed, then the TWEnable signal is set to "0" and the tile slave interface 4 makes the tile master interface 8 that reads the image data to be sent to the scaling apparatus wait until the write flag for the appropriate position reads "0".

When reading out the data, when the flag at the address to be read is set, the TREnable signal "1" output from the exclusive control circuit 701 to the read control circuit 502 is set to "1" and the read control circuit 502 shown in FIG. 20 outputs to the memory interface 5 control circuit 12 a memory read request signal RReq and a Raddr signal.

Conversely, if the flag is not set, then the TREnable signal is set to "0" and the read control circuit 502 restricts output of read request signals to the memory interface 5 control circuit 503.

In the above-described embodiment, the control signal TWEnable for writing is output to the tile slave interface 4, restricting the transfer of tile data. However, the result would be the same if this signal were input to the write control circuit 501 and the write request signal restricted.

According to the present embodiment, exclusive control of the writing to and reading from the memory for raster conversion of the tile image is carried out in tile units. Moreover, where the scaling processor sets the number of tiles in the vertical direction to be managed at a minimum rate of scaling n (<1), the number of tiles in the vertical direction to be managed is (1/n)+2, up to a square thereof, thus simplifying memory management.

In addition, memory release of read-complete operations by the scaling apparatus due to special circumstances is performed where the vertical output tiles change, making it possible to achieve a simple overall structure.

It should be noted that the number of tiles to be managed in the vertical direction is not necessarily limited to a square thereof. In other words, in the above-described structure, the number of vertical tiles may be 6, or it may be 7. In either case, the memory management may be similarly simplified.

Fourth Embodiment

Although scaling speed can be increased to a certain extent if the apparatus illustrated with reference to the embodiments described above is made into an IC chip, it can be anticipated that hereafter even greater scaling speeds will be sought.

Such demands may be satisfied by increasing the clock speed of the entire circuit, for example, but doing so does impose restrictions when making the apparatus into an IC. Similarly, the speed of the external memory increases together with any increase in clock speed, and is one cause of higher costs for the memory chips so used.

By contrast, instead of adding additional circuits to the scaling circuit, the present embodiment makes it possible to attain faster-than-conventional scaling speeds at conventional clock speeds.

Detailed Description of the Scaling Process

Figure 26:
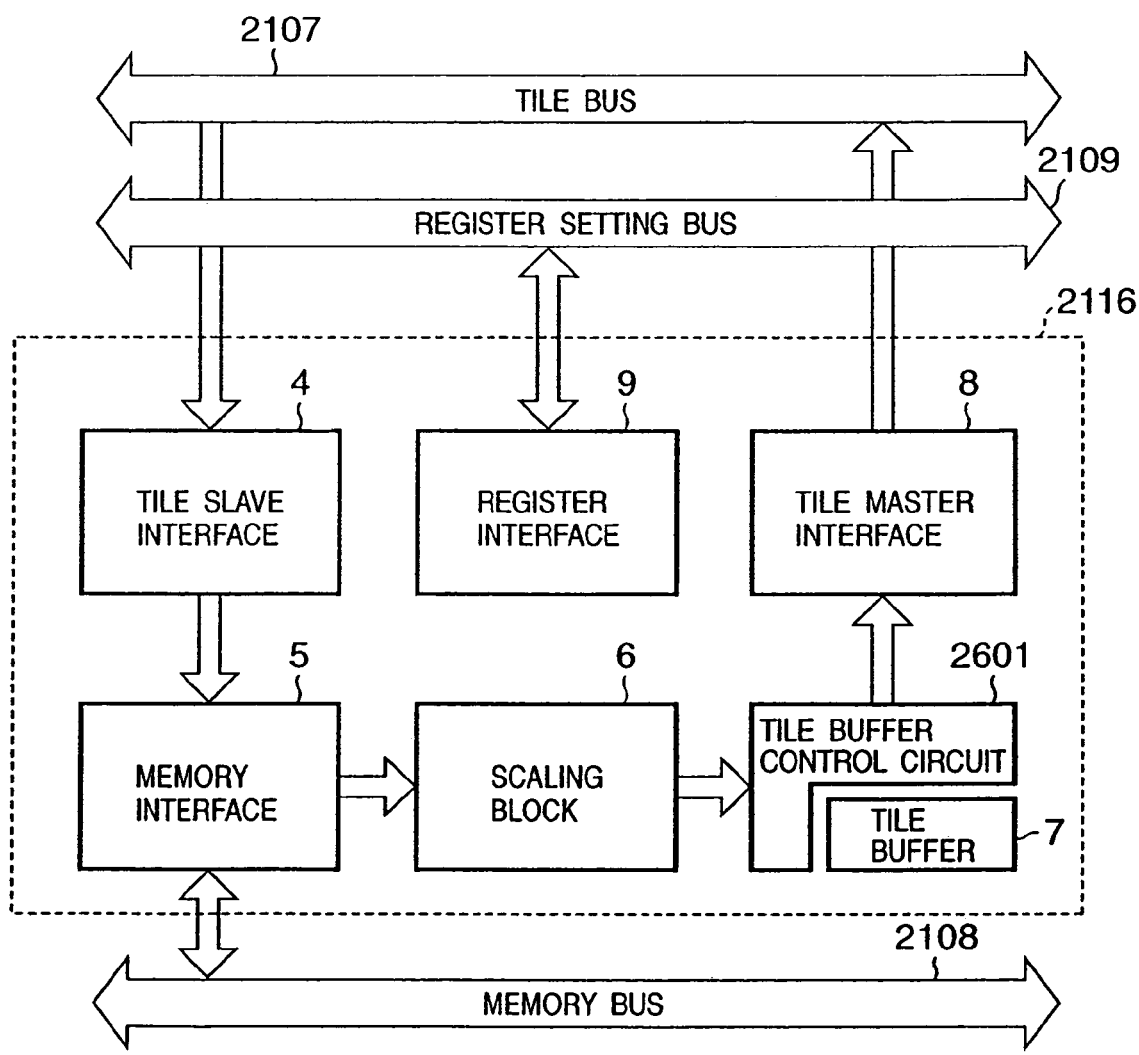
FIG. 26 is a diagram showing the block structure of a scaling processor according to fourth and fifth embodiments of the present invention.

FIG. 26 is a diagram showing the block structure of a scaling processor according to fourth and fifth embodiments of the present invention.

In the block diagram that is FIG. 26, the reference numeral 2116 denotes the scaling processor, which differs from the scaling processor of the first, second and third embodiment of the present invention described above insofar as it includes a tile buffer control circuit 2601 for controlling the tile buffer 7.

The detailed structure of the processing block 6 of the present embodiment is the same as that shown in FIG. 14. The detailed structure of the variable control block 10 of the present embodiment is the same as that shown in FIG. 16.

However, unlike the above-described embodiments, the scaling processor 2116 of the present embodiments performs scaling in units of two tiles at a time. The following describes the overall operation of the scaling processor 2116.

First, tile data input from the first tile expansion unit (1) 2103 to the tile slave interface 4 via the tile bus shown in FIG. 26 is transmitted to the memory interface 5, and then temporarily returned to the shape of the image of a single sheet as shown in FIG. 11 via the memory bus 2108 and the memory controller 2122. However, the external memory 2123 does not retain a single sheet worth of image data, but instead retains only the amount needed for scaling as the necessary vertical memory retention amount, that is, actually retains only an amount necessary to be able to render the area indicated by the bold lines in FIG. 15. Moreover, the memory interface 5 shown in FIG. 26 sends a Ready signal to the scaling block 6 when at least one tile's worth of image data in the vertical direction has been rendered to the external memory 2123.

When the scaling block 6 receives the Ready signal from the memory interface 5 the tile data address required for scaling is sent to the memory interface 5. The memory interface 5 receives the required tile address information and generates a read request to the external memory 2123. When the memory interface 5 receives the read-out request, the memory interface 5 reads the tile data at the appropriate position from the external memory 2123 via the memory bus 2108 and transmits the read-out tile data to the scaling block 6. By so doing, the scaling block 6 executes scaling based on (1) the tile data transmitted from the memory interface 5 and (2) the scaling rate and filter coefficient set via the register interface 9. In addition, the scaling block 6 also stores the scaling results in the tile buffer 7 and transmits a Done signal to the tile master interface 8 when it has finished generating one tile's worth of scaled image. When it receives the Done signal, the tile master interface 8 reads the scaling results tile data from the tile buffer 7 in tile units to the first tile compressor (1) 2106 via the tile bus 2107.

A description is now given of the detailed structure of the above-described scaling control block 10, with reference to FIG. 16.

When the Done signal described above is received from the memory interface 5 shown in FIG. 26, the timing generator circuit 20 of the scaling control block 10 outputs a LineStart signal to the buffer 11, the horizontal scaling circuit 12 (see FIG. 14) and the horizontal address counter 22 shown in FIG. 16. In addition, the timing generator circuit 20 outputs a TileStart signal to the line buffer 13, the vertical scaling circuit 14 (see FIG. 14) and the vertical address counter 24 shown in FIG. 16. Moreover, the timing generator circuit 20 outputs an Xstart signal to the horizontal address retention circuit 21 and the horizontal scaling information retention circuit 25 shown in FIG. 16 and outputs a Ystart signal to the vertical address retention circuit 23 and the vertical scaling information retention circuit 26 so as to initialize these blocks. Thereafter, the timing generator circuit 20 outputs a tile data read request signal to the memory interface 5. The horizontal address counter 22 and the vertical address counter 24 output an Address signal indicating tile data necessary for scaling.

The tile data is read from the external memory 2123, horizontal scaling is commenced, and the value at the horizontal address counter is incremented based on an Hshift signal indicating the occurrence of a shift in the original image data.

Thereafter, when horizontal scaling of a number of pixels equivalent to two lines of tile is completed (Hdone signal) the timing generator circuit 20 outputs a new LineStart signal to the buffer 11, the horizontal scaling circuit 12 (see FIG. 14), the horizontal address counter 22 shown in FIG. 16 and the vertical address counter 24 so as to initialize the buffer 11 and the horizontal scaling circuit 12. At the same time, the count value at the horizontal address counter 22 shown in FIG. 16 is loaded to the horizontal address retention circuit 21 and the filter coefficient generator circuit is loaded with the value (RegHInf) retained in the horizontal scaling retention circuit, so as to increment the count value at the vertical address counter 24. The memory interface 5 then reads the next line of image data from the external memory 2123 based on the updated horizontal and vertical addresses and the read request signal RReq.

By the operations described above, the vertical scaling circuit 14 is triggered when a predetermined scaling result appears in the line buffer 13 depicted in FIG. 13 and the vertically scaled image data is output to the tile buffer control circuit 2601. When scaling of a number of lines of tile has been completed, the vertical scaling circuit 14 a tile complete signal Vdone is input to the timing generator circuit 20 shown in FIG. 16. Based on this signal, the timing generator circuit 20 outputs a TileDone signal holding the next horizontal address counter value to the horizontal address retention circuit 21. After these processes have been repeated, when the scaled output tile to be processed is the last horizontal tile, the timing generator circuit 20 outputs a signal Xlast that holds the current vertical address counter 24 value to the vertical address retention circuit 23 so as to retain the current vertical address counter value in the vertical address retention circuit 23.

The tile buffer control circuit 2601 counts the scaled image data that has been vertically scaled by the vertical scaling circuit 14 as well as writes the position corresponding to the tile buffer. In addition, the tile image data is read out and output according to the tile master interface circuit read request address. At this time, it is determined whether or not the tile image data to be read is the first or the last of two consecutive tile images in the horizontal direction, and the read address is converted to the appropriate address and read from the tile buffer.

Figure 27:
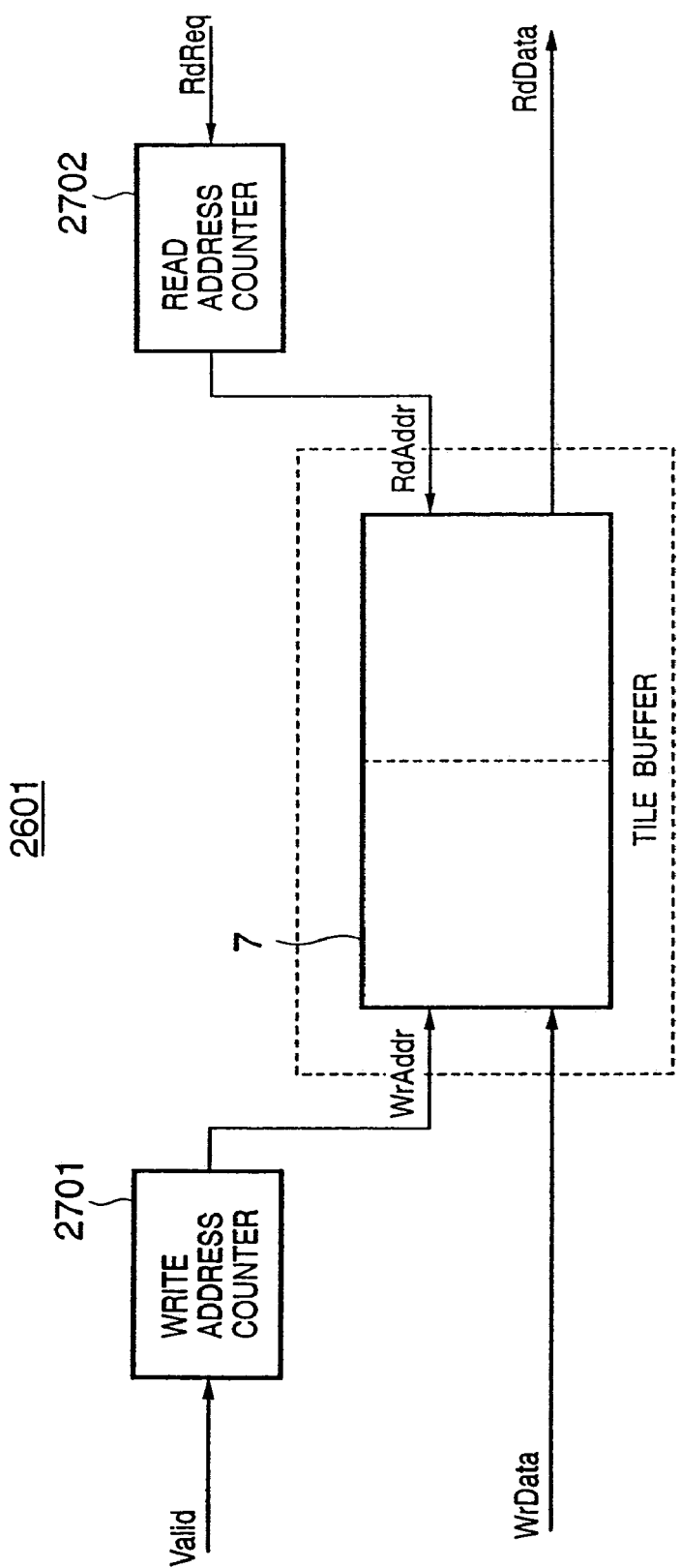
FIG. 27 is a block diagram of a tile buffer control circuit in the fourth embodiment of the present invention.

FIG. 27 is a block diagram of a tile buffer control circuit in the fourth embodiment of the present invention.

In FIG. 27, reference numeral 2701 denotes a write address counter that counts the scaled images from the scaling block 6 and the Valid signals output at the same time and reference numeral 2702 denotes a read address counter that receives a read request from the tile master interface and counts the number of pixels to be read.

In order to facilitate an understanding of the distinctive features of the present embodiment, the size of the tile, for illustrative purposes only, is set at 8 horizontal pixels and 8 vertical pixels.

FIG. 28 is a diagram showing a sample address in a tile buffer. In FIG. 28, the shaded portion denotes the initial tile portion.

When writing to the tile buffer 7, the write addresses are output in the sequence shown in FIG. 28 and stored in the indicated positions in the tile buffer 7. When reading from the tile buffer 7, the data must be read out in tile units, so the read addresses are given in the order 0→1→ . . . →7→16→17→, so that after the shaded portion in the diagram is read out, the next sequence to be read is 8→9→ . . . →15→24 → . . . Accordingly, the read address can be given to the tile buffer 7 as a signal of switched output address positions of the read address counter.

Next, the processing time per line of tile when scaling using the structure of the embodiment described above is estimated.

Figures 29A, 29B:
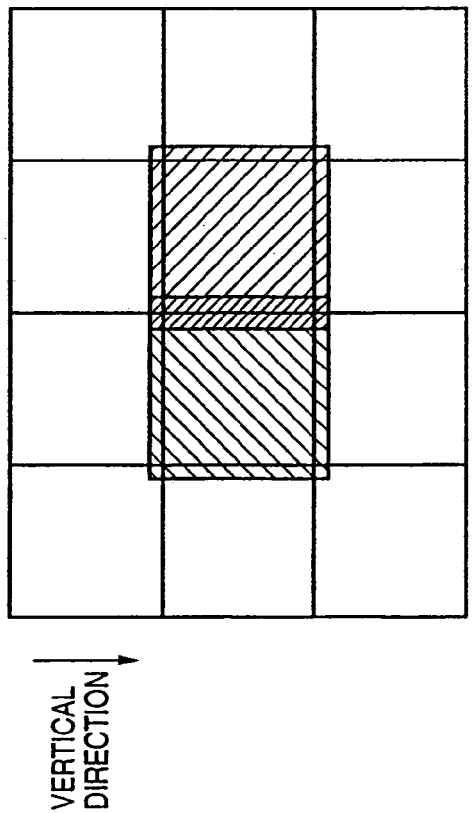
FIGS. 29A and 29B are diagrams showing the difference in processing area in a case in which processing is performed on a single tile, as in FIG. 29A, and a case in which processing is performed on two tiles continuous in the horizontal direction, as in FIG. 29B.

FIGS. 29A and 29B are diagrams showing the difference in processing area in a case in which processing is performed on a single tile, as in FIG. 29A, and a case in which processing is performed on two tiles continuous in the horizontal direction, as in FIG. 29B.

First, when processing in tile units, the difference in processing region in a case in which two horizontally consecutive tiles are processed is shown in FIGS. 29A and 29B. For ease of description, the example shown in FIGS. 29A and 29B shows the required original image data required for a simple scaling rate of 1 (that is, 100 percent), as well as the output tile. FIG. 29A shows a case of scaling by tile unit, in which the shaded portion is the required image data read from the external memory. As shown in the diagram, the darkly shaded area (that is, the last part of the first tile and the first part of the last tile) must actually be read twice from the external memory in order to process in tile units.

The results of the scaling performed by the present embodiment outputting two consecutive tiles are shown in FIG. 29B. In FIG. 29B, in order to process the two tiles consecutive in the horizontal direction once, there is no occurrence of an area that must element board read twice from the external memory 2123 as shown in FIG. 29A. Of course, after two consecutive tiles have been generated, another area that is read twice does similarly occur, but with a frequency that is half that of the case shown in FIG. 29A.

Next, an estimate of a clock cycle needed to process one line in a case of a scaling rate of 1 is estimated. The delay from the commencement of processing to the output of the image data from the memory interface cannot be avoided so long as an external memory is used, and the horizontal scaling circuit cannot operate during a number of cycles after a read request is output until data is actually read from the memory and are wasted cycles. These cycles are called TA herein.

Similarly, the read-out from the memory must be in bursts in order to achieve fast access and the read commence position and the number of pixels actually required for scaling are not always the same, so here, too, wasted cycles occur, the value of which is TB herein.

The overhead at the start if scaling computation and the number of cycles needed for pipeline processing completion is set at TC herein.

Under the above-described conditions, the actual number of horizontal processing cycles is computed. However, if typical values 10, 7 and 5 are used for the above-described TA, TB and TC, the processing cycle needed for horizontal scaling of a number of pixels equal to one tile is:

$TA+TB+32+TC=54$

If processing two horizontally consecutive tiles at a time:

$TA+TB+64+TC=86$

Converted to a single tile yields half, that is, 86/2=43, leading on average to a 20% reduction in processing cycle, in other words, making high-speed processing possible.

As described above, the present embodiment processes two tiles at once, so high-speed scaling is possible without increasing the clock speed. It should be noted that the number of tiles to be processed simultaneously need not be limited to two, but may be three or four.

Fifth Embodiment

In the fourth embodiment as described above, a plurality of tiles are scaled simultaneously, so when processing at the horizontal edges it sometimes happens that data not needed for processing is nevertheless output from the scaling block.

In the fifth and present embodiment, the scaling processor is controlled so as to output only valid tiles even when scaling a plurality of tile units.

Detailed Description of the Scaling Process

A detailed description is now given of the scaling process of the fifth embodiment of the present invention, with reference to FIGS. 30-33.

The block structure of the scaling processor 2116 of the present embodiment is the same as that of the fourth embodiment described with reference to FIG. 26. However, the structure of the tile buffer control circuit 2601 differs from that of the fourth embodiment, as described in detail below.

Figure 30:
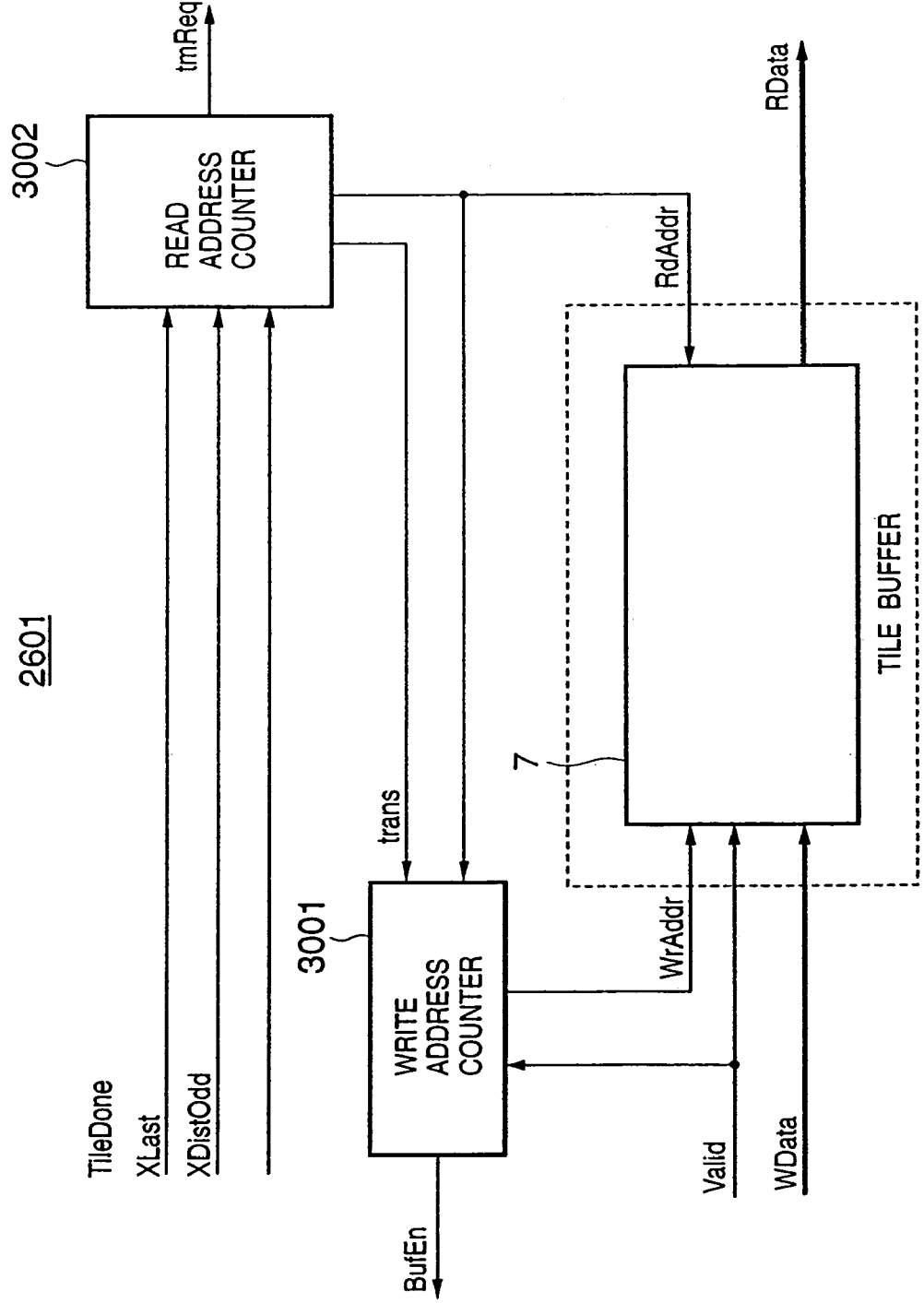
FIG. 30 is a block diagram of a tile buffer control circuit in the fifth embodiment of the present invention.

FIG. 30 is a block diagram of a tile buffer control circuit in the fifth embodiment of the present invention. As shown in FIG. 30, reference numeral 3001 denotes header information 3001 a write address counter that counts the Valid signals output fro the scaling block 6 at the same time as the scaled image, and reference numeral 3002 denotes a read address counter that receives a read request received from the tile master interface that counts the number of pixels to be read.

Figure 31A:
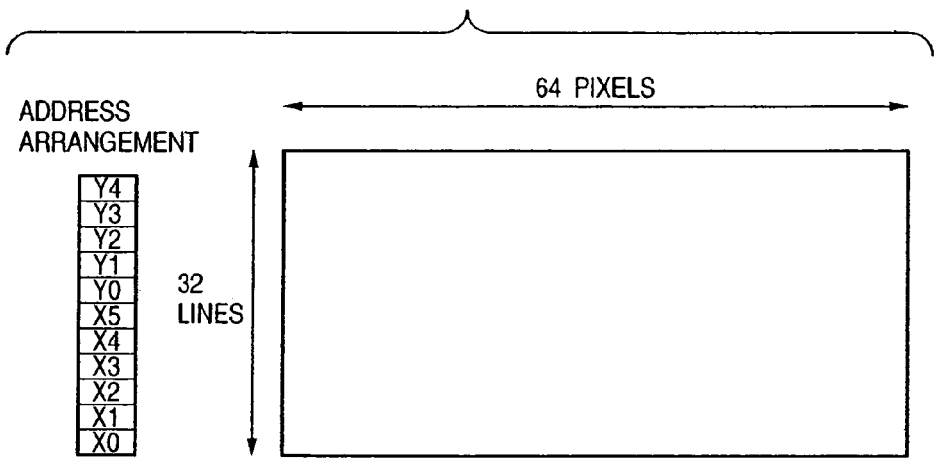
FIGS. 31A and 31B are diagrams illustrating different address arrangements in the tile buffer.
Figure 31B:
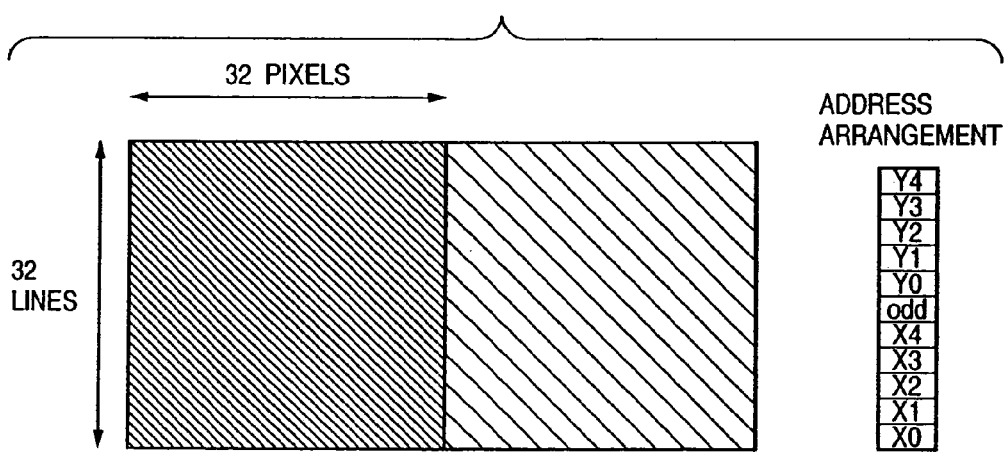

FIGS. 31A and 31B are diagrams illustrating different address arrangements in the tile buffer. As shown in FIG. 31A, when the tile buffer is used to retain two tile regions in the horizontal direction, the write address assumes the address arrangement shown in the diagram, with the last six bits being occupied by the horizontal pixel counter and the first five bits being occupied by the line counter.

By contrast, as shown in FIG. 31B, the address for reading the tile data stored in the tile buffer includes a bit indicating whether the horizontal tile is an even-numbered tile or an odd-numbered tile, as is required for reading in tile units, with the 5 bits below that being occupied by the horizontal pixel address inside the tile and the 5 bits above being occupied by the vertical line address.

Figure 32:
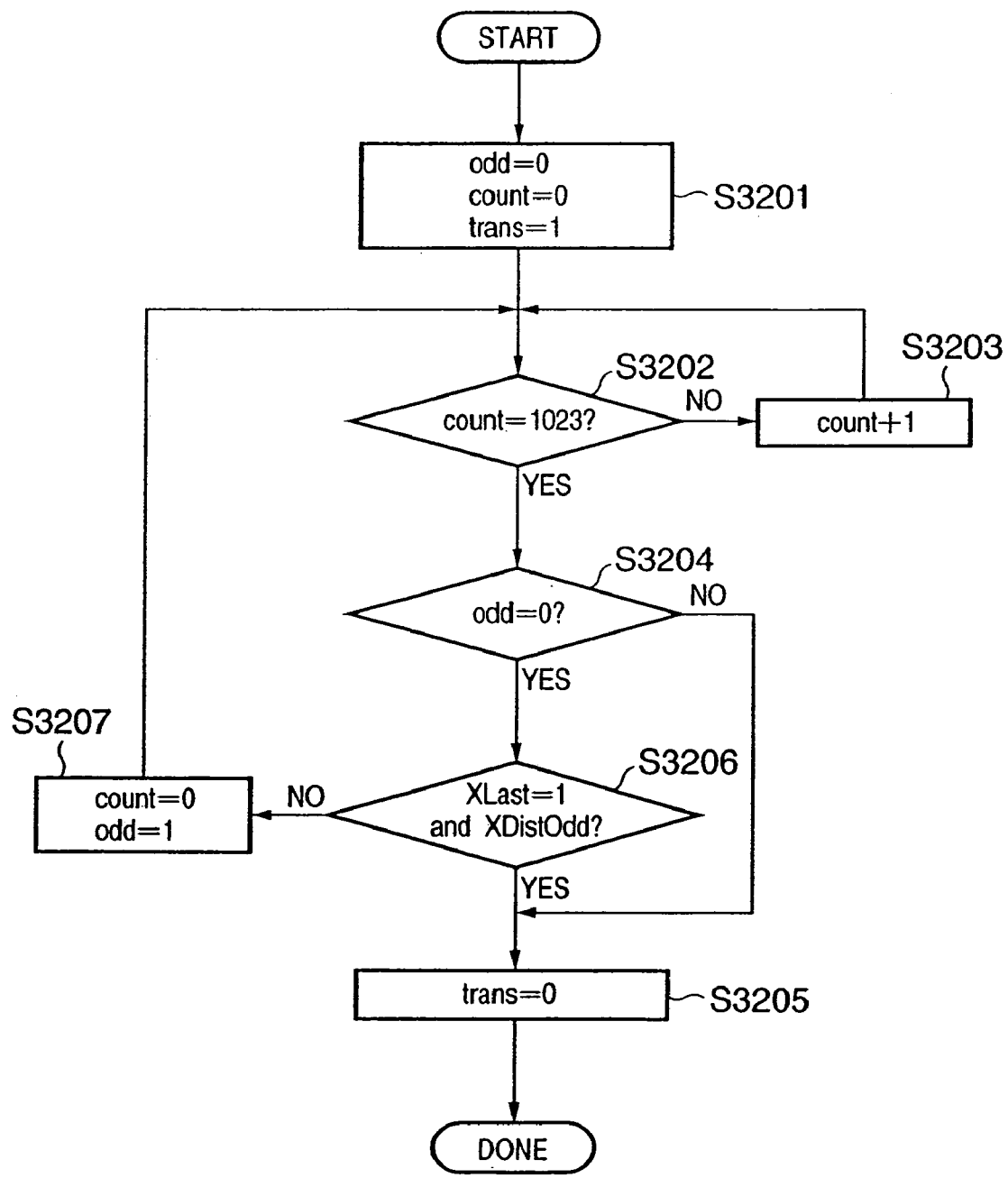
FIG. 32 is a flow chart showing steps in a process of generating an address to be followed by a read address counter.

In order to generate this read address correctly, the read address counter generates the address according to the process shown in FIG. 32.

FIG. 32 is a flow chart showing steps in a process of generating an address to be followed by a read address counter.

The process depicted in FIG. 32 is controlled by a CPU (not shown in the diagram) built into the scaling processor 2116. The parameters needed for processing can be obtained from the tile slave interface 4 and the register interface 9.

Initially, when a signal indicating that processing of two tiles is completed is input from the spacing block 6, a trans signal indicating that the tile buffer is in the process of reading is set to "1". In addition, the address counter is reset to "0", and further, the odd signal indicating the tile number is reset to "0" in a step S3201.

Then in a step S3202, data is read one pixel at a time from the tile buffer and the counter is incremented until one tile's worth of data is read out, in a step S3202; if No, then in a step S3203.

One a single tile's worth scaling output has been read from the tile buffer 7 (Yes in step S3202), it is determined in a step S3204 whether the content of the tile buffer 7 currently being output is a second tile or not.

If it is the second tile (No is step S 3204), the tile buffer 7, then a trans signal indicating that the read operation is complete is reset to "0" in a step S3205. Conversely, if the contents of the read-out tile buffer happen to be the first tile (Yes in step S3204), then the signal Xlast indicating whether or not these are the last scaling results in the horizontal direction and the signal XdistOdd indicating whether or not the expected output tile number is an odd number (S3206).

If the output is the last in the horizontal direction, and further, if the number of tiles expected to be output is an odd number, (Yes in step S3206), then the read address count is stopped and the trans signal is reset to "0" (step S3205). In all other cases (No in step S3206), the odd signal is set to "1" and the counter is rest to "0" (in a step S3207), after which the process returns to step S3202 and the above-described count-up operation is repeated.

As described above, the write address counter 3001 is configured as a counter that counts up when the valid signal value is "1" in order to control the writing of data to the tile buffer 7. Similarly, in order to output a buffer write-enable signal BufEn enabling writing to the tile buffer 7, the write address counter 3001 is configured like the circuit shown I FIG. 33.

Figure 33:
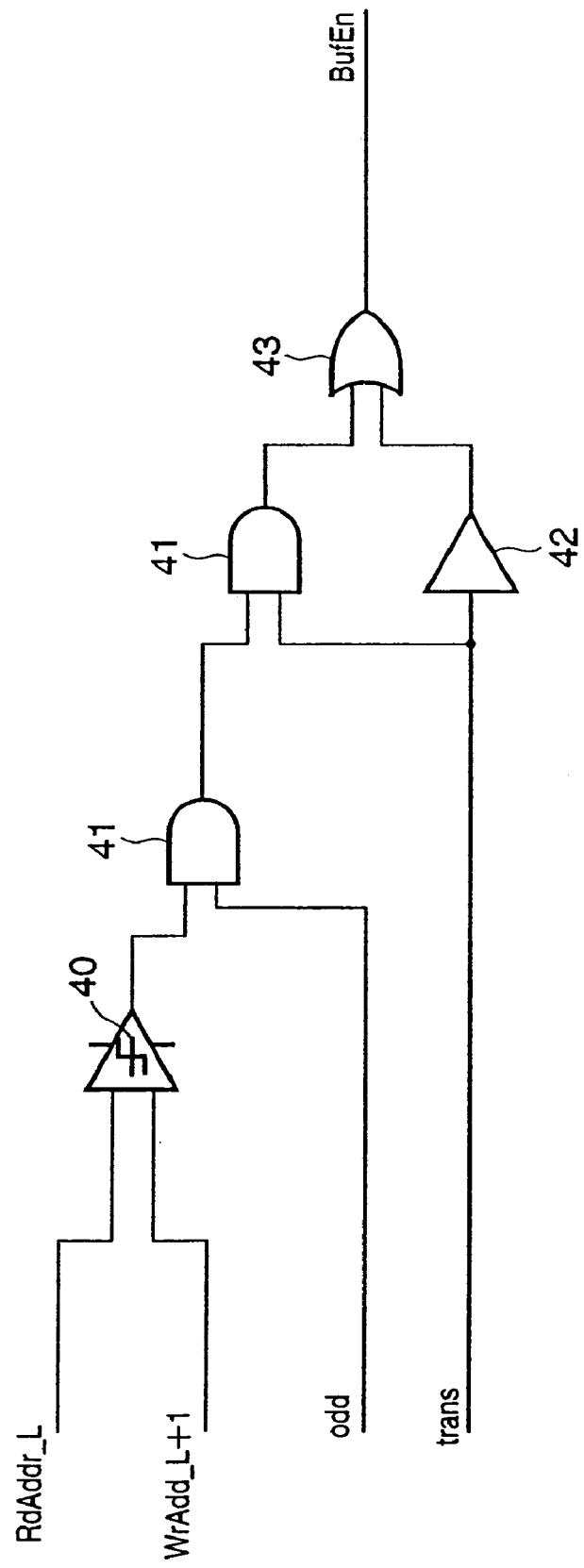
FIG. 33 is a diagram of the circuit structure of a write address counter.
Figure 34:
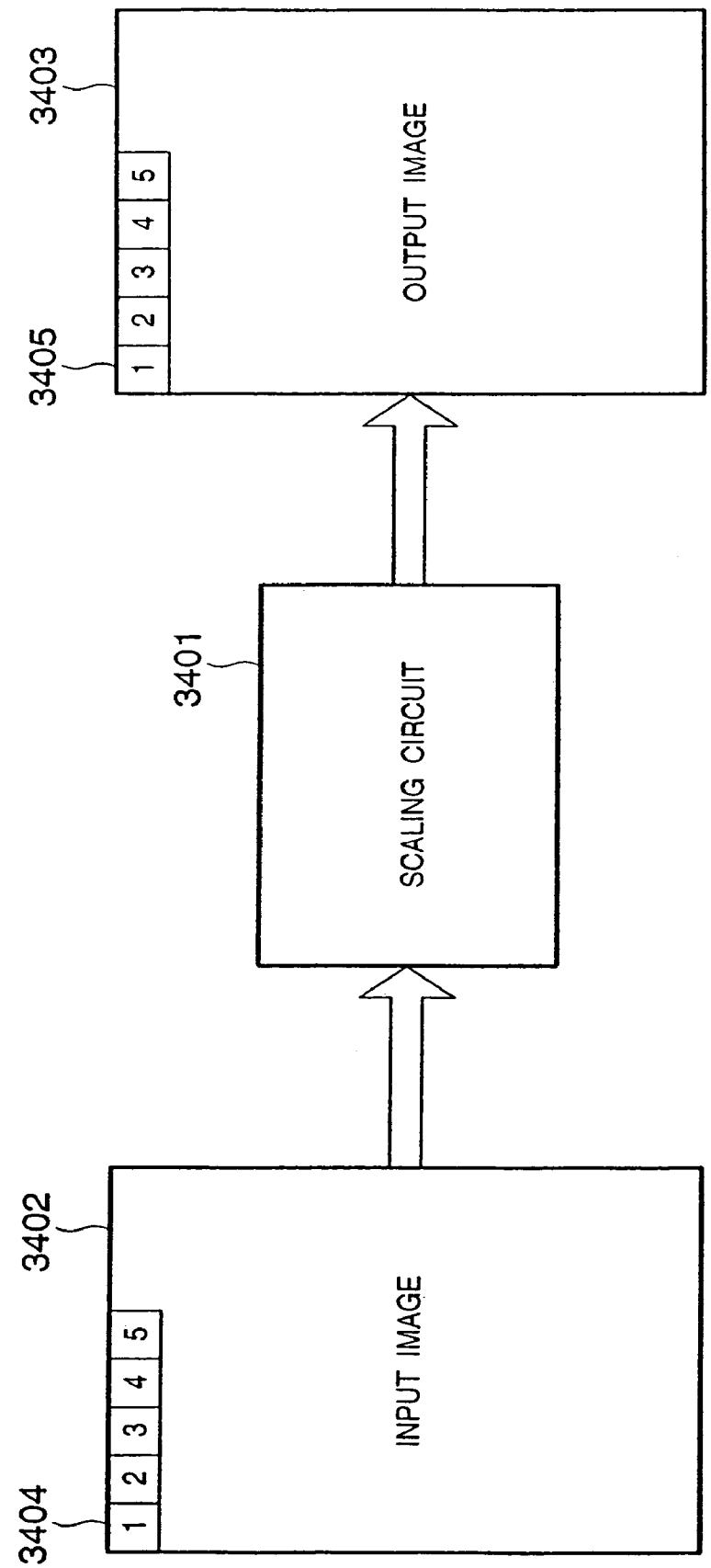
FIG. 34 is a schematic diagram of the operation of a conventional scaling circuit.
Figure 35:
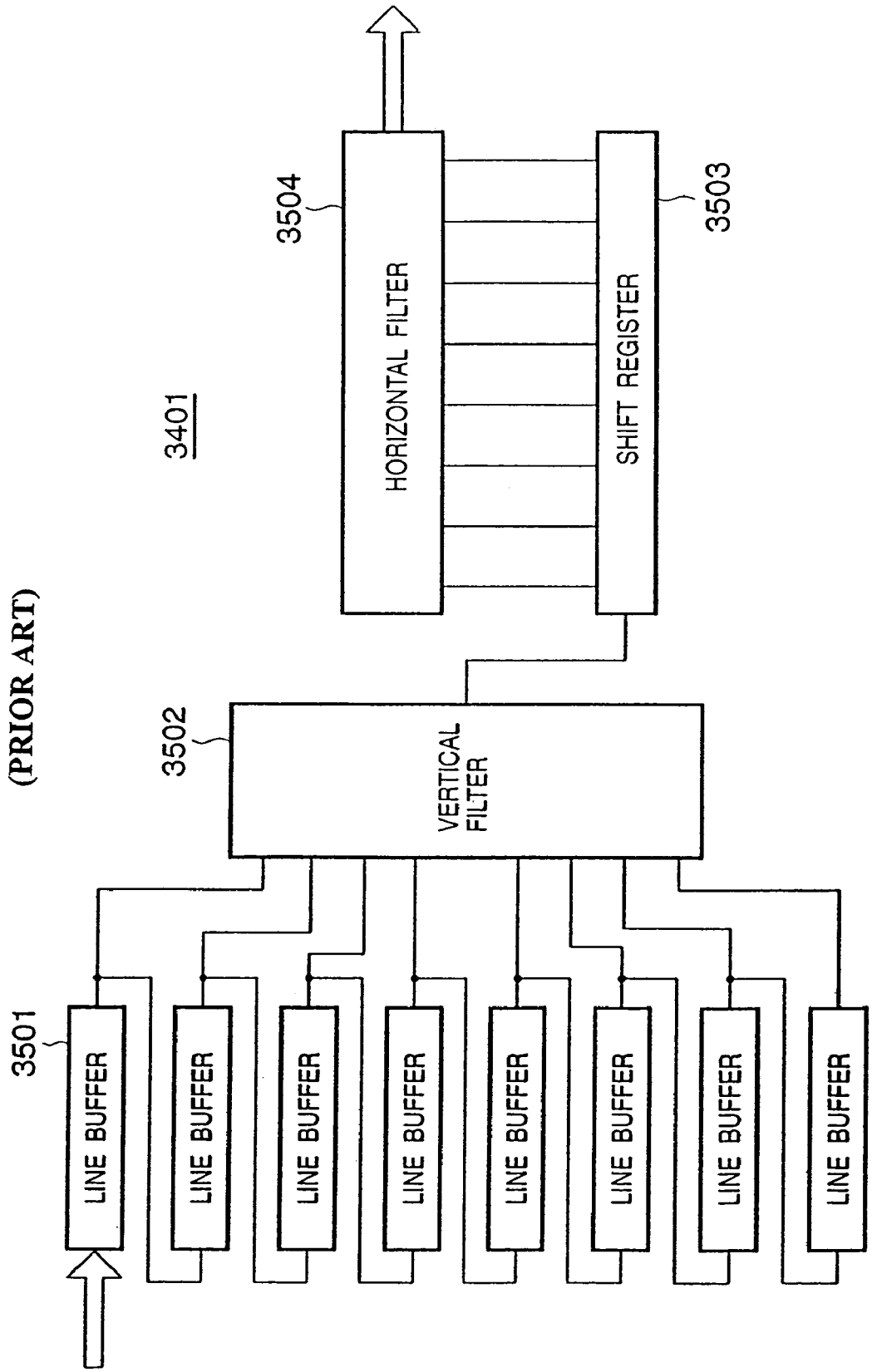
FIG. 35 is a block diagram showing the structure in detail of a conventional scaling circuit.
Figure 36:
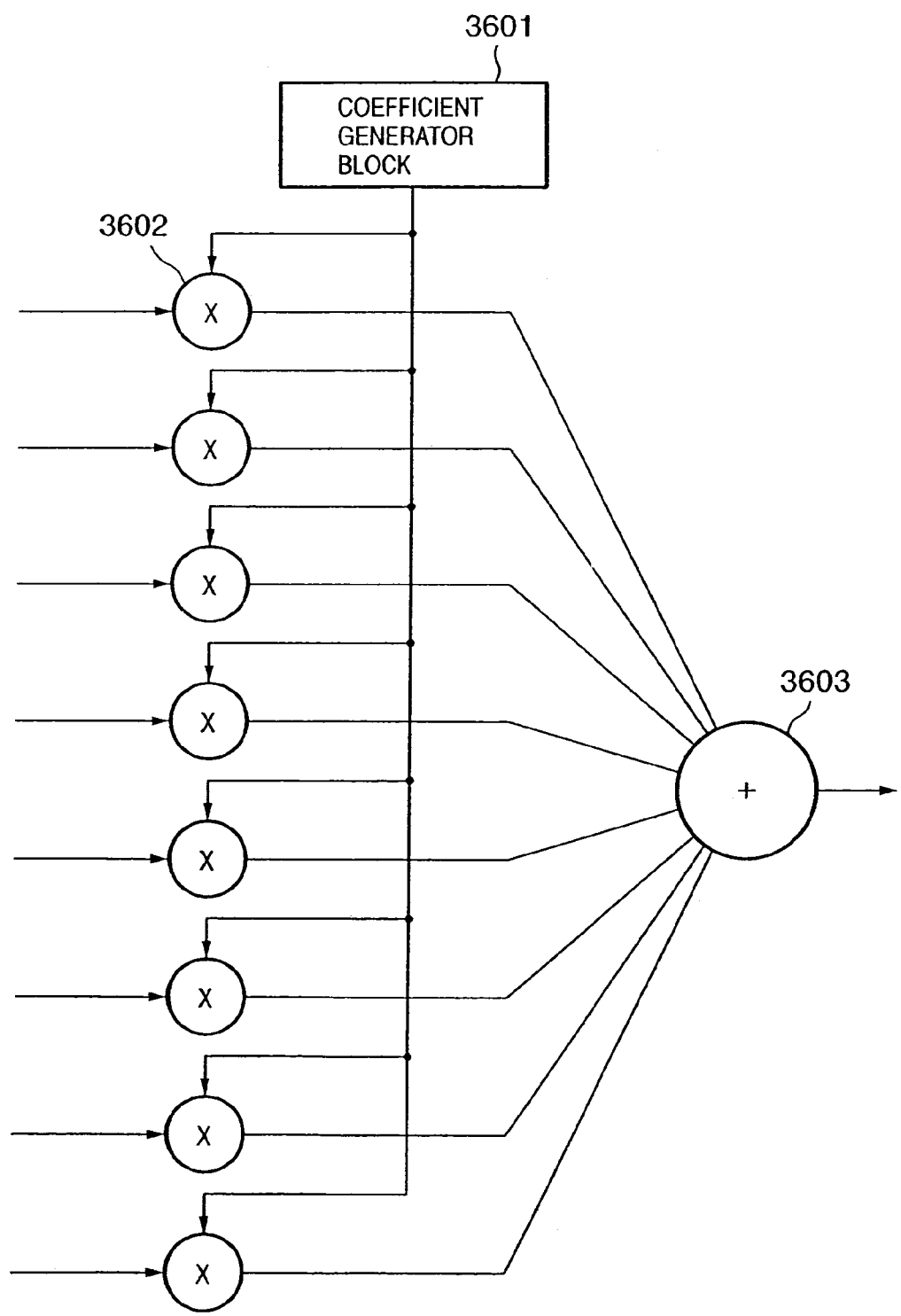
FIG. 36 is a diagram of the operation of a filter processing circuit.

FIG. 33 is a diagram of the circuit structure of a write address counter.

The circuit depicted in FIG. 33 enables the scaling block 6 to output write data to the appropriate line in the tile buffer 7 when the BufEn signal is "1", and to stop output of write data to the corresponding line in the tile buffer 7 when the BufEn signal is "0", thus controlling the writing of tile data to the tile buffer 7.

The circuit shown in FIG. 33 enables writing to the tile buffer 7 when the tile master interface 8 is not operating.

Similarly, the circuit shown in FIG. 33 is configured so as to prohibit writing to the tile buffer 7 while the tile master interface 8 is operating and is in the process of outputting the first tile.

Similarly, the circuit shown in FIG. 33 is configured so as to enable writing only where a comparison of the line address of the tile currently being read RdAddr_L and the size of a value WrAdd_L+1 calculated from the line address to be written reveals that RdAddr_L>WrAdd_L+1 while the tile master interface 8 is operating and is in the process of outputting the second tile. The addition of +1 to the address to be written is to simplify the circuitry by carrying out write control on a per-line basis.

As described above, the present embodiment makes it possible to output only valid image data even when processing a plurality of tiles at once.

Other Embodiments

The image input/output apparatus of the embodiments described above are constituted so as to be able to process a plurality of image data simultaneously. The Application of the present invention can reduce competition between competing operations even when the image input/output apparatus of the present invention is used in such a way that other image processing apparatuses such as an image rotator and the like are used to perform other image processing operations during scaling that call for simultaneous use of the image memory. Very large volumes of image data intended for simultaneous processing arise particularly when executing other types of image processing simultaneously with image input from an image input interface. However, in such cases as well, the image memory is retained in tile units for the processes, so simultaneous processing can be executed smoothly.

The above-described embodiments of the present invention have been explained by reference to a digital copier as the image input/output apparatus. However, as can be appreciated by those of ordinary skill in the art, the present invention is not limited to such embodiments but may be adapted to a wide variety of image input/output apparatuses, including either a system comprising a plurality of devices (such as, for example, a host computer, an interface device, a reader, a printer, etc.) or a single, stand-alone device (such as a copier, facsimile machine or the like).

In addition, the present invention is not limited to an image input/output apparatus per se, but may be adapted to a personal computer or other information processing apparatus. In this case, for example, the portion pertaining to the scaling for the image input/output apparatus may be configured on an option card, that option card being connected to universal bus of the image input/output apparatus.

In addition, the present invention may be achieved by a configuration in which the image input/output apparatus CPU and main memory comprise the scaling circuit, with an external memory used for other image processing operations. In this case, storage space in the main memory can be reduced by having the CPU execute a program for scaling like that described with respect to the foregoing embodiments. The scaling program used would be one that is previously stored in a storage medium of the apparatus.

In other words, as can be appreciated by those of ordinary skill in the art, the object of the present invention may also be achieved by supplying a storage medium, on which is recorded software program code for achieving the capabilities of the above-described embodiments, to the system or apparatus, with the computer (CPU or MPU) of the system or apparatus reading and executing the program code recorded on the storage medium.

In such a case, the program code itself that is read from the storage medium on which it is recorded achieves the capabilities of the above-described embodiments, and the storage medium recording the program code constitutes the present invention.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

It should be noted that the configurations and operations described above with reference to the individual embodiments, whether practiced individually and separately are whether practiced through an appropriate combination of several embodiments, are within the spirit and scope of the present invention.

The present invention is not limited to the above-described embodiments, and various changes and modifications can be made within the spirit and scope of the present invention. Therefore, to apprise the public of the scope of the present invention, the following claims are made.

What is claimed is:

1. An image processing apparatus for performing scaling on inputted image data, the apparatus comprising:
   a dividing unit constructed to divide the inputted image data into a plurality of tile image data to generate a plurality of data packets, wherein each tile image data has a predetermined size;
   a compression unit constructed to compress the tile image data included in each of the plurality of data packets;
   a memory unit constructed to store the plurality of data packets, which include the compressed tile image data, respectively;
   an expansion unit constructed to expand the compressed tile image data included in each of the plurality of data packets stored in said memory unit;
   a scaling unit constructed to scale the expanded tile image data of the plurality of data packets, wherein the scaled tile image data is included in the plurality of data packets; and
   an adding unit constructed to add header information to each data packet, wherein the header information is information indicating a transfer order of each data packet from said expansion unit to said scaling unit to said compression unit to said memory unit, in a case where the scaling by said scaling unit is executed based on the plurality of data packets stored in said memory unit,
   wherein said expansion unit transfers the plurality of data packets including the expanded tile image data to said scaling unit based on the header information,
   wherein said scaling unit transfers the plurality of data packets including the scaled tile image data to said compression unit based on the header information, and
   wherein said compression unit transfers the plurality of data packets including the compressed scaled tile image data to said memory unit based on the header information.

2. The image processing apparatus according to claim 1, wherein said scaling unit comprises line buffers in an amount corresponding to a number of pixels in a horizontal direction of the tile image data having the predetermined size.

3. A scaling method for an image processing apparatus for performing scaling on inputted image data, the method comprising:
   a dividing step of dividing the inputted image data into a plurality of tile image data to generate a plurality of data packets, wherein each tile image data has a predetermined size;
   a compression step of compressing the tile image data included in each of the plurality of data packets;
   a writing step of writing the plurality of data packets, which include the compressed tile image data, to a memory unit;
   an expansion step of expanding the compressed tile image data included each of in the plurality of data packets stored in said memory unit;
   a scaling step of scaling the expanded tile image data of the plurality of data packets, wherein the scaled tile image data is included in the plurality of data packets; and
   an adding step of adding header information to each data packet, wherein the header information is information indicating a transfer order of each data packet from said expansion step to the scaling step to the compression step to the memory unit, in a case where the scaling by the scaling step is executed based on the plurality of data packets stored in the memory unit,
   wherein the expansion step transfers the plurality of data packets including the expanded tile image data to the scaling step based on the header information,
   wherein the scaling step transfers the plurality of data packets including the scaled tile image data to the compression step based on the header information, and wherein the compression step transfers the plurality of data packets including the compressed scaled tile image data to the memory unit based on the header information.

4. The image processing apparatus according to claim 1, wherein said scaling unit comprises line buffers of a predetermined number of lines, and the scaling is started after the predetermined number of lines of data packet are read from said memory unit.

5. The image processing apparatus according to claim 1, further comprising image processing units constructed to respectively perform image processing on the plurality of tile image data included in the plurality of data packets, wherein each the tile image data is expanded by said expansion unit, and wherein the header information included in the respective data packets indicates whether to perform processing by said image processing units or by said scaling unit.

6. The image processing apparatus according to claim 5, further comprising:
   a bus to which said image processing units and said scaling unit are connected; and
   a bus interface for transferring the respective data packets to a selectable one of said image processing units or said scaling unit based on the header information included in the respective data packets.

* * * * *

UNITED STATES PATENT AND TRADEMARK OFFICE
CERTIFICATE OF CORRECTION

| | |
|---|---|
| PATENT NO. | : 7,286,720 B2 |
| APPLICATION NO. | : 11/334585 |
| DATED | : October 23, 2007 |
| INVENTOR(S) | : Ueda |

It is certified that error appears in the above-identified patent and that said Letters Patent is hereby corrected as shown below:

COLUMN 3:
Line 7, "invention.," should read -- invention, --.

COLUMN 4:
Line 55, "shown" should read -- showing --.

COLUMN 6:
Line 16, "(2) 2132)," should read -- (2) 2132, --; and
Line 52, "IO bas" should read -- IO bus --.

COLUMN 8:
Line 22, "elements" should read -- element --.

COLUMN 10:
Line 3, "Paack-" should read -- Pack- --;
Line 8, "PaacketIDX3010)," should read -- PacketIDX3010), --;
Line 26, "he" should read -- the --; and
Line 65, "send" should read -- to send --.

COLUMN 18:
Line 62, "shown" should read -- showing --; and
Line 66, "is" should be deleted.

COLUMN 19:
Line 39, "an" should read -- and --.

COLUMN 20:
Line 24, " "1" " should read -- "1", --.

COLUMN 23:
Line 24, "n a case" should read -- in a case --.

COLUMN 28:
Line 15, "if" should read -- of --; and
Line 60, "fro" should read -- from --.

UNITED STATES PATENT AND TRADEMARK OFFICE
CERTIFICATE OF CORRECTION

PATENT NO. : 7,286,720 B2
APPLICATION NO. : 11/334585
DATED : October 23, 2007
INVENTOR(S) : Ueda It is certified that error appears in the above-identified patent and that said Letters Patent is hereby corrected as shown below:

COLUMN 29:
Line 32, "One" should read -- Once --; and
Line 49, "rest" should read -- reset --.

COLUMN 31:
Line 48, "are" should read -- or --.

COLUMN 32:
Line 48, "each of in" should read -- in each of --.

COLUMN 33:
Line 14, "each the" should read -- each --.

Signed and Sealed this

Twenty-fourth Day of June, 2008

JON W. DUDAS
*Director of the United States Patent and Trademark Office*